United States Patent
Hammarskjold et al.

(10) Patent No.: US 9,585,800 B2
(45) Date of Patent: Mar. 7, 2017

(54) MOBILITY SECUREMENT SYSTEM

(71) Applicant: 4ONE, LLC, Exton, PA (US)

(72) Inventors: Christian Hammarskjold, Devon, PA (US); Vlad Balef, Northbrook, IL (US); Stanley Brzezniak, Lemont, IL (US); Jeffrey Krueger, Chester Springs, PA (US); Michael D. Moffa, Auburn, AL (US); Dan Smith-Cohen, Evanston, IL (US); Paul Vidri, Chicago, IL (US); Timothy J. Murphy, Elmhurst, IL (US)

(73) Assignee: 4ONE, LLC, Exton, PA (US)

( * ) Notice: Subject to any disclaimer, the term of this patent is extended or adjusted under 35 U.S.C. 154(b) by 0 days.

(21) Appl. No.: 14/754,421

(22) Filed: Jun. 29, 2015

(65) Prior Publication Data

US 2016/0016499 A1    Jan. 21, 2016

Related U.S. Application Data

(63) Continuation-in-part of application No. 14/332,276, filed on Jul. 15, 2014.

(51) Int. Cl.
*B60P 7/08* (2006.01)
*A61G 3/08* (2006.01)

(52) U.S. Cl.
CPC .......... *A61G 3/0808* (2013.01); *B60P 7/0823* (2013.01)

(58) Field of Classification Search
CPC .............................. B60P 3/0823; A61G 3/0808
USPC .............. 410/7–12, 19, 21–23, 51, 97, 100; 297/DIG. 4; 296/65.04; 280/304.1; 248/499, 503.1
See application file for complete search history.

(56) References Cited

U.S. PATENT DOCUMENTS

| | | |
|---|---|---|
| 3,576,119 A | 4/1971 | Harris |
| 4,093,303 A | 6/1978 | Nelson |
| 4,103,934 A | 8/1978 | Arnholt et al. |
| 4,252,342 A | 2/1981 | Terabayashi et al. |
| 4,369,995 A | 1/1983 | Harder, Jr. |
| 4,511,171 A | 4/1985 | Petersen |
| 4,946,196 A | 8/1990 | Doty |
| 4,966,392 A | 10/1990 | Featon et al. |
| 5,122,024 A | 6/1992 | Stokes |
| 5,269,574 A | 12/1993 | Bhutani et al. |
| 5,567,095 A | 10/1996 | James et al. |
| 5,702,223 A | 12/1997 | Hahn et al. |
| 5,839,865 A | 11/1998 | Schmidt |
| 5,888,038 A | 3/1999 | Ditch et al. |
| 6,068,433 A | 5/2000 | Baloga |
| 6,113,325 A | 9/2000 | Craft |
| 6,231,283 B1 | 5/2001 | Stowers |

(Continued)

*Primary Examiner* — Stephen Gordon
(74) *Attorney, Agent, or Firm* — Greenberg Traurig, LLP

(57) ABSTRACT

A mobility securement system, and method for securing a wheelchair or other mobility device, and its passenger, within a public or private vehicle. In various embodiments, the system includes one or two attachment members, one or two vehicle anchor assemblies and, potentially, at least one fixed or moveable bumper, and may further include a barrier. A tensioning assembly is operably connected to at least one attachment member and vehicle anchor assembly. One or more moveable bumpers may articulate to apply a force against the mobility device, and one attachment member may be hidden behind a stored position of a moveable bumper.

21 Claims, 56 Drawing Sheets

(56) References Cited

U.S. PATENT DOCUMENTS

| | | |
|---|---|---|
| 6,287,060 B1 | 9/2001 | Girardin |
| 6,309,170 B1 | 10/2001 | Vartanian |
| 6,428,254 B2 | 8/2002 | Craft |
| 6,471,454 B1 | 10/2002 | Koller |
| 6,524,039 B1 | 2/2003 | Magnuson et al. |
| 6,575,677 B2 | 6/2003 | Craft |
| 6,709,035 B1 | 3/2004 | Namuduri et al. |
| 6,776,564 B1 | 8/2004 | Kiernan et al. |
| 6,837,656 B2 | 1/2005 | Prusinowski et al. |
| 6,872,037 B2 | 3/2005 | Girardin |
| 6,899,497 B2 | 5/2005 | Cardona et al. |
| 6,910,558 B2 | 6/2005 | Wang et al. |
| 6,918,722 B1 | 7/2005 | Girardin |
| 6,966,733 B2 | 11/2005 | Craft |
| 7,040,847 B1 | 5/2006 | Cardona |
| 7,322,781 B2 | 1/2008 | Bullock |
| 7,384,229 B2 | 6/2008 | Gleason |
| 7,425,110 B2 | 9/2008 | Ditch |
| 7,452,170 B2 | 11/2008 | Girardin |
| 7,455,490 B1 | 11/2008 | Goosen |
| 7,500,818 B1 | 3/2009 | Johnson |
| 7,604,443 B2 | 10/2009 | Bullock |
| 7,641,257 B2 | 1/2010 | Sawdy |
| 7,708,508 B2 | 5/2010 | Bullock |
| 7,717,655 B2 | 5/2010 | Cardona |
| 7,736,105 B2 | 6/2010 | Landry |
| 7,794,187 B2 | 9/2010 | Ditch |
| 7,854,576 B2 | 12/2010 | Girardin et al. |
| 7,963,730 B2 | 6/2011 | Ditch et al. |
| 8,043,037 B2 | 10/2011 | Ruan |
| 8,109,554 B2 | 2/2012 | Undevik |
| 8,398,344 B2 | 3/2013 | Bullock |
| 8,413,588 B2 | 4/2013 | Kelly et al. |
| 8,414,234 B2 | 4/2013 | Girardin et al. |
| 2001/0001031 A1 | 5/2001 | Craft |
| 2001/0055520 A1* | 12/2001 | Budd ............ A61G 3/08 410/7 |
| 2002/0110434 A1 | 8/2002 | Ditch et al. |
| 2002/0114679 A1 | 8/2002 | Craft |
| 2004/0005203 A1 | 1/2004 | Craft |
| 2006/0110230 A1 | 5/2006 | Girardin |
| 2006/0159542 A1* | 7/2006 | Ditch ............ A61G 3/0808 410/7 |
| 2006/0193708 A1 | 8/2006 | Ditch et al. |
| 2009/0087278 A1 | 4/2009 | Girardin et al. |
| 2010/0086375 A1 | 4/2010 | Tremblay et al. |
| 2010/0183397 A1 | 7/2010 | Bullock |
| 2011/0008122 A1 | 1/2011 | Ditch |
| 2011/0123286 A1 | 5/2011 | Van Roosmalen et al. |
| 2013/0280002 A1 | 10/2013 | Girardin et al. |
| 2014/0271020 A1 | 9/2014 | Girardin et al. |
| 2014/0334893 A1 | 11/2014 | Goss et al. |

* cited by examiner

MOBILITY SECUREMENT SYSTEM

CROSS-REFERENCE TO RELATED APPLICATIONS

This application is a continuation-in-part of U.S. patent application Ser. No. 14/332,276 entitled "Mobility Securement System," filed Jul. 15, 2014, and incorporated herein by reference in its entirety.

FIELD OF THE DISCLOSURE

The present invention is directed to a system for securing a wheelchair or other mobility device and its occupant in a public or private transportation vehicle.

BACKGROUND OF THE DISCLOSURE

Mobility securement systems have existed to accommodate wheelchair-bound and other disabled passengers on buses for many years. Such systems are designed to secure the mobility device and its passenger during travel, where the bus may encounter sharp turns, may have to brake or accelerate quickly or may be involved in an accident. These events are expected during every day travel, and expose the mobility device and its passenger to forces that are often dangerous, both to them and other passengers near them.

While able-bodied passengers have other options to secure the position of their bodies relative to the vehicle, such as grabbing a nearby seat, stanchion, strap or grabrail, wheelchair-bound passengers and others traveling in mobility devices do not always have such an option. Passengers travelling in mobility devices must depend upon a securement system that holds the mobility device, and, in turn, the occupant, in place relative to the vehicle.

Mobility securement systems are now required throughout the U.S. to accommodate disabled passengers under the Americans with Disabilities Act, or ADA. The Code of Federal Regulations contains specific provisions as to the specifications and standards for such mobility device securement systems. See 36 C.F.R. 1192. For example, mobility securement systems on vehicles having a gross weight of 30,000 pounds or more must be able to restrain a force in a forward direction of up to 2,000 pounds per securement leg or clamping mechanism. Vehicles having a gross vehicle weight of less than 30,000 pounds must be able to restrain a force in a forward direction of up to 2,500 pounds per securement leg or clamping mechanism. Furthermore, the securement system must limit the movement of an occupied wheelchair or mobility device to no more than two inches in any direction under normal operating conditions.

To meet these stringent requirements, suppliers of mobility securement systems have typically used a securement system having either three or four attachment points. In the case of four attachment points, one attachment point is secured to a point near each corner of the wheelchair or other mobility device (e.g. scooter, power mobility device, or other). The area where the disabled passenger and mobility aid are positioned is often referred to as the ADA (Americans with Disability Act) area.

Thus, when the vehicle is in operation and makes a turn, accelerates or brakes, or is involved in an accident, there are at least one or two attachments that are located to act as a countervailing force to the inertia of the mobility device and its occupant. For example, when a vehicle turns left and a mobility device occupant feels a force towards the right, he/she is kept in place by one or more attachments that are connected to the mobility device on the left side. Mobility device tip overs are a problem. A vehicle wall or flip up seat assembly serves to prevent tip over to the wall side but tip overs toward the aisle remain a problem.

Systems with only three attachment points work in a somewhat similar manner; the three attachment points are positioned in such a way that there is an attachment connected to the mobility device to apply a countervailing force against any direction the vehicle may pull the passenger and/or the mobility device. In addition, some mobility securement systems with three attachment points also include a bumper or a barrier to limit motion of the mobility device. The bumper or barrier may be fixed or moveable. Barriers are typically placed behind the mobility device, while bumpers are typically placed alongside it by the window-side of the vehicle. In either case, these bumpers and barriers act to provide another surface against which the mobility device may abut, to brace it against the forces experienced during movement of the vehicle. Tip over problems can exist with some three point attachment systems. More specifically, if the mobility device is not positioned flush with the bumper assembly, there may not be sufficient support to prevent a tip over toward the aisle side. Ideally, three point systems require the disabled passenger or an aide to correctly position the mobility device directly against or very close to the bumper assembly. If the mobility device is placed close to the bumper, the bumper may come in contact with the mobility aid and thus assist in tip over prevention. If the mobility aid does not contact the bumper and one of the three attachments is tensioned, the mobility device effectively becomes secured primarily through the two opposing (front wall side and rear aisle side) attachment belts. Three point systems thus require the operator to correctly position the disabled occupant and mobility aid within the ADA area. This takes additional time and is often not done, or not done properly.

In systems with attachment points, an operator (often the bus driver), must attend to the mobility device to ensure it is secured before travel by attaching each of the three or four attachment points to the mobility device. When the mobility device passenger wishes to get off the bus, the driver must again attend to the passenger to disconnect each of the three or four attachment points. Each of these actions takes precious time away from the driver, and from meeting the often difficult schedule of the bus route.

Furthermore, for each attachment point an operator must attach, the operator encroaches into the disabled passenger's personal space, often making the disabled passenger feel uncomfortable. This is particularly true with the wall side, rear attachment point that is least accessible to the operator.

While some mobility securement systems without any attachment points are known, they have often met with less effectiveness, less acceptance and, accordingly, less commercial success. Such systems have moveable bumpers or barriers on opposite sides from each other, which place a compressive force upon the wheelchair or mobility device. Often, such systems are expensive and intrusive, as part of the system must take up substantial space in or near the aisle of the vehicle.

Often, mobility securement systems, or portions thereof, are designed to be stored underneath a seat, or within a barrier of a vehicle when not in use, which allows the area to be used for seating by other passengers.

Finally, it is important to accommodate different types of mobility devices. In addition of various types and sizes of wheelchairs, there are also other mobility devices such as scooters, power mobility devices, etc, each of which may have 3, 4, 5 or more wheels. Many of these devices have different shapes and configurations. Mobility securement systems that are designed to have four attachment points, may not work to secure a three-wheeled mobility scooter that has one center tiller, rather than the two front wheels of a mobility device.

It would be desirable to provide a mobility securement system, which takes significantly less time and effort to secure a wheelchair or many different types of mobility devices and its passenger, which is (i) compliant with all relevant ADA regulations, (ii) flexible with regard to placement of the mobility device in the ADA area, (iii) capable of being quickly and easily stored, or converted for able-bodied passenger seating, when not in use, (iv) cost effective, and (v) which minimizes the amount of an operator's time, effort, and intrusion into the disabled passenger's personal space.

One of the objects of the present invention is to overcome the shortcomings of the prior art through a securement system that accommodates the "imperfect" positioning of the mobility device while minimizing the time and effort for restraining and releasing that mobility device and its occupant.

SUMMARY OF THE INVENTION

The present invention is directed to a mobility securement system and methods for its securement and use. In a preferred embodiment of the invention, the mobility securement system is intended to secure a mobility device that has a first device securement element and a second device securement element, within a vehicle having a wall side and an aisle side, and the mobility securement system comprises a front vehicle anchor assembly affixed to the vehicle and positioned substantially proximate the front of the mobility device; a first attachment member capable of being operably attached between the first device securement element and the front vehicle anchor assembly, for restraining the position of the mobility device within the vehicle; and a second attachment member capable of being operably attached between said second device securement element and a barrier assembly positioned substantially proximate the rear of the mobility device, for restraining the position of the mobility device within the vehicle.

In this embodiment, at least one of the front vehicle anchor assembly, the first attachment member and the second attachment member is operably connected to a tensioning assembly for imposing a tensile force upon one of the first and second attachment members, and the mobility securement system is limited to no additional attachment members beyond the first and second attachment members. In addition, this embodiment excludes any bumper assemblies capable of contacting and restraining the mobility device within the vehicle.

In another embodiment of the invention, the first attachment member is operably connected to a tensioning assembly contained within the front vehicle anchor assembly.

In a different embodiment of the invention, the first attachment member is proximate to the wall side of the vehicle in front of the mobility device, and the second attachment member is proximate to the aisle side of the vehicle behind the mobility device, such that when the first attachment member and the second attachment member are operably attached to the first and second device securement elements, respectively, the first and second attachment members are co-linear to one another along a diagonal axis extending through the mobility device.

In another embodiment of the invention, the first attachment member is proximate to the wall side of the vehicle in front of the mobility device, and the second attachment member is proximate to the wall side of the vehicle behind the mobility device, such that when the first attachment member and the second attachment member are operably attached to the first and second device securement elements, respectively, the first and second attachment members are co-linear to one another along an axis extending substantially parallel to the longitudinal axis of the vehicle.

This embodiment of the invention also includes an attachment member guide, capable of rotating from its stored position to its rotated, locked position, from which the first attachment member emanates, to create an orientation, with the second attachment member, in which the first and second attachment members are substantially co-linear along a shared axis.

In this embodiment also, the second attachment member emanates from a rear vehicle anchor assembly affixed to the vehicle, positioned substantially proximate the rear of said mobility device, wherein the second attachment member is operably connected to at least one tensioning assembly contained within the rear vehicle anchor assembly. The first and second attachment members are substantially co-linear—to the extent that any offset therebetween is incapable of undesirably or torquing the mobility device.

In a different preferred embodiment of the invention, the mobility securement system is intended to secure a mobility device that has at least one device securement element, within a vehicle having a wall side and an aisle side, and the mobility securement system includes at least one vehicle anchor assembly affixed to the vehicle proximate to the mobility device; at least one attachment member capable of being operably attached between the at least one device securement element and the at least one vehicle anchor assembly, for restraining the position of the mobility device within the vehicle through the application of a tensile force; and at least one bumper affixed to the vehicle, the at least one bumper being positioned proximate the mobility device to exert a compressive force thereupon the mobility device.

In this embodiment, the at least one attachment member is operably connected to at least one tensioning assembly for imposing the tensile force upon the at least one attachment member, and the mobility securement system is limited to no more than two attachment members, and no more than two bumpers, for securing the mobility device within the vehicle. In this embodiment also, the at least one bumper is positioned outside of the region formed between any two attachment members when the at least one attachment member comprises two such attachment members.

In another embodiment of the present invention, the at least one attachment member comprises a first attachment member and a second attachment member, the at least one vehicle anchor assembly comprises a front vehicle anchor assembly and rear vehicle anchor assembly, the at least one device securement element comprises a first device securement element and a second device securement element, the at least one tensioning assembly comprises a tensioning mechanism contained within each of said front vehicle anchor assembly and said rear vehicle anchor assembly, and the first attachment member is capable of being operably attached between the first device securement element and the front vehicle anchor assembly, for restraining the position of the mobility device within the vehicle. In this embodiment also, the second attachment member is capable of being operably attached between the second device securement element and the rear vehicle anchor assembly, for restraining the position of the mobility device within the vehicle.

In yet another embodiment of the invention, the mobility securement system also comprises an attachment member guide, which guides the first attachment member to a location wherein the first attachment member can exert a rearward force on the first device securement element.

In another embodiment of the invention, the mobility securement system also comprises an attachment member guide, which guides the second attachment member to a location wherein the second attachment member can exert a rearward force on the second device securement element.

In a different embodiment of the invention, the at least one bumper comprises a first bumper positioned proximate the rear side of the mobility device, and the attachment member guide also serves as a second bumper.

In another embodiment of the invention, the second attachment member emanates from a position substantially proximate the rear wall side of the mobility device.

In yet another embodiment of the present invention, the second attachment member emanates from a position substantially proximate the rear aisle side of the mobility device.

In a further embodiment of the present invention, the at least one vehicle anchor assembly comprises a rear vehicle anchor assembly, the at least one attachment member is capable of operable attachment between the at least one device securement element and the rear vehicle anchor assembly, for restraining the position of the mobility device within the vehicle.

In yet a different embodiment of the present invention, the at least one bumper comprises a first bumper positioned substantially proximate the wall side of the mobility device. In another embodiment, the at least one bumper also comprises a second bumper affixed to the vehicle and positioned substantially proximate the rear aisle side of the mobility device, and the second bumper is capable of applying the compressive force against the mobility device.

In another embodiment of the present invention, the at least one attachment member emanates from a location that is positioned between the first bumper and the second bumper.

In another embodiment, the second bumper is moveable from a stored position to an articulated position.

In a different embodiment, the at least one attachment member comprises a first attachment member, which emanates from the rear vehicle anchor assembly at a position substantially proximate the wall side of the mobility device.

In another embodiment, the at least one attachment member comprises a first attachment member, which emanates from the rear vehicle anchor assembly at a position substantially proximate the aisle side of the mobility device.

In yet another embodiment, the at least one attachment member comprises a first attachment member, which emanates from the rear vehicle anchor assembly at a location that is substantially behind the stored position of the second bumper.

In a different embodiment, the at least one attachment member further comprises a second attachment member, which emanates from the rear vehicle anchor assembly at a position substantially proximate the wall side of the mobility device.

In yet another embodiment, the movement of the second bumper from its stored position to its articulated position comprises a movement in the forward direction and a movement outward in the direction of the aisle. Alternatively, in a different embodiment, the movement of the second bumper from its stored position to its articulated position comprises a movement in the forward direction and a movement in the downward direction.

In one embodiment, the at least one attachment member comprises a first attachment member, which emanates from the rear vehicle anchor assembly at a position substantially proximate the wall side of the mobility device, and a second attachment member, which emanates from the rear vehicle anchor assembly at a position substantially proximate the aisle side of the mobility device.

In another embodiment, at least a portion of the first bumper is moveable and capable of extending to apply an angularly downward force against the mobility device.

BRIEF DESCRIPTION OF THE DRAWINGS

FIG. 3 is a top plan view of the mobility securement system of FIG. 1, showing placement of the deployed side bumpers securing a wheelchair therewith in.

DETAILED DESCRIPTION OF THE INVENTION

Figure 1:
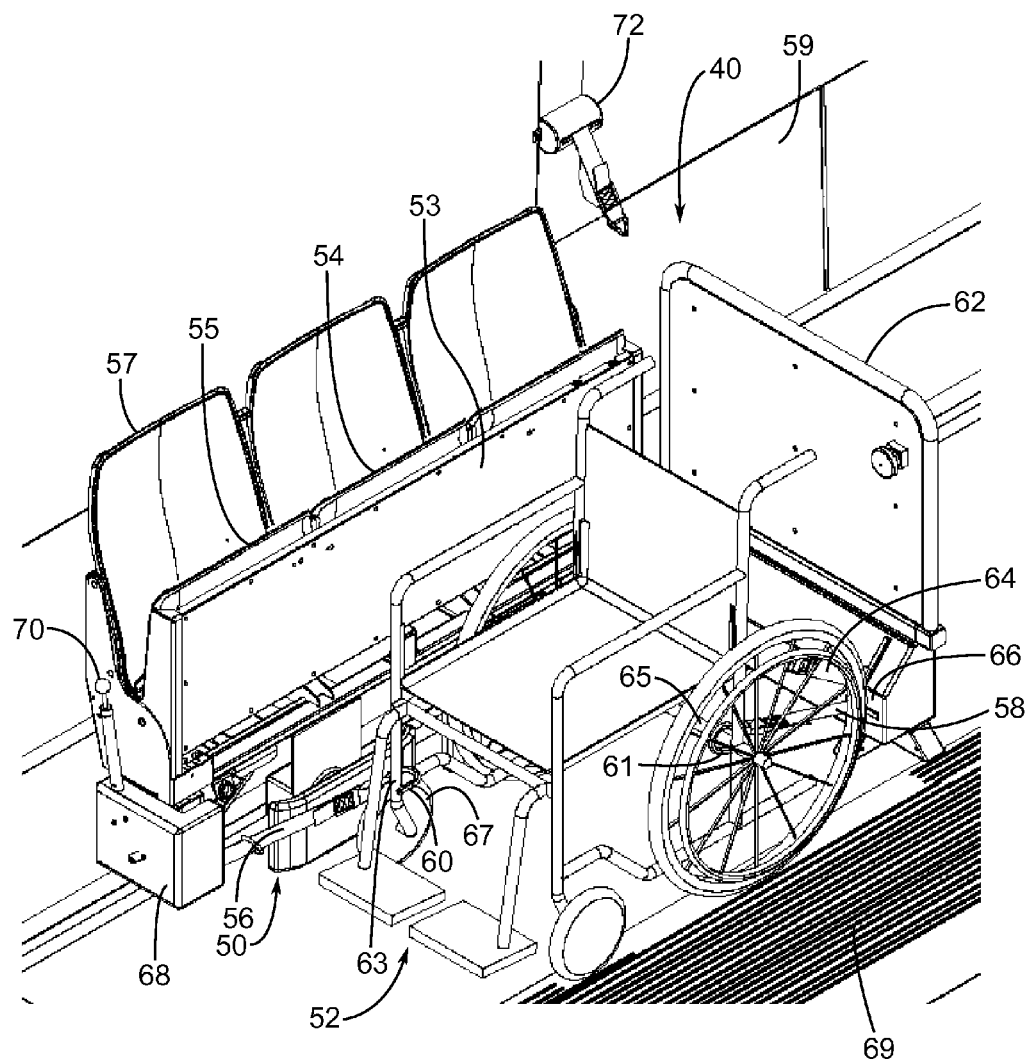
FIG. 1 is a perspective view of a mobility securement system of the present invention, with two moveable side bumpers, showing a wheelchair secured therewithin.

While this invention is capable of embodiment in many different forms, there is shown and described in the drawings and associated text, specific embodiments, with the understanding that the present disclosure is to be considered an exemplification of the principles of the invention and is not intended to limit the invention to the embodiments illustrated.

The following description and drawings are illustrative and are not to be construed as limiting. Numerous specific details are described herein to provide a thorough understanding of the disclosure. However, in certain instances, well-known or conventional details may not be described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

It will be appreciated that same thing can be said in more than one way. Consequently, alternative language and synonyms may be used for any one or more of the terms discussed herein, nor is any special significance to be placed upon whether or not a term is elaborated or discussed herein. By way of example only, the drawings submitted herewith depict the mobility securement system of the present invention as installed in a bus, although it is to be understood that the mobility securement system can be used in any vehicle. Likewise, the terms wheelchair and mobility device may be used interchangeably herein, with the understanding that a mobility device can include a wheelchair, or a three or four-wheeled scooter device. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

For purposes of this detailed description, it is envisioned that in one example of use of the invention, a mobility device and its occupant are secured facing forward inside a vehicle. This invention may also be used with both the mobility device and its occupant secured in a rearward facing position. As shown in the some of the Figures, the area where a mobility device occupant may be secured, otherwise contains seating for normally four or five able-bodied passengers but this area may contain more or less seats. One or more seat benches may be flipped up by the attendant of the mobility securement system (most often the bus driver), to reveal a mobility securement system therewithin. The mobility securement system is used to secure the mobility device and its occupant for travel. After the passenger has arrived at his or her destination, the attendant must release the mobility device and its occupant from the mobility securement system. While a mobility device is often described in association with the embodiments of the invention, it should be appreciated that the embodiments are also applicable to other mobility devices, including motorized wheelchairs and mobility scooters. This description is not meant to limit the scope of the claims, but rather to describe one embodiment of the invention.

The present mobility securement system preferably utilizes just two attachment members, rather than three or four. A first attachment member is secured to a device securement element located at or near the front of the mobility device, and a second attachment member is secured to a device securement element located at or near the rear of the mobility device. The first vehicle attachment assembly is operably attached to a first vehicle anchor assembly that is affixed to the vehicle. A second vehicle attachment assembly is likewise operably attached to a second vehicle anchor assembly that is also affixed to the vehicle.

A device securement element is preferably part of the mobility device frame but may be any element of the mobility device or mobility device capable of accepting attachment, including but not limited to, a wheel axle, a front or rear vertical support member, a securement loop, a wheel, a handle or a seat. In the case of a mobility device having only a center wheel, the device securement element would be a securement loop that is typically provided on the front of the device.

A vehicle anchor assembly often includes a tensioning assembly, which may be located within another structure, such as a rear barrier, side wall member, flip up seat frame, etc. Alternatively, a vehicle anchor assembly may be co-located in a structure with the tensioning assembly integrated therewithin. In a preferred embodiment of the invention, each vehicle anchor assembly is located at or near diagonally opposite corners from each other. In a preferred configuration that is less obtrusive to the bus and other passengers, the first vehicle anchor assembly is located along the wall side of the vehicle, near a front corner of the mobility device. The second vehicle anchor assembly may be located within a rear barrier, or underneath a seat which extends towards the aisle, or within the floor of the vehicle.

The attachment members may be belts, chains, straps or cables, and may further include hooks. Attachment members are also referred to herein as attachments. Each attachment member or vehicle anchor assembly may be operably connected to at least one tensioning mechanism. In a preferred embodiment of the invention, the vehicle anchor assemblies contain spring-based retractors. The retractors provide a tension to the belts or cables, as powered by the springs therein. Furthermore, such retractors may further contain actuation devices which allow for springs to become temporarily disengaged. This mode is helpful for the attendant to attach and detach the attachment points while the cables or belts are not under tension. The actuation devices are typically operated electrically; when charged with electricity the actuator disengages the connection to the springs inside the retractor. When electricity is removed from the actuator, the springs are reengaged, and tension is reapplied. Actuation could also be done pneumatically, mechanically, hydraulically or by other means. Thus, tension may be applied and disengaged remotely.

Each attachment member or vehicle anchor assembly may also be operably connected to a supplemental tensioning mechanism. Supplemental tensioning means may be mechanical, by means of a lever attached to gears and/or a ratcheting wrench located near the tensioning mechanism. Other methods that are known in the art include electric, hydraulic and pneumatic means for providing additional tension. Controls for the supplemental tensioning system may be located locally, or remote therefrom.

It is further contemplated that a mobility securement system includes an occupant seatbelt. It should be noted, however, that occupant seatbelts are not attachment points, as they are used to secure the disabled passenger in the vehicle, and do not act to independently secure the mobility device from movement with the vehicle. Indeed, the ADA regulations require a seat belt in addition to, and not in lieu of, a mobility securement system.

While the mobility securement system of the present invention may contain more than two attachment members or two vehicle anchor assemblies, it has been discovered that only two may be necessary, when used in combination with one or more bumpers of the present invention. The one or more bumpers may be fixed or moveable. In particular, and in cooperation with the other structural features and mode of operation, the bumpers of this invention have been shown to obviate the need for a third attachment member or vehicle anchor assembly. That is because the one or more bumpers act as both a bumper and a tensioning force in a direction that may have previously only been secured through use of an attachment member or vehicle anchor assembly. The positioning and operation of the one or more bumpers, when correctly positioned in relation to the two attachment members and vehicle anchor assemblies, act in concert with them to prevent movement of the wheelchair or mobility device by more than two inches in any direction during the normal operation of a vehicle. While a moveable bumper of the present invention may secure a mobility device and its occupant with less effort by the operator, a fixed bumper may also be used with the present invention. Furthermore, having only two attachment members and vehicle anchor assemblies significantly reduces the time that is required to attach and detach a passenger from the mobility securement system. Another advantage of the present invention, is its ability to secure a variety of wheelchairs or mobility devices of different shapes, at angles that may be skewed, such that the operator of the mobility securement system need not place the wheelchair or mobility device in any particular position or angle in order to be properly secured for transport.

The bumpers may be fixed or moveable. The fixed bumpers associated with the present invention are positioned to secure the mobility device, in concert with no more than the two attachment members and vehicle anchor assemblies of the present invention.

The moveable bumpers associated with the present invention may extend from a fixed or moveable barrier, a wall or a location underneath a seat, to apply a force against the wheelchair or mobility device. If one moveable bumper is used, it should be located alongside the outer wall, or the window side, of the vehicle. If more than one bumper is used, the second moveable bumper may be located on the same side as the first moveable bumper, or on an adjacent side that may be in a perpendicular orientation to the first side. For example, the second moveable bumper may extend from a fixed barrier located behind the wheelchair or mobility device. A second moveable bumper is especially advantageous when accommodating different sizes and types of mobility devices. Even when the moveable bumpers are each located on the same side, it has been found that the bumpers have the capacity to apply tensioning forces in multiple directions. Furthermore, the moveable bumpers may tilt, or articulate, from side to side, or downward, to provide force against an uneven surface, or to two separate points of a mobility device. An articulating bumper also allows a mobility device to be secured, that may not be substantially parallel to the bus wall, thus reducing the amount of time and effort required in securement. A downward force has also been found to be useful in providing additional stability in securing a wheelchair or other mobility device, especially preventing the mobility device from tipping over. The surface of the moveable bumper in contact with the mobility device may be neoprene, or such other material that can provide a high coefficient of friction when pressed against the mobility device.

Various structures may be utilized in association with the moveable bumpers, which may be powered by several different ways, including air springs, and mechanical supports in a scissors, two bar, four-bar or other configurations. Air springs may be powered by pneumatic or electromechanical means. The moveable bumpers or barriers may be also be powered by hydraulic means. In the case of pneumatic means, compressed air from either a compressed gas tank or an air compressor fills the air spring to provide a force against the mobility device, which may likewise be released when the bumper is retracted. A spring may be used to keep the bumper in place when not in use. In case of electromechanical means, an electric motor may be used to move the bumper into place, as well as place an active force upon the mobility device. The electric motor may be a screw-type motor, that moves the supports for the bumpers, or in the case of a scissors configuration, may move both supports at the same time through movement of a central pivot. Conversely, a motor may move just one support, or the two supports unevenly, to both articulate the bumper and create a force against the mobility device. A bumper may also articulate through the use of pneumatic means, wherein the bumper support includes separate pneumatic chambers for each side of the bumper. Alternatively, the support may contain only one pneumatic chamber, and further allow the bumper to articulate after it makes contact with one surface. This is done through use of a flexible air spring, such that when one side of the bumper makes contact with a surface, the non-contacting portion of the bumper will continue to extend in an articulating manner, until it makes contact with another surface.

Another embodiment of the present invention in which the bumper may articulate, includes a means for sensing when one surface of a moving bumper makes contact with the surface of the mobility device; at which point the side of the bumper that had not made contact is allowed to move unevenly, or articulate, to contact a second surface. Means for sensing include pressure sensors, optical sensors, force-resistance sensors or other sensor types. Once contact is made, the bumper applies an active force against the mobility device, at a predetermined force. A moveable bumper may extend directly from a bus wall, underneath a fold-down seat, or from a rear barrier. A moveable bumper may also swing or pivot from a stored position, to apply a force against the wheelchair or mobility device.

There may also be a fixed, rear barrier located behind the wheelchair or mobility device. In addition to storing the second attachment member and vehicle anchor assembly at a location closest to the rear, aisle side of the mobility device, and possibly including a moveable bumper, the fixed barrier may also provide support to the mobility device, in case of a rearward force from sudden acceleration.

The rear barrier may also be moveable. In different embodiments of the invention as discloses herein, the barrier may rotate, or swivel, about an axis. The barrier may translate forwards and backwards. The moveable barrier may also articulate downwards. Furthermore, the barrier may also include a moveable bumper, as discussed herein.

Figure 56:
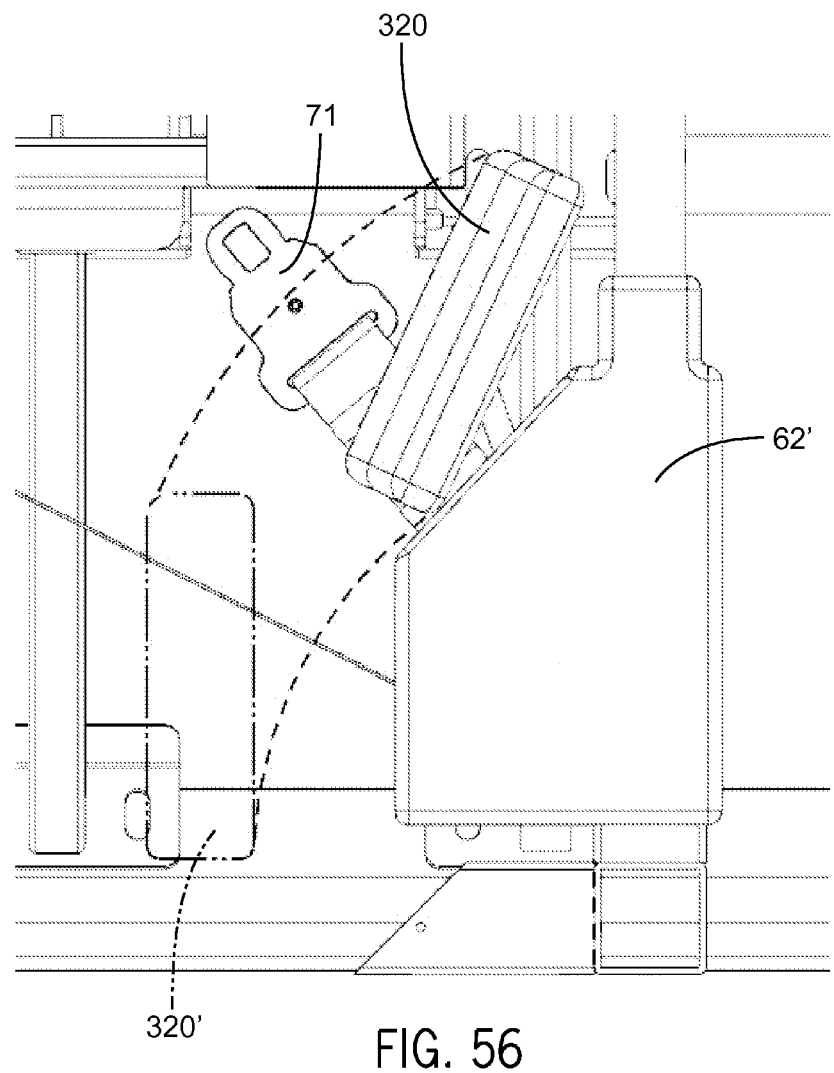
FIG. 56 is an elevated side view of the alternative aisle-side bumper shown in FIGS. 54-55, in which the bumper is stored in its non-articulated position, and demonstrating the forward and downward movement of the bumper to its articulated position.

The type, shape and configuration of the mobility securement system, the attachment points, and the fixed and moveable bumpers and barriers are described in association with the embodiments disclosed in FIGS. 1-56. It should be appreciated that other embodiments of the invention include combinations of disclosed elements, whose combination is not specifically disclosed in the Figures herein.

One method for securing a mobility device and its passenger into the mobility securement system of the claimed invention, is to position the mobility device against a bumper. Then, a first attachment member is attached to a first securement device on the mobility device, and then a second attachment member is attached to a second securement device on the mobility device. Next, one or more tensioning systems may be activated. Finally, supplemental tensioning, if any, is applied.

Another method for securing a mobility device and its passenger into the mobility securement system of the claimed invention, is to attach a first attachment member to a first securement device on the mobility device, and then to attach a second attachment member to a second securement device on the mobility device. Then, one or more tensioning systems may be activated. Next, supplemental tensioning, if any, is applied. Finally, at least one moveable bumper is moved to apply an active force against the mobility device. As noted herein, a moveable bumper may articulate to apply a force against two points of the mobility device that are located at different distances from the wall side of the vehicle, or apply a force against a surface of the mobility device that is not coplanar with the wall side or the aisle side of the vehicle. A method according to an embodiment of the present invention with a moveable barrier, is to translate, swivel, articulate or otherwise move the rear barrier such that it comes into contact with the mobility device.

With regard to drawing FIGS. 1 through 56, Applicant's invention is described as follows:

In one embodiment of the present invention, two moveable bumpers are utilized, each positioned to the side of the wheelchair or mobility device. FIG. 1 shows a perspective view of this embodiment, mobility securement system 40 having two moveable bumpers (only first moveable bumper 50 is visible) located to the side of mobility device 52, underneath flip seat 54. Flip seat 54 comprises underneath surface 53, seat bottoms 55 and seat backs 57. Mobility device 52 is secured to mobility securement system 40 using front attachment member 56 and rear attachment member 58. Front attachment member 56 includes front hook 60; while rear attachment member 58 includes rear hook 61. Each of front hook 60 and rear hook 61 may attach to a device securement element, including an axle, such as rear axle 65, or to a support member of mobility device 52, such as front mobility device support member 63, or a hook, a bracket or a securement loop, such as securement loop 76 of FIG. 4. As shown, front hook 60 is attached to front mobility device support member 63, and rear hook 61 is attached to rear axle 65. Rear barrier 62 contains rear attachment member 58, occupant seat belt female component 64 (only the female portion is shown in FIG. 1), rear barrier surface 66, and other elements that are not shown, including a tensioning mechanism, supplemental tensioning, and controls therefor.

In this embodiment, mobility device 52 is close to, but does not abut, rear barrier surface 66 of rear barrier 62, as secured by rear attachment member 58, which emanates from a vehicle anchor assembly within barrier 62. Front attachment member 56 is connected to vehicle anchor assembly 68, which comprises a tensioning system that may include a spring-based retractor capable of remote actuation, and a supplemental tensioning system to provide further tension to front attachment member 56. Control lever 70 may be used to actuate, or otherwise control or enhance the applied force of the tensioning system, and supplemental tensioning system, which may be located in vehicle anchor assembly 68. Vehicle anchor assembly 68 may further include a timer assembly operably connected to an on/off switch and one or more tensioning systems, that allows the operator to attach one or more belts to the mobility device while the belts are not under tension. When the timer assembly finishes its timed cycle, the belts are automatically tensioned and locked, preventing further spooling of the belt from vehicle anchor assembly 68. Also shown is bus wall 59 and bus aisle 69. First moveable bumper 50 contacts front wheel 67 of mobility device 52, and applies a force thereupon. The mobility securement system further includes shoulder occupant seat belt 72.

Figure 2:
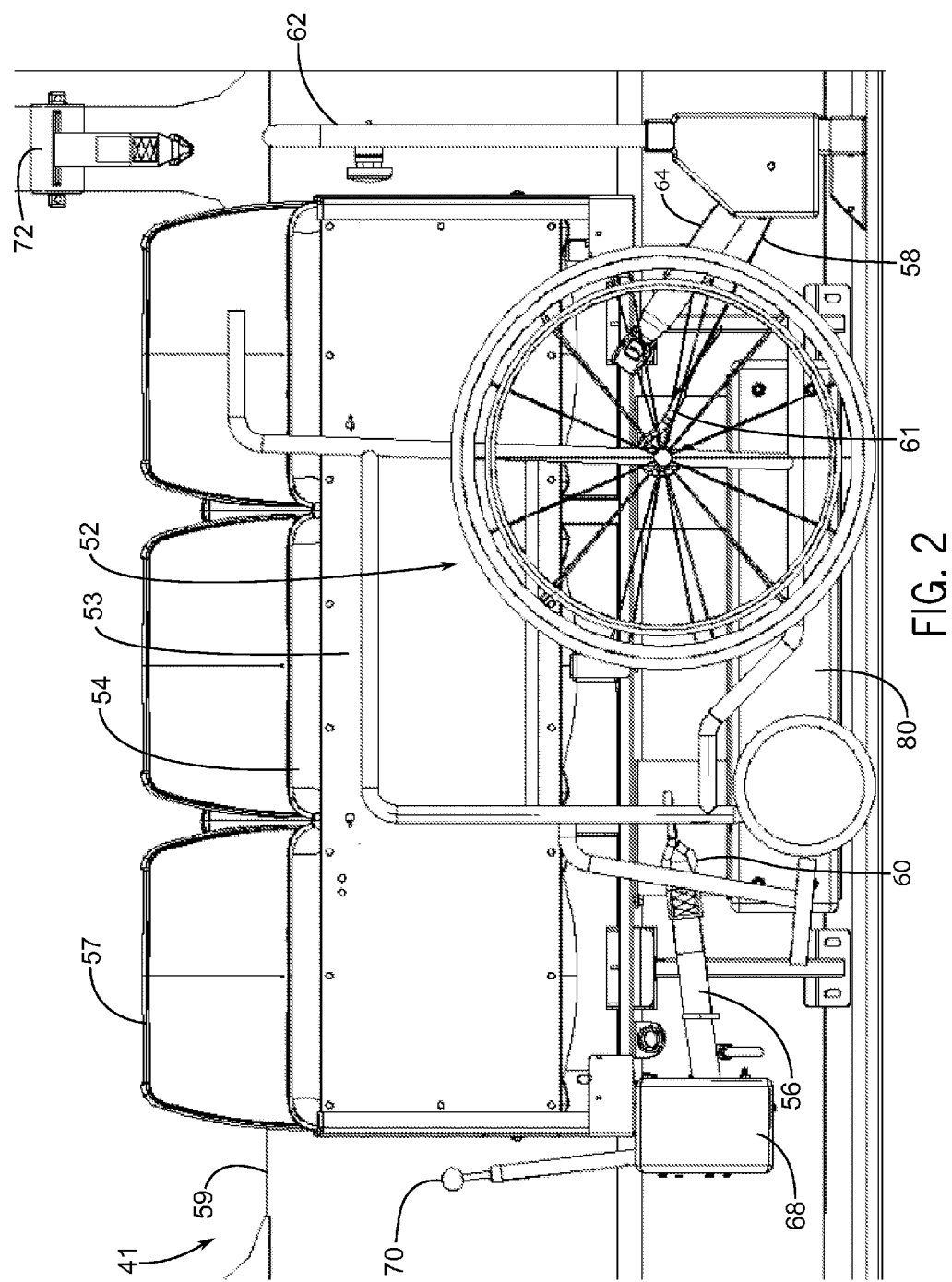
FIG. 2 is an elevated side view of another embodiment of a mobility securement system of the present invention, with one moveable side bumper, and a wheelchair secured therewithin.

In another embodiment of the invention, only one side bumper is utilized. FIG. 2 is a side elevation of mobility securement system 41, with one moveable bumper 80, located to the side of mobility device 52, and underneath flip seat 54. The mobility device 52 is secured to the mobility securement system 41 using front attachment member 56 and rear attachment member 58, which are connected to front hook 60 and rear hook 61. Each of front hook 60 and rear hook 61 are attached to an axle or support member of mobility device 52, as shown in FIG. 1. Rear barrier 62 contains rear attachment member 58, occupant seat belt female component 64, occupant seat belt male component 71 (not shown), and other elements that are not shown, including a tensioning mechanism, supplemental tensioning, and controls therefor. Front attachment member 56 is connected to vehicle anchor assembly 68, which may include a spring-based retractor capable of remote actuation, and a supplemental tensioning system to provide further tension to front attachment member 56. Control lever 70 may be used to actuate, or otherwise control the tensioning system, and supplemental tensioning system, which may be located in vehicle anchor assembly 68. Moveable bumper 80 contacts the side of mobility device 52, and applies a force thereupon emanating from underneath surface 53 of flip seat 54 and seat back 57. The mobility securement system 41 further includes shoulder occupant seat belt 72. Also shown is bus wall 59.

Figure 3:
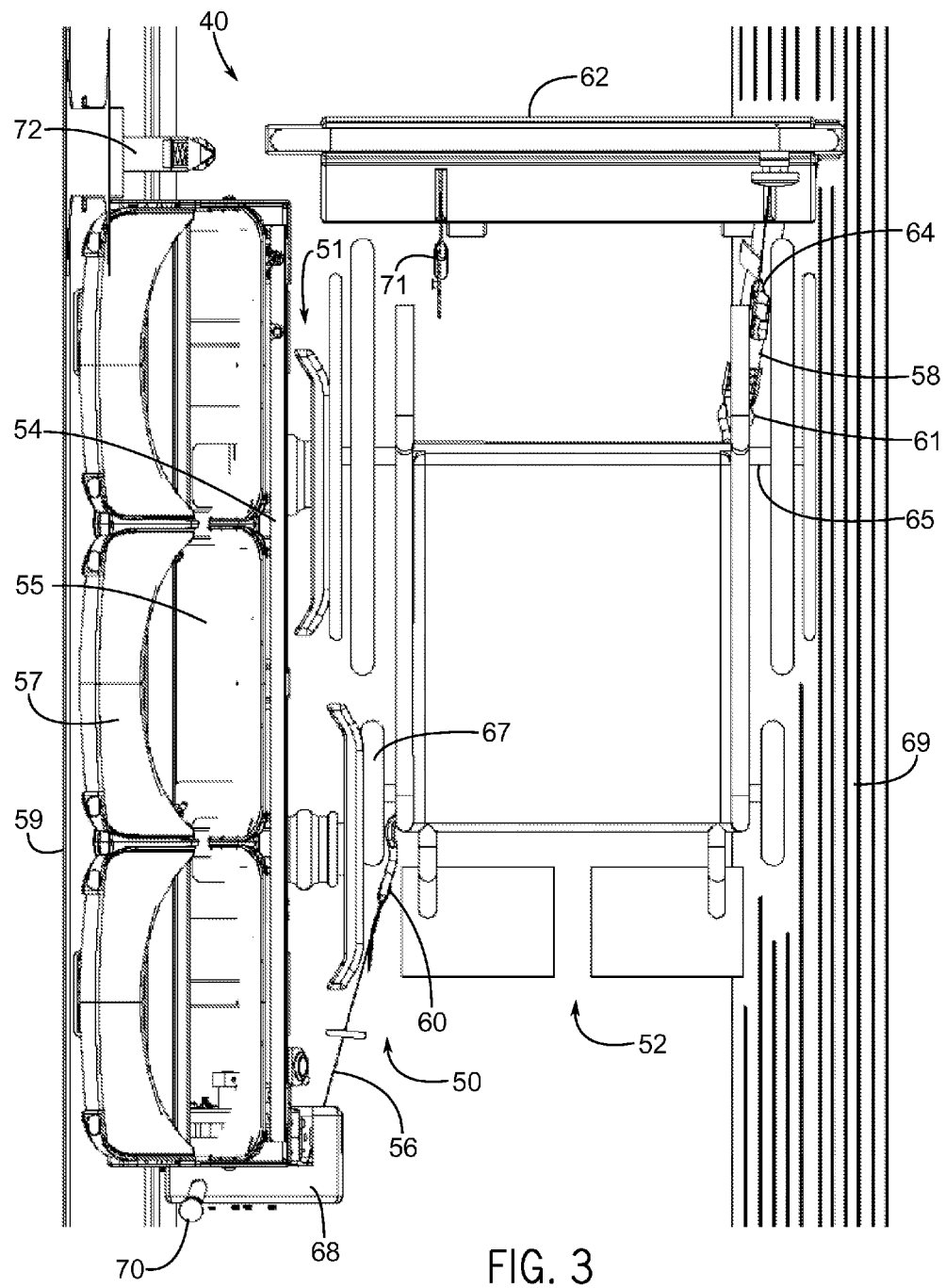

FIG. 3 shows a plan view of mobility securement system 40, that is disclosed in FIG. 1. In this view, it is possible to see first moveable bumper 50 and second moveable bumper 51, each in contact with different surfaces of mobility device 52. First moveable bumper 50 is in contact with the recessed front wheel of mobility device 52, whose surface is not coplanar with the larger, rear wheel of mobility device 52, which is in contact with second moveable bumper 51. Thus, first moveable bumper 50 is extended further from the bus wall than second moveable bumper 51—each applying a force against a surface of mobility device 52. Also shown in FIG. 3 are flip seat 54, seat bottom 55, seat back 57, front attachment member 56, rear attachment member 58, front hook 60, rear hook 61, rear barrier 62, occupant seat belt female component 64, occupant seat belt male component 71, shoulder occupant seat belt 72, rear axle 65 of mobility device 52, front wheel 67, vehicle anchor assembly 68, control lever 70, bus wall 59 and bus aisle 69.

Figure 4:
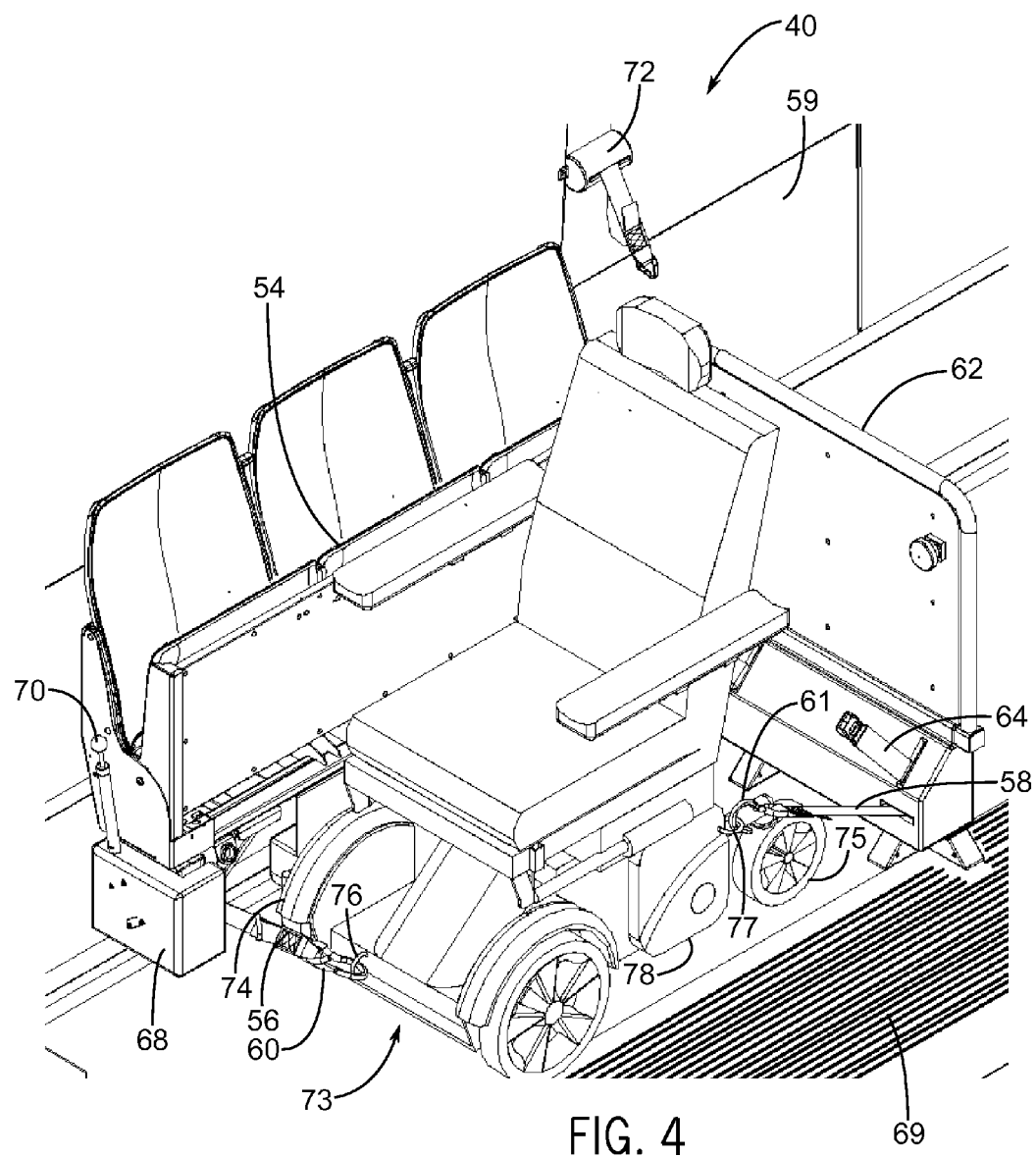
FIG. 4 is a perspective view of the mobility securement system of FIG. 1, used to secure a motorized mobility device having a different design from the wheelchair shown in FIG. 1.

FIG. 4 shows a perspective view of mobility securement system 40 of FIG. 1, securing motorized mobility device 73 having larger front wheels 74 and smaller, recessed rear wheels 75—an opposite configuration to the wheels of mobility device 52 depicted in FIG. 1. In this embodiment, front attachment member 56 is secured to motorized mobility device 73 by use of a front hook 60 through first securement loop 76, which is typically provided as part of motorized mobility device 53. Likewise, rear attachment member 58 is secured to motorized mobility device 53 by use of rear hook 61 through second securement loop 77. Also shown in FIG. 4 are flip seat 54, rear barrier 62, occupant seat belt female component 64, shoulder occupant seat belt 72, vehicle anchor assembly 68, control lever 70, bus wall 59, bus aisle 69, and motorized mobility device side portion 78.

Figure 5:
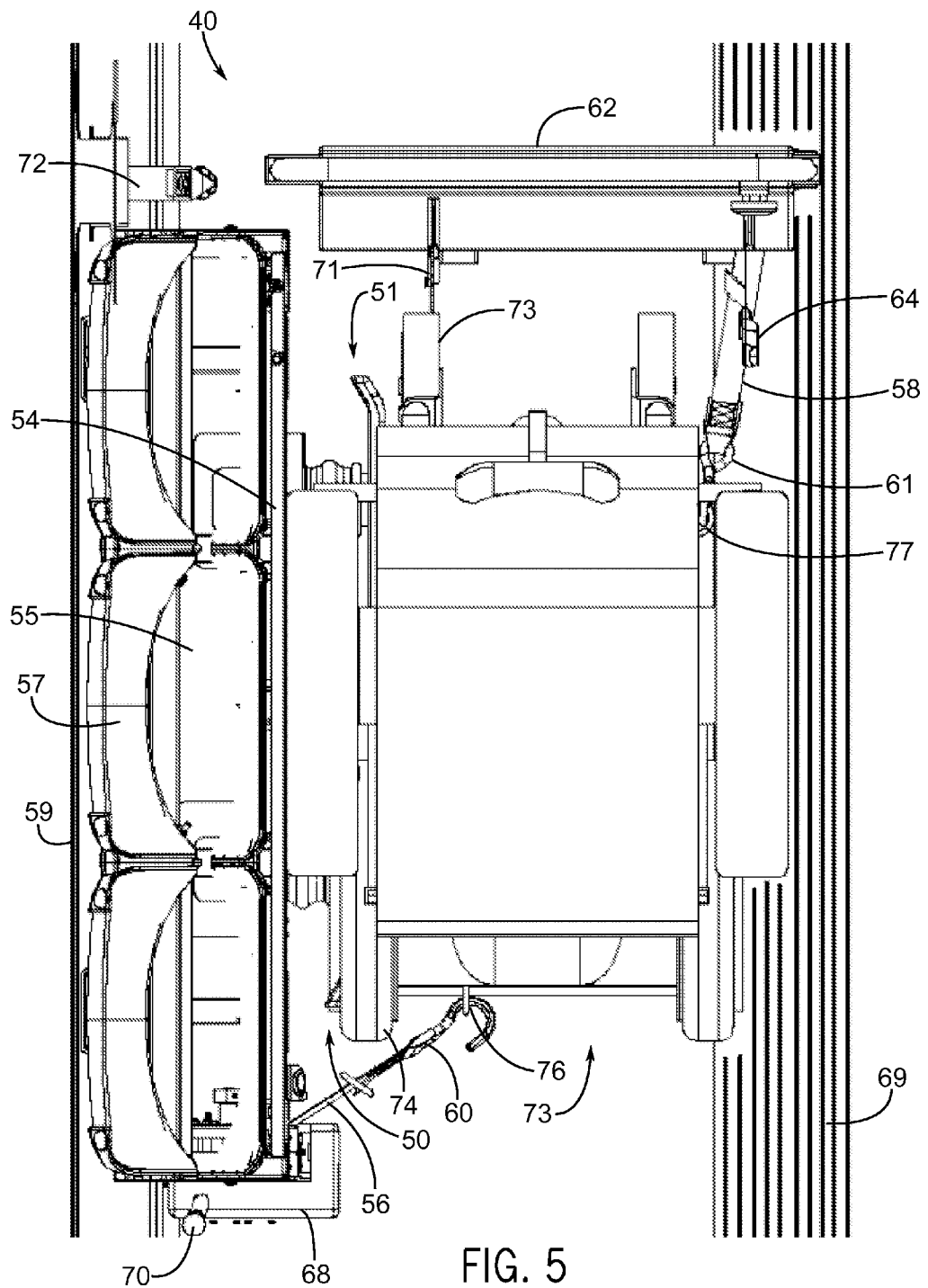
FIG. 5 is a top plan view of the mobility securement system of FIG. 1, used to secure a motorized mobility device having a different shape from the wheelchair shown in FIG. 1, showing the different extensions employed by the moveable bumpers to secure the motorized mobility device within the system.

FIG. 5 shows a plan view of mobility securement system 40, as disclosed in FIG. 1, securing motorized mobility device 73, as shown in FIG. 4. In this view, it is possible to see first moveable bumper 50 and second moveable bumper 51, each in contact with different surfaces of motorized mobility device 73. First moveable bumper 50 is in contact with the larger front wheel 74 of motorized mobility device 73, whose surface is not coplanar with the smaller, rear guide wheel 75, or the side portion 78 (not visible) of motorized mobility device 73 that is in contact with second moveable bumper 51. Thus, second moveable bumper 51 is extended farther from bus wall 59 than first moveable bumper 50—each applying a force against a different, non-coplanar surface of motorized mobility device 73. Also shown in FIG. 5 are flip seat 54, seat bottom 55, seat back 57, front attachment member 56, front hook 60, first securement loop 76, vehicle anchor assembly 68, control lever 70, rear barrier 62, occupant seat belt female component 64, occupant seat belt male component 71, shoulder occupant seat belt 72, rear attachment member 58, rear hook 61, second securement loop 77, bus wall 59 and bus aisle 69.

Figure 6:
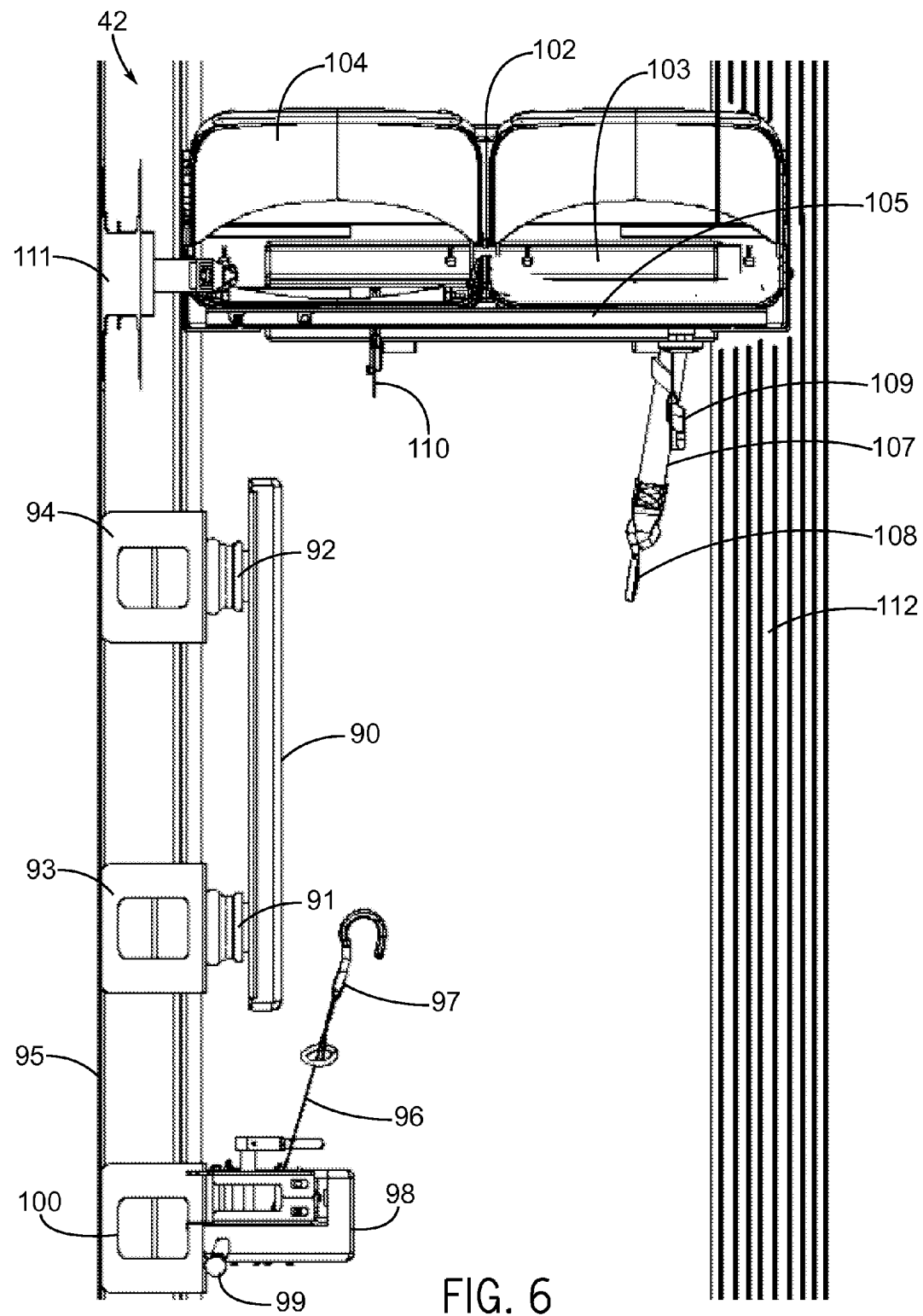
FIG. 6 is a top plan view of another embodiment of a mobility securement system of the present invention, with a single side bumper attached to the bus wall, and a rear barrier that includes two fold down seats, which seats are available to ambulatory passengers when the mobility securement system is not in use. A wall mounted, longitudinal flip up seat may be installed over the bumper assembly.
Figure 7:
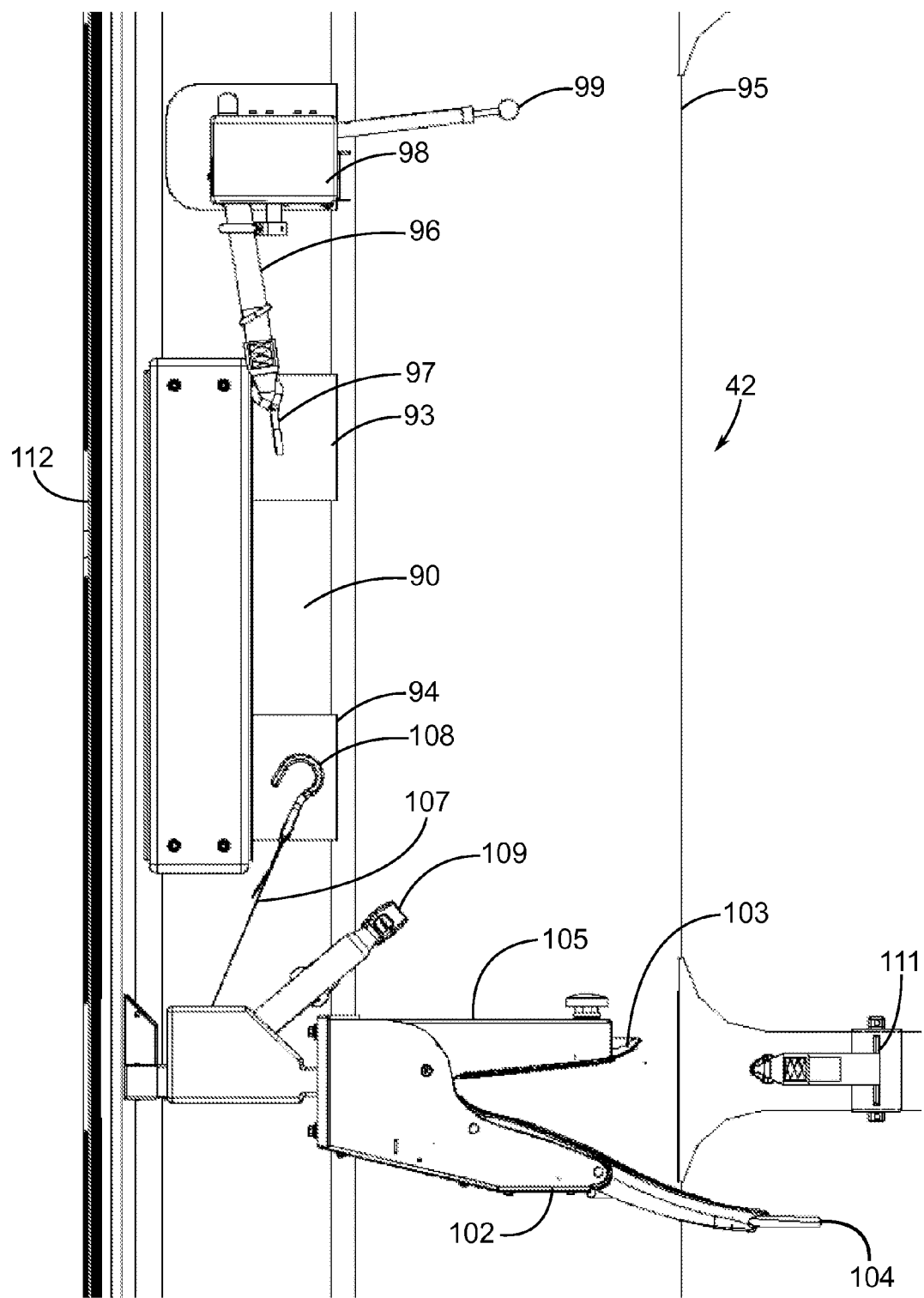
FIG. 7 is an elevated side view of the mobility securement system of FIG. 6.

FIG. 6 shows a plan view of another embodiment of the present invention, having one moveable bumper that is not underneath a flip-down seat. Mobility Securement System 42 includes bumper 90, which is connected to first support 91 and second support 92. First support 91 is connected to base 93, and second support 92 is connected to base 94. In one embodiment of the invention, bumper 90 is a fixed bumper. In another embodiment of the invention, bumper 90 is a moveable bumper. In the embodiment of the invention where bumper 90 is a moveable bumper, each of first support 91 and second support 92 may be capable of movement independent of the other support. In this embodiment, bases 93 and 94 contain the means to extend or articulate each of supports 91 and 92 respectively, and are each secured to bus wall 95. Also shown is front attachment 96, front hook 97, vehicle anchor assembly 98, control lever 99 and base 100 for vehicle anchor assembly 98, which is attached to bus wall 95. In the embodiments shown in FIG. 6, there are no flip down seats above the bumper. However, rear barrier 102 contains flip down seat 103 to accommodate two people when the system is not in use. Also shown are seat back 104, underneath surface 105 of flip down seat 103, rear attachment member 107, rear hook 108, occupant seat belt female portion 109, occupant seat belt male portion 110, shoulder occupant seat belt 111 and bus aisle 112. FIG. 7 shows a side elevation view of mobility securement system 42 depicted in FIG. 6.

Figure 8:
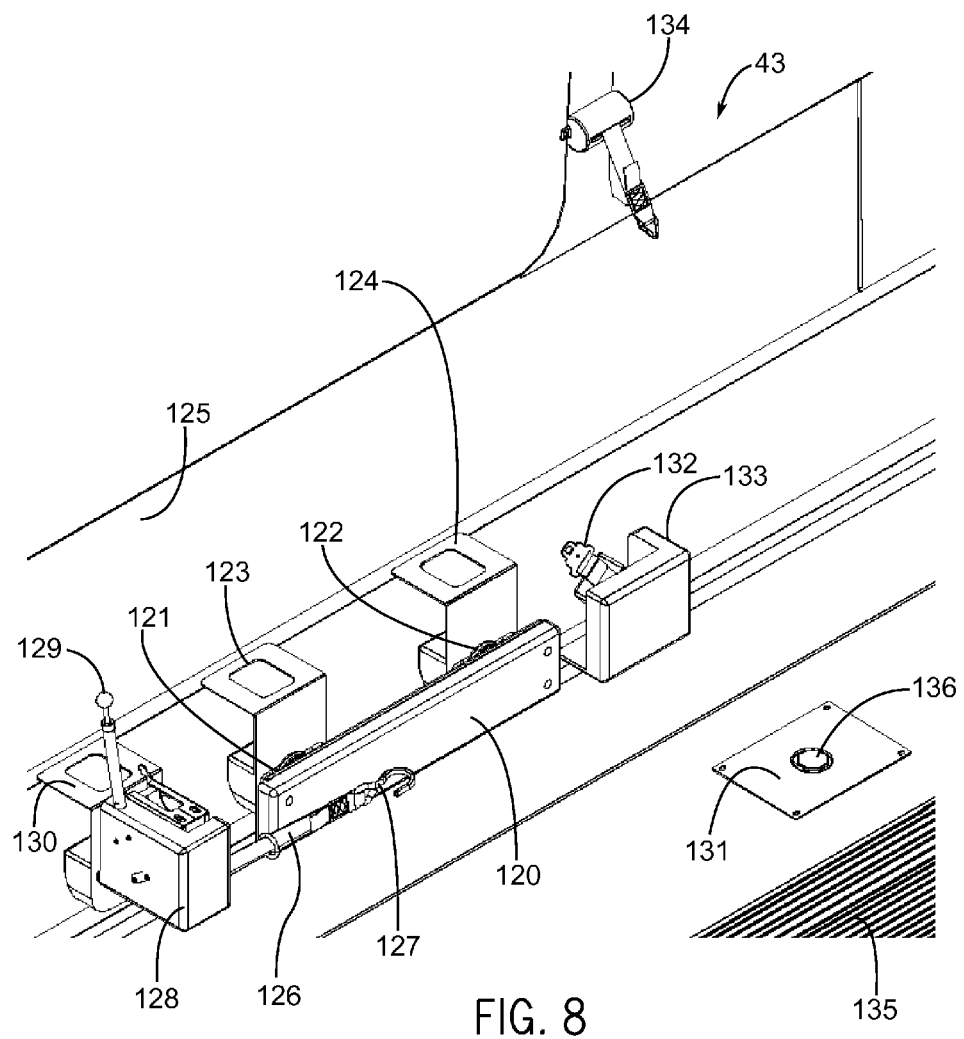
FIG. 8 is a perspective view of another embodiment of the present invention, with a single moveable side bumper attached to the bus wall, and a telescopic vehicle anchor assembly that is stored within the bus floor, shown when the mobility securement system is not in use.
Figure 9:
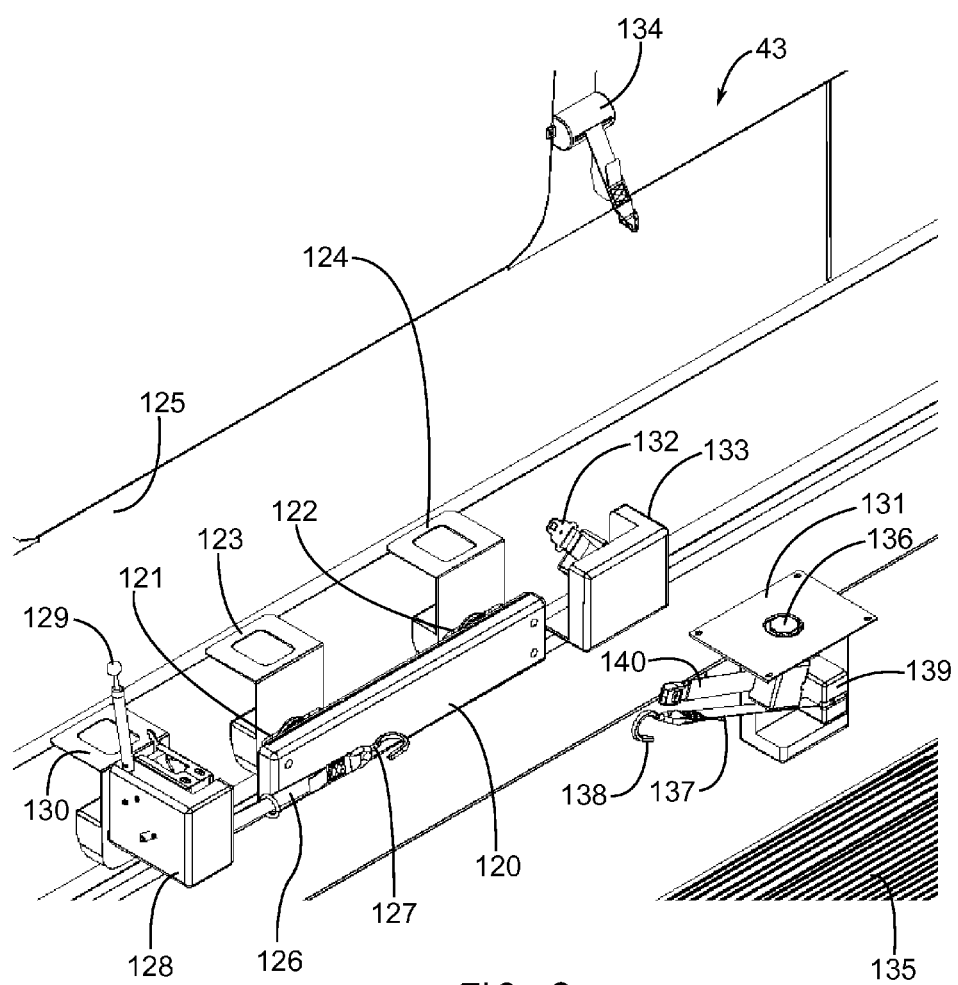
FIG. 9 is a perspective view of the mobility securement system of FIG. 8, in which the telescopic vehicle anchor assembly is shown in a deployed position, ready for attachment to a mobility device or other mobility device.

FIG. 8 shows a perspective view of another embodiment of the present invention, without any flip-down seats or a rear barrier at all. Mobility securement system 43 includes moveable bumper 120, first support 121, second support 122, first support base 123, second support base 124, front attachment member 126, front hook 127, vehicle anchor assembly 128, control lever 129, front tensioning system base 130, vehicle anchor assembly 131, rear module control 136, male occupant seat belt 132, protective housing 133 and shoulder occupant seat belt 134. Also shown are bus wall 125 and bus aisle 135. The rear attachment, female portion of occupant seat belt, tensioning system and associated controls are contained within vehicle anchor assembly 131, shown in the stored position flush with the bus aisle 135. FIG. 9 depicts a perspective view of mobility securement system 43 shown in FIG. 8, in a deployed position, ready to secure a wheelchair or mobility device. In this position vehicle anchor assembly 131 is raised to reveal rear attachment 137, rear hook 138, rear tensioning system 139 and the female occupant seat belt 140.

Figure 10:
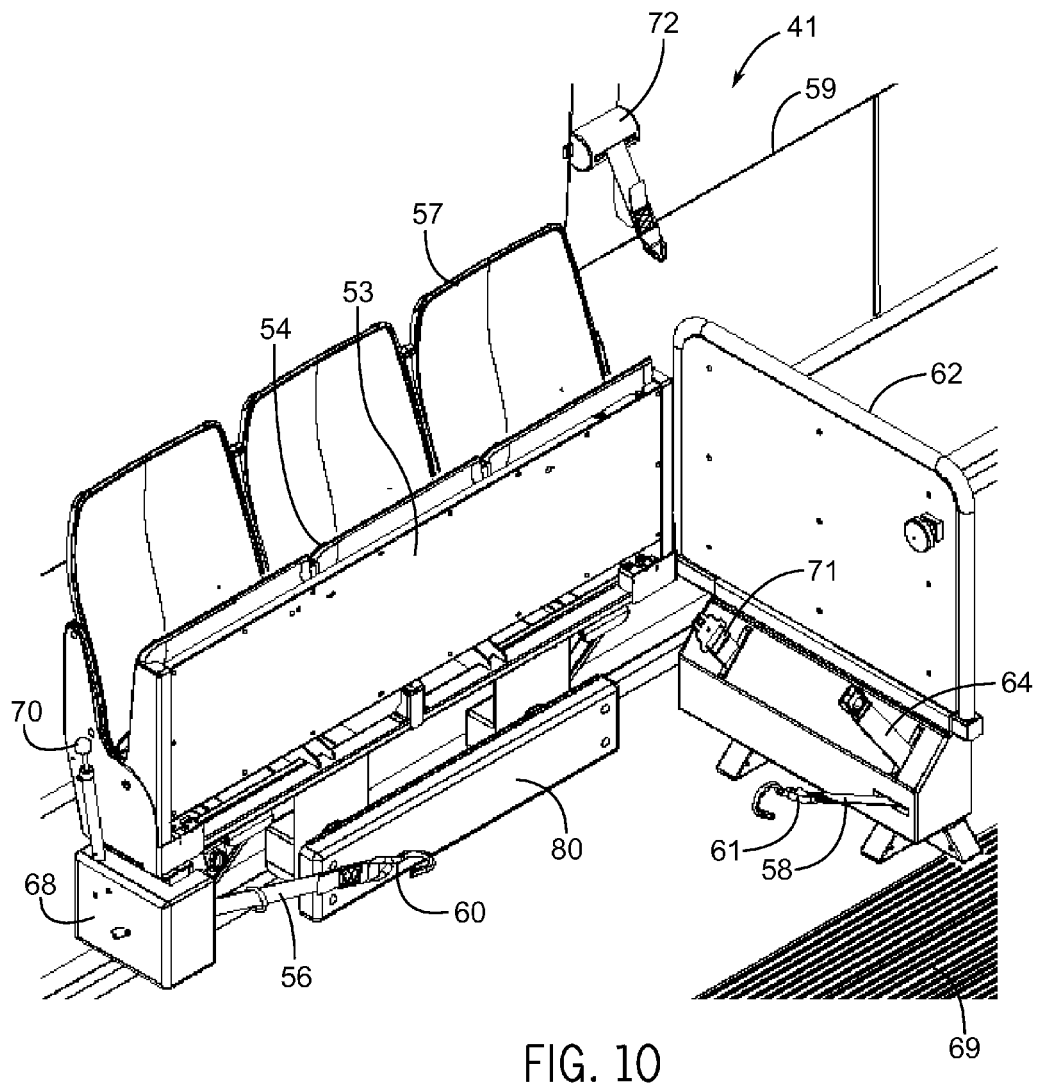
FIG. 10 is a perspective view of the mobility securement system of FIG. 2, shown without a mobility device secured therein.
Figure 11:
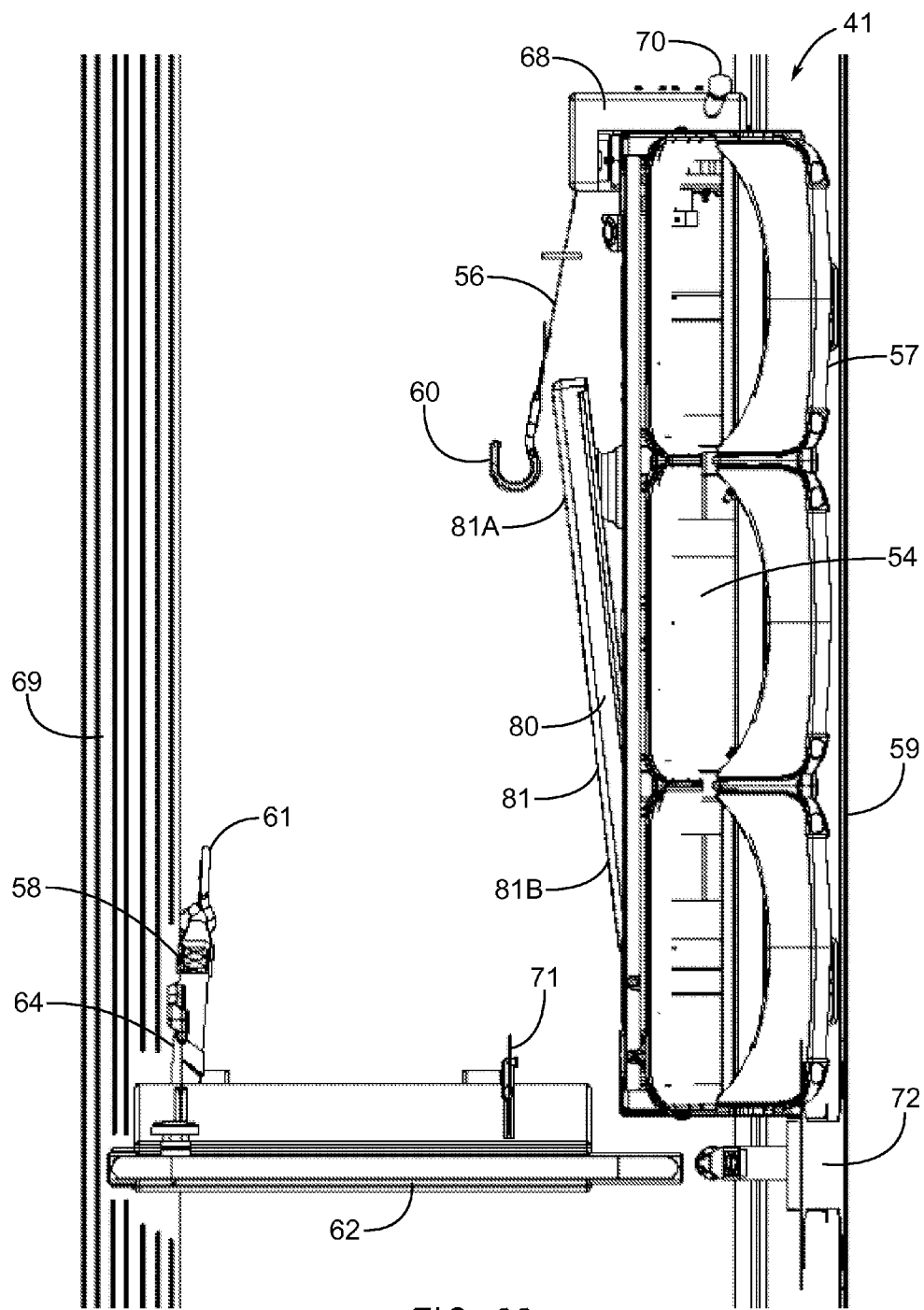
FIG. 11 is a top plan view of the mobility securement system of FIG. 2, shown with a single, articulated moveable bumper, such that one side of the moveable bumper extends further than the other side.

FIGS. 10 and 11 depict mobility securement system 41, as shown in FIG. 2, without any wheelchair or mobility device secured therein. Referring to FIG. 11, moveable bumper 80 is shown in an extended position, and includes contact surface 81, which has front portion 81A and rear portion 81B. Front portion 81A is extended farther from bus wall 59 than rear portion 81B. This causes moveable bumper 80 to be tilted, or articulated, such that its surface 81 may contact an angled or uneven surface of a wheelchair or mobility device, or two different surfaces that are not coplanar. Also shown in FIGS. 10 and 11 are flip down seat 54, underneath surface 53, seat back 57, front attachment member 56, front hook 60, vehicle anchor assembly 68, control lever 70, rear barrier 62, rear attachment member 58, rear hook 61, occupant seat belt female component 64, occupant seat belt male component 71, shoulder occupant seat belt 72 and aisle 69.

Figure 12:
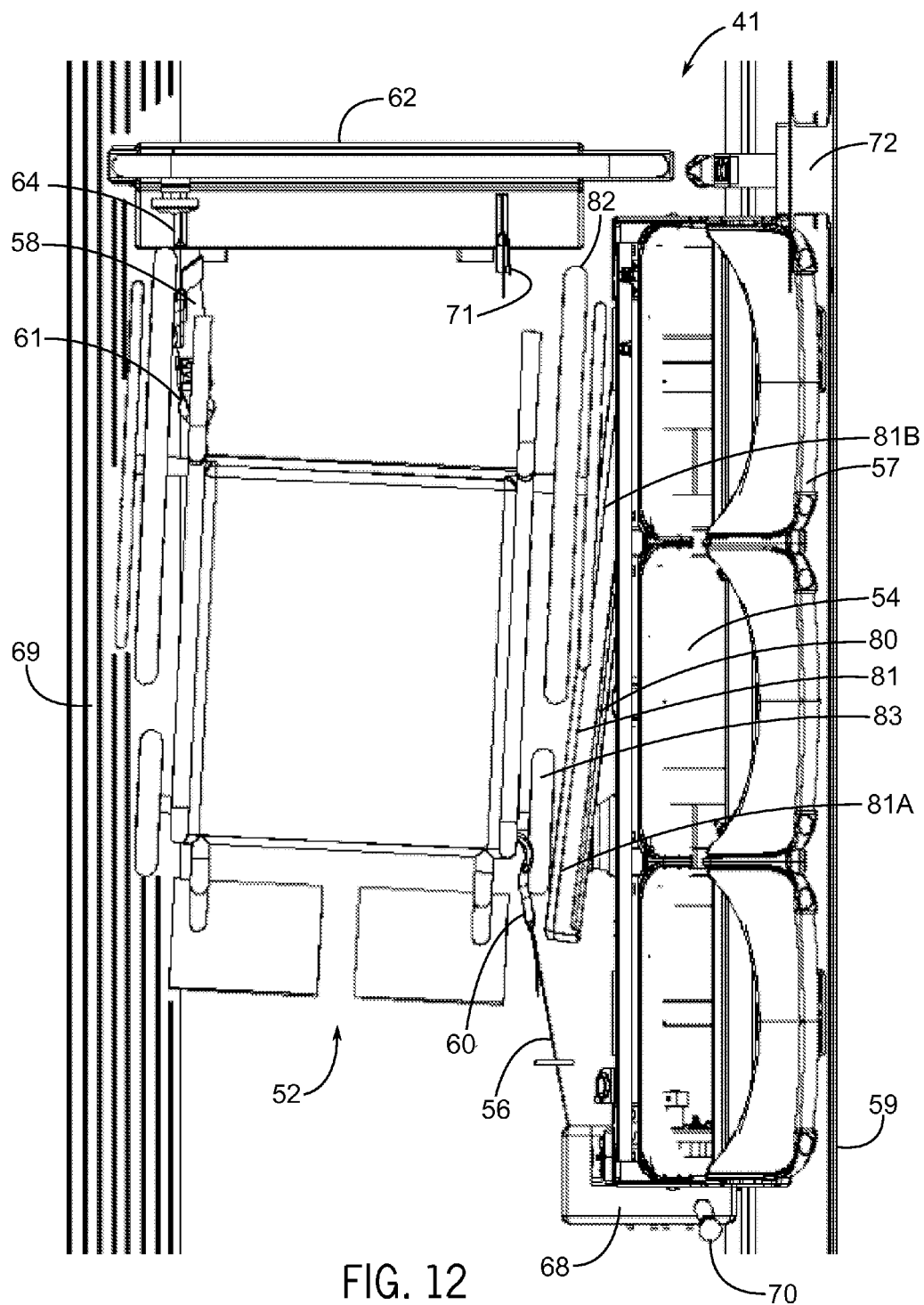
FIG. 12 is a top plan view of the mobility securement system of FIG. 2, shown with a single, articulated moveable bumper, such that one side of the moveable bumper extends further than the other side, with which a mobility device positioned at a skewed angle can be secured relative to the vehicle.
Figure 13:
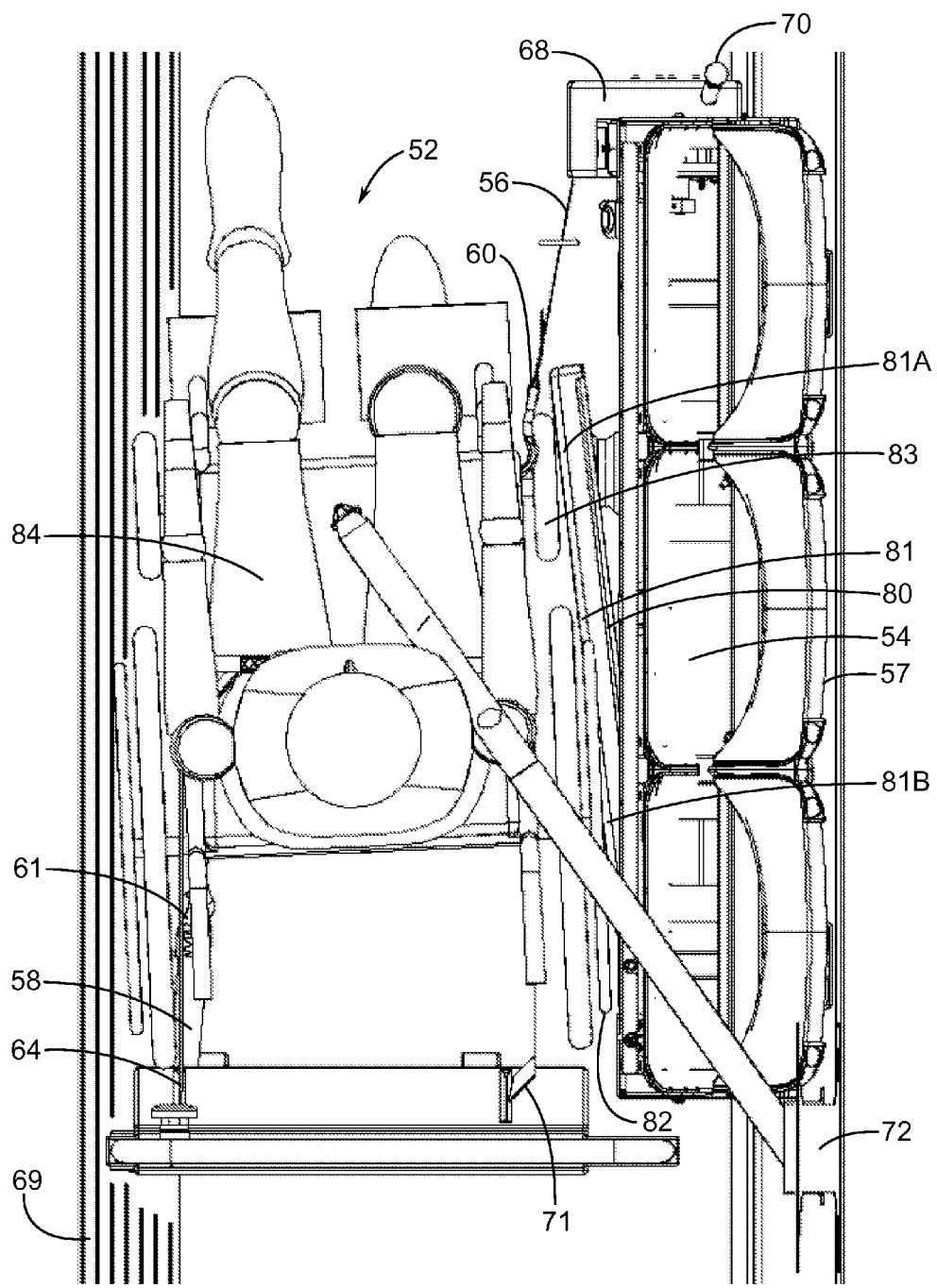
FIG. 13 is a top plan view of the mobility securement system of FIG. 2, shown with the one moveable bumper articulated, such that one side of the moveable bumper extends further than the other side, and a wheelchair secured at a skewed angle relative to the vehicle, in which an occupant is shown secured therewithin. This figure also shows the occupant shoulder belt partially deployed.

The benefits of this embodiment become more evident in FIG. 12, which shows a mobility device being secured therein. The mobility device 52 is secured at an angle, relative to the vehicle. Rear attachment member 58 is connected to mobility device 52, and acts to pull it towards rear barrier 62. Because there is only one rear attachment member 58, it is not necessary to have mobility device 52 secured in alignment with rear barrier 62. Thus, a mobility device may be secured in a skewed position. Moveable bumper 80 extends and articulates to contact both the mobility device rear wheel 82 and mobility device front wheel 83, which are not coplanar, and which are not parallel to bus wall 59. Front portion 81A of moveable barrier surface 81 is in contact with front wheel 83 of mobility device 52, while rear portion 81B is in contact with rear wheel 82 of mobility device 52. Moveable bumper 80 is further articulated to adjust to the skewed angle of mobility device 52. FIG. 13 shows a plan view of the same embodiment disclosed in FIG. 12, with an occupant 84 secured in the mobility device.

Figure 14:
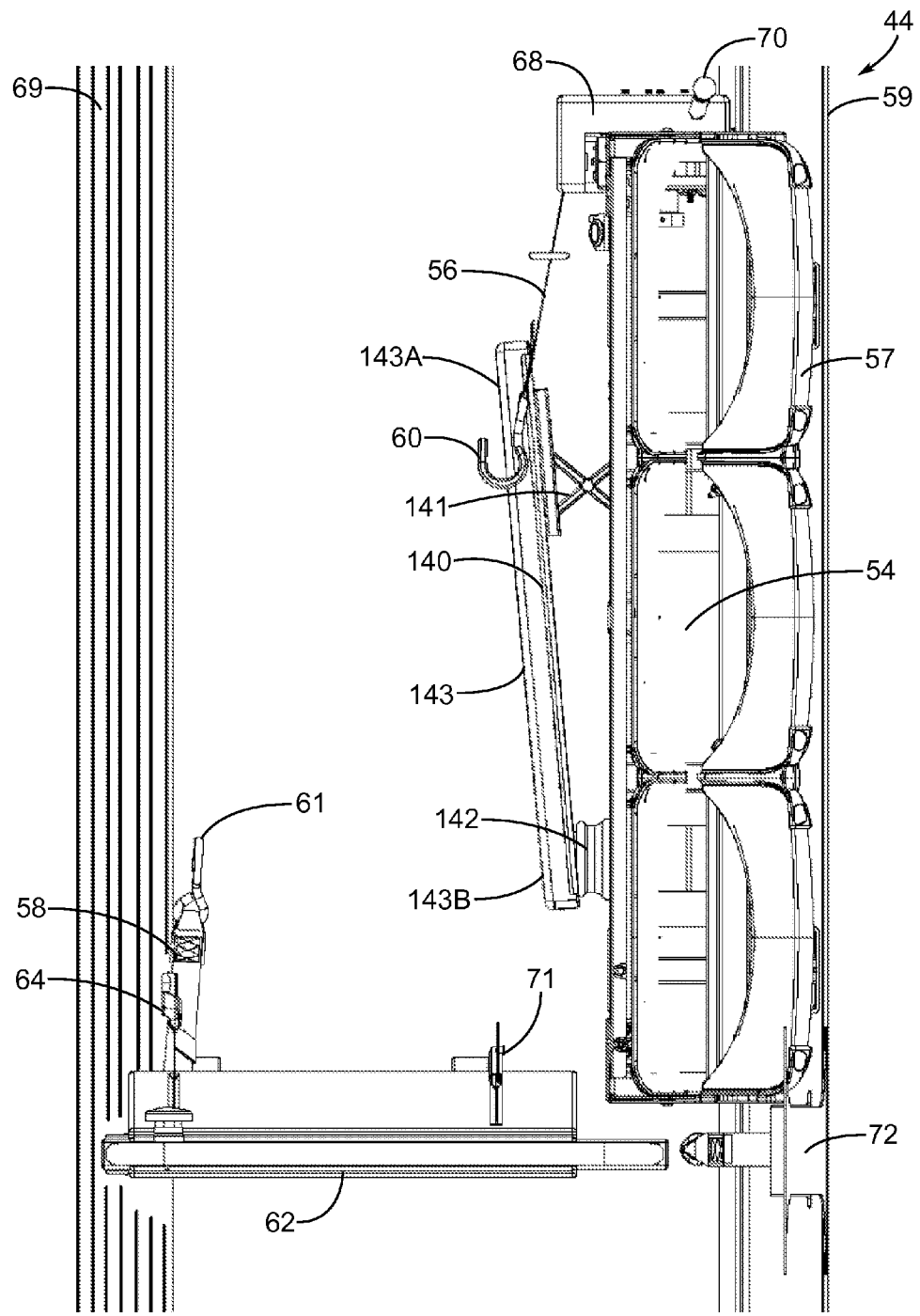
FIG. 14 is a top plan view of another embodiment of a mobility securement system of the present invention, with one articulated moveable side having different structures for extending each side of the moveable bumper, including one air spring and one scissors support.

FIG. 14 depicts a configuration similar to FIG. 12, but shows two different structures which may be used in association with mobility securement system 44. In this embodiment, moveable bumper 140 contains a contact surface 143, having a front portion 143A and a rear portion 144B. Moveable bumper 140 is connected to first support 141 and second support 142. First support 141 comprises two bars in a scissors configuration; second support 142 comprises an air spring. Each of first support 141 and second support 142 are capable of independent movement, and thus front portion 143A of contact surface 143 may be extended farther from bus wall 59 in comparison to rear portion 143B, forming a skewed contact angle for contact surface 143 of moveable bumper 140.

Figure 15:
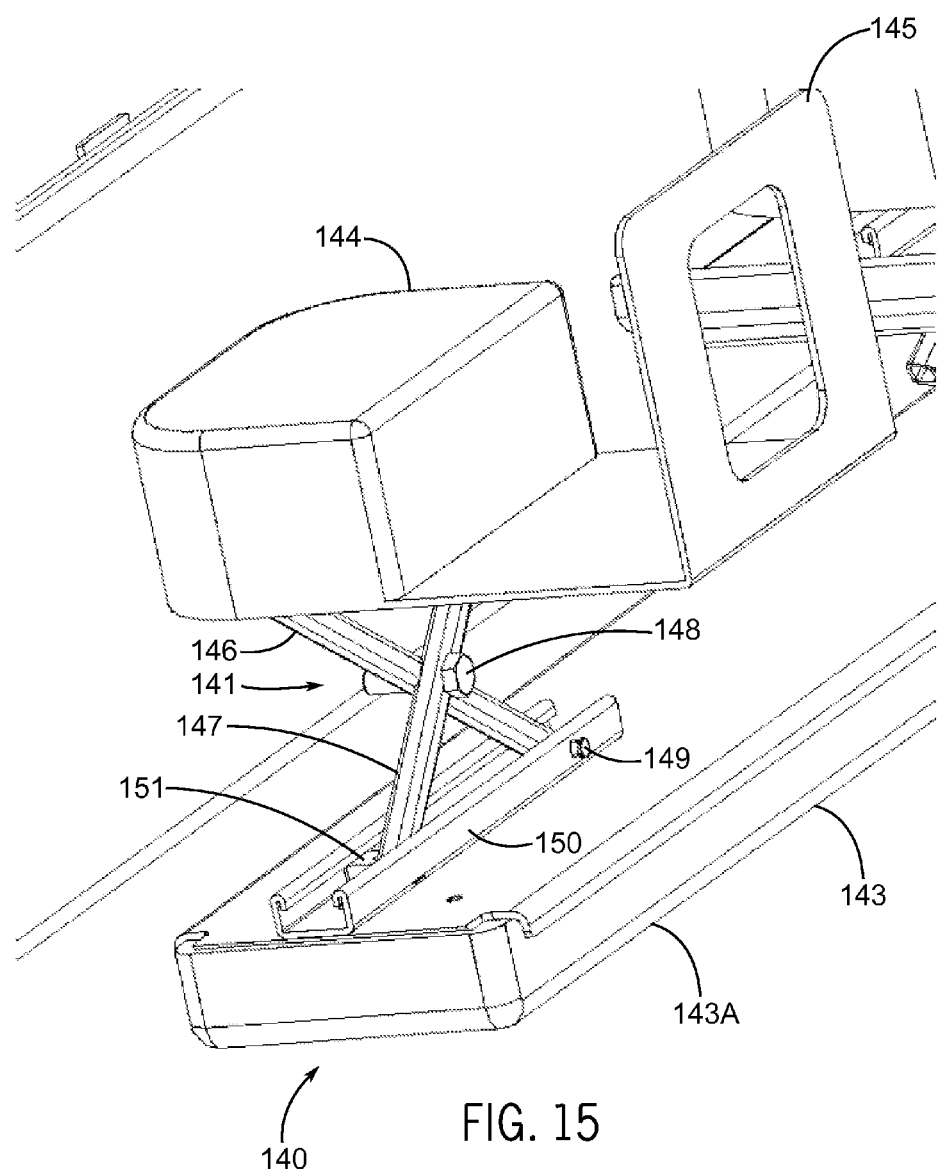
FIG. 15 is a close-up perspective view of the scissors support assembly shown in the embodiment of the invention disclosed in FIG. 14.

FIG. 15 shows a close-up view of one of the support structures, support bars in a scissors configuration, of the embodiment shown in FIG. 14. Scissors support 141 comprises stationary bar 146 and sliding bar 147, which are each attached to support base 144. Support base 144 includes frame support 145 for a seat back and flip down seats, and further includes a means to move sliding bar 147. Pin 148 keeps each of stationary bar 146 and sliding bar 147 in a scissors position. Pin 149 keeps stationary bar 146 in a stationary position relative to track 150. When sliding bar 147 is moved, it moves sliding member 151, which slides along track 150. This movement allows moveable bumper 140 to extend and retract relative to base 144.

Figure 16:
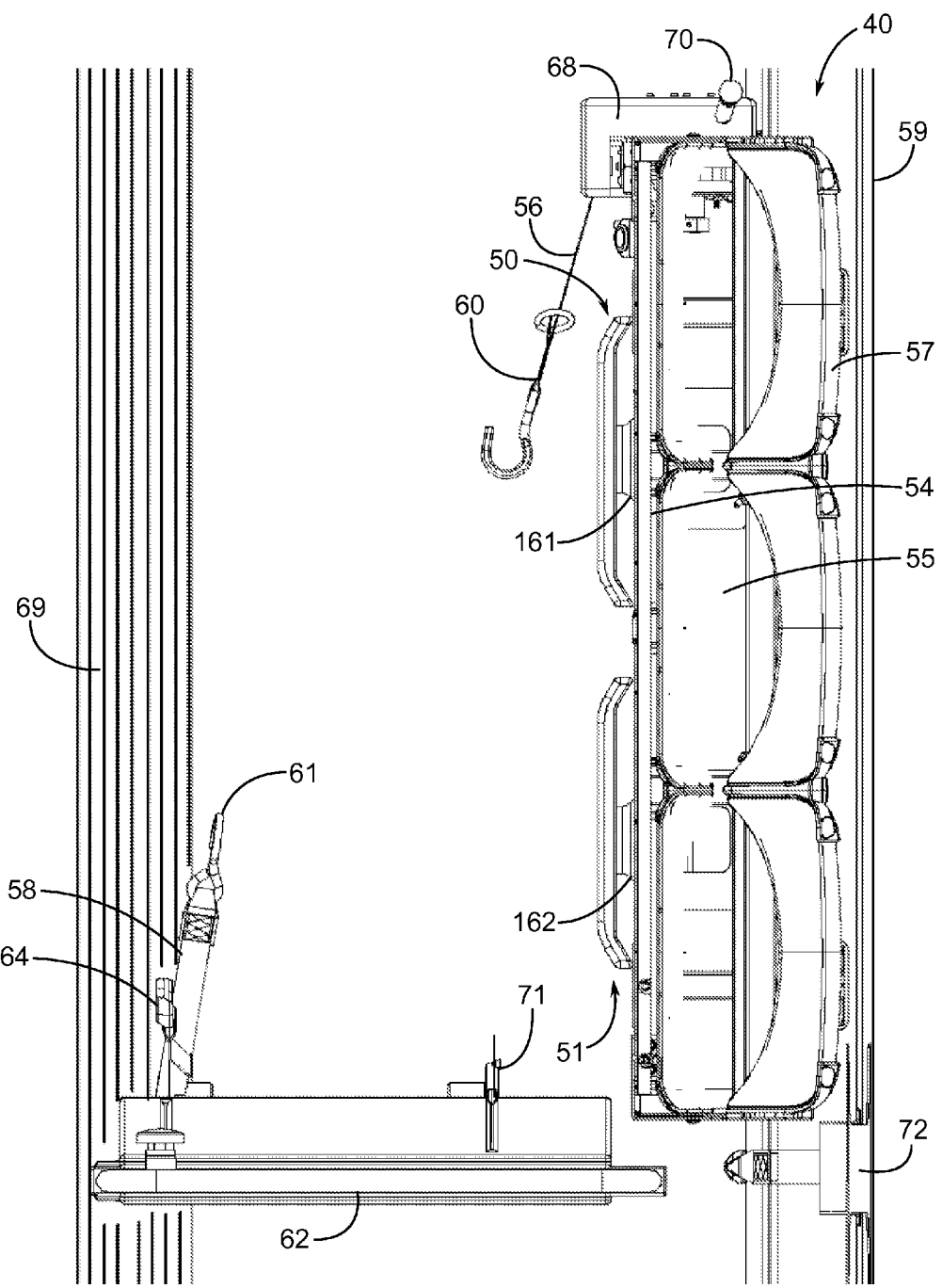
FIG. 16 is a top plan view of the mobility securement system of FIG. 1, showing the two side bumpers in their stored positions.
Figure 17:
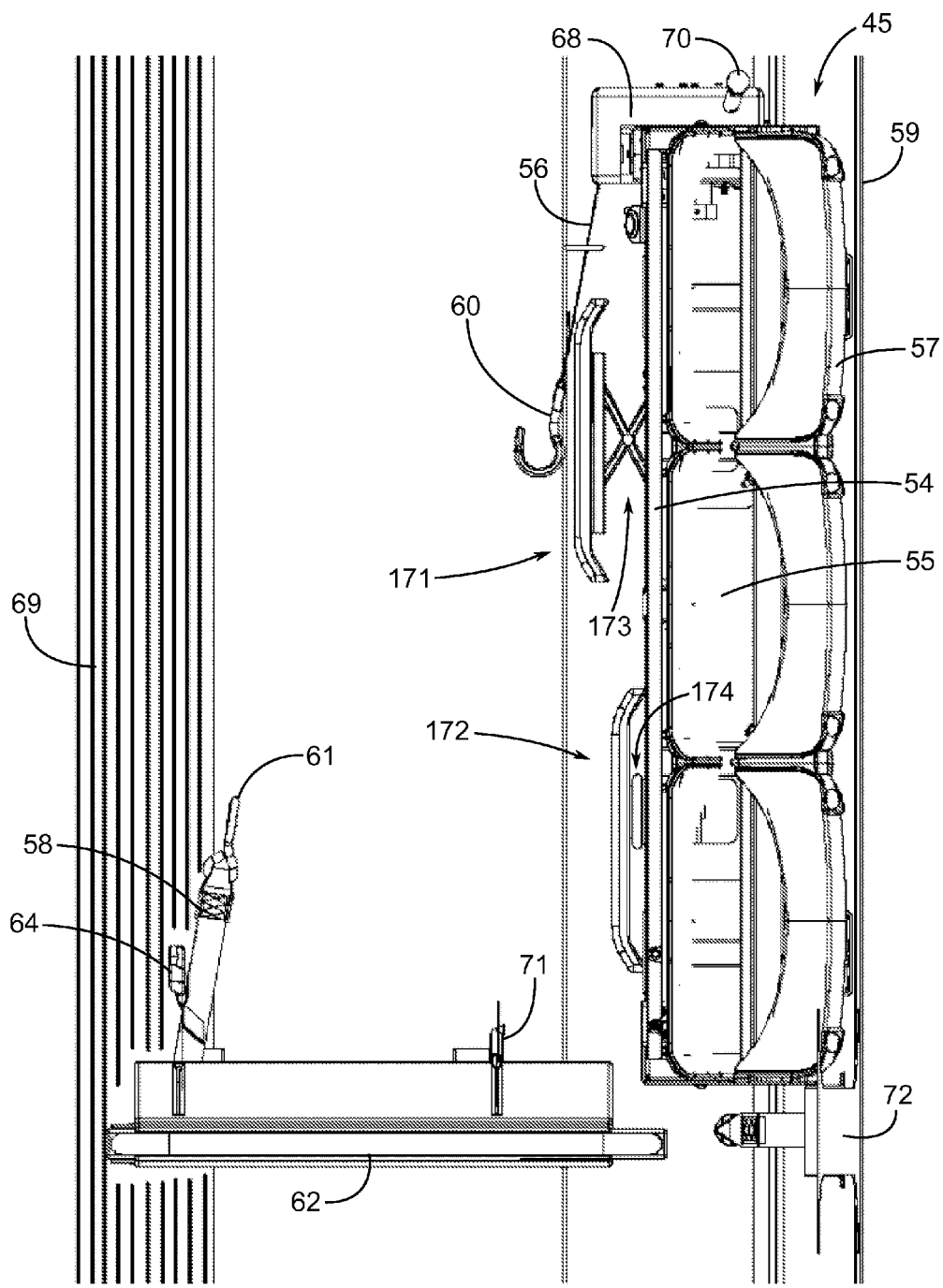
FIG. 17 is a top plan view of another embodiment of a mobility securement system of the present invention, in which two extendable and articulatable side bumpers utilize different structures for extension of each, one via air spring and one via scissors support.
Figure 18:
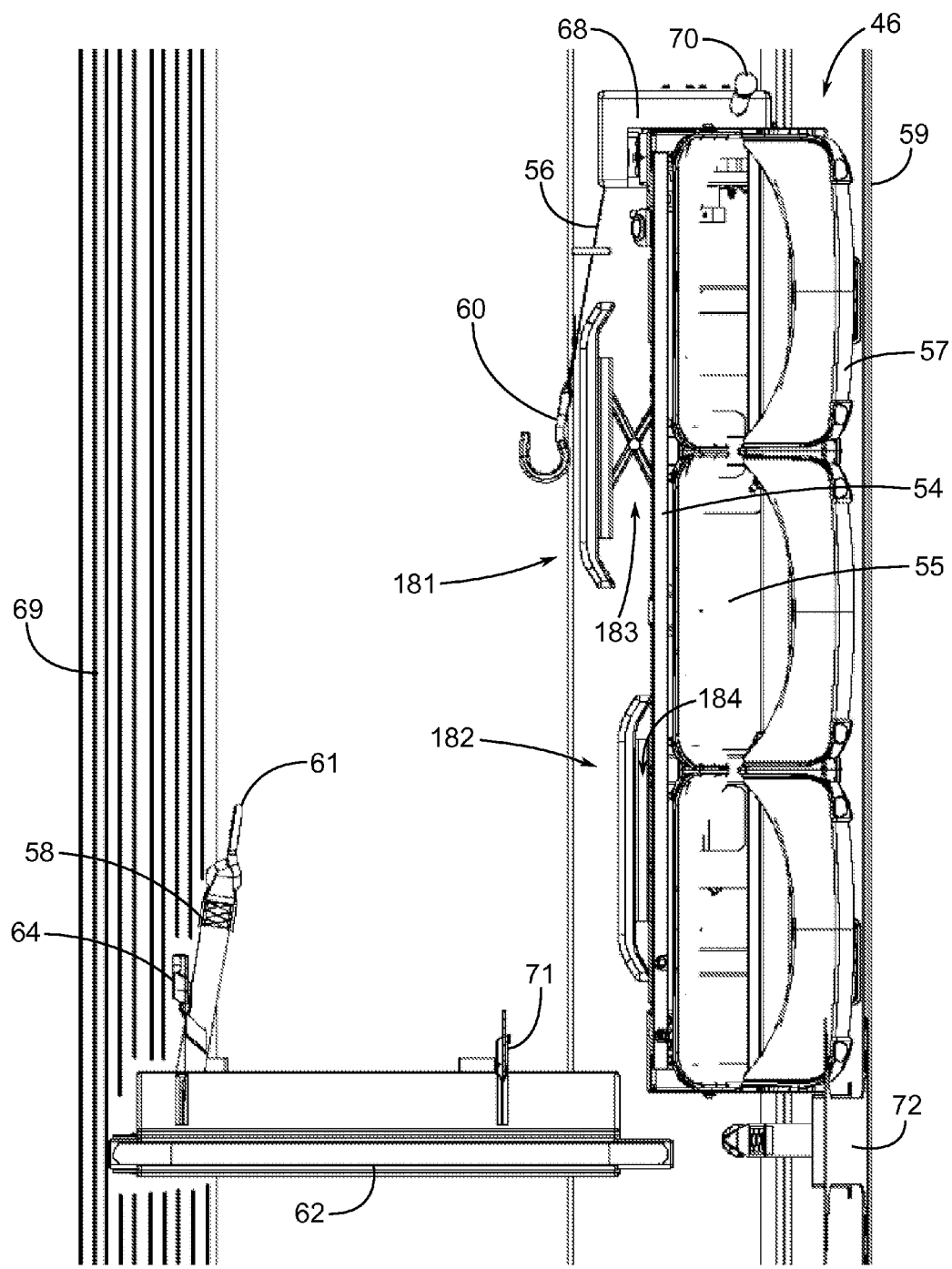
FIG. 18 is a top plan view of another embodiment of a mobility securement system of the present invention, with two moveable side bumpers, each having a scissors support.

As shown in FIGS. 16-20, the supports for moveable bumpers may be of different structures, in different combinations, and may each extend, and in some cases, may articulate, to provide a different contact angle. FIG. 16 shows mobility securement system 40 disclosed in FIGS. 1 and 3. Each of moveable bumpers 50 and 51 are in a recessed position. Each of first support 161 and second support 162 are air springs. As shown in FIG. 17, mobility securement system 45 comprises first moveable bumper 171 and second moveable bumper 172, which are attached to first support 173 and second support 174, respectively. First support 173 comprises support bars in a scissors configuration, while second support 174 is an air spring. First moveable bumper 171 is shown in an extended position. FIG. 18 shows mobility securement system 46, which includes first moveable bumper 181 and second moveable bumper 182, which are attached to first support 183 and second support 184, respectively. Each of first support 183 and second support 184 include support bars in a scissors configuration. First support 183 is extended such that first moveable bumper 181 is farther from bus wall 59, relative to second moveable bumper 182.

Figure 19:
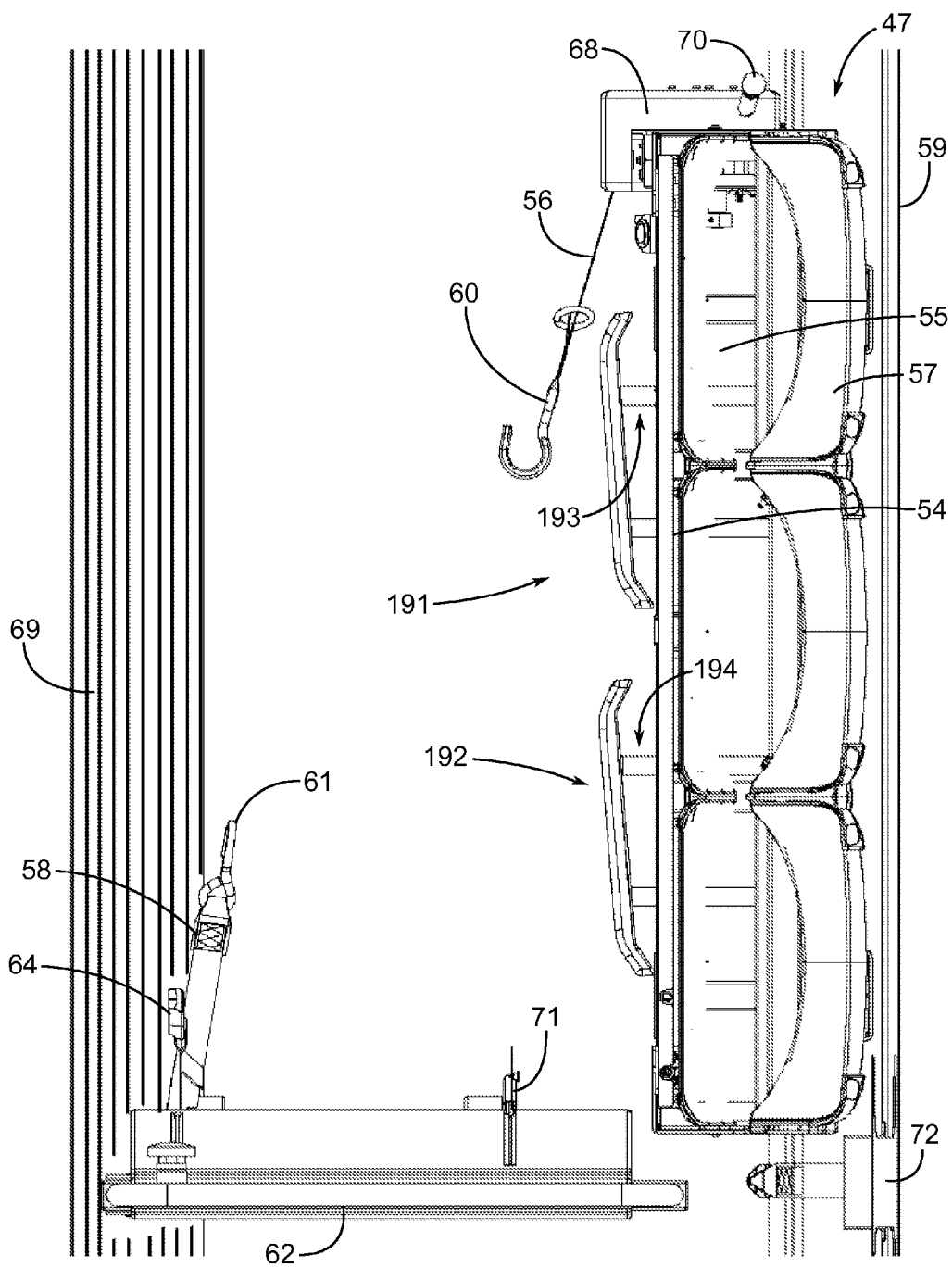
FIG. 19 is a top plan view of another embodiment of a mobility securement system of the present invention, with two moveable side bumpers, each having a two-bar extendible support.
Figure 20:
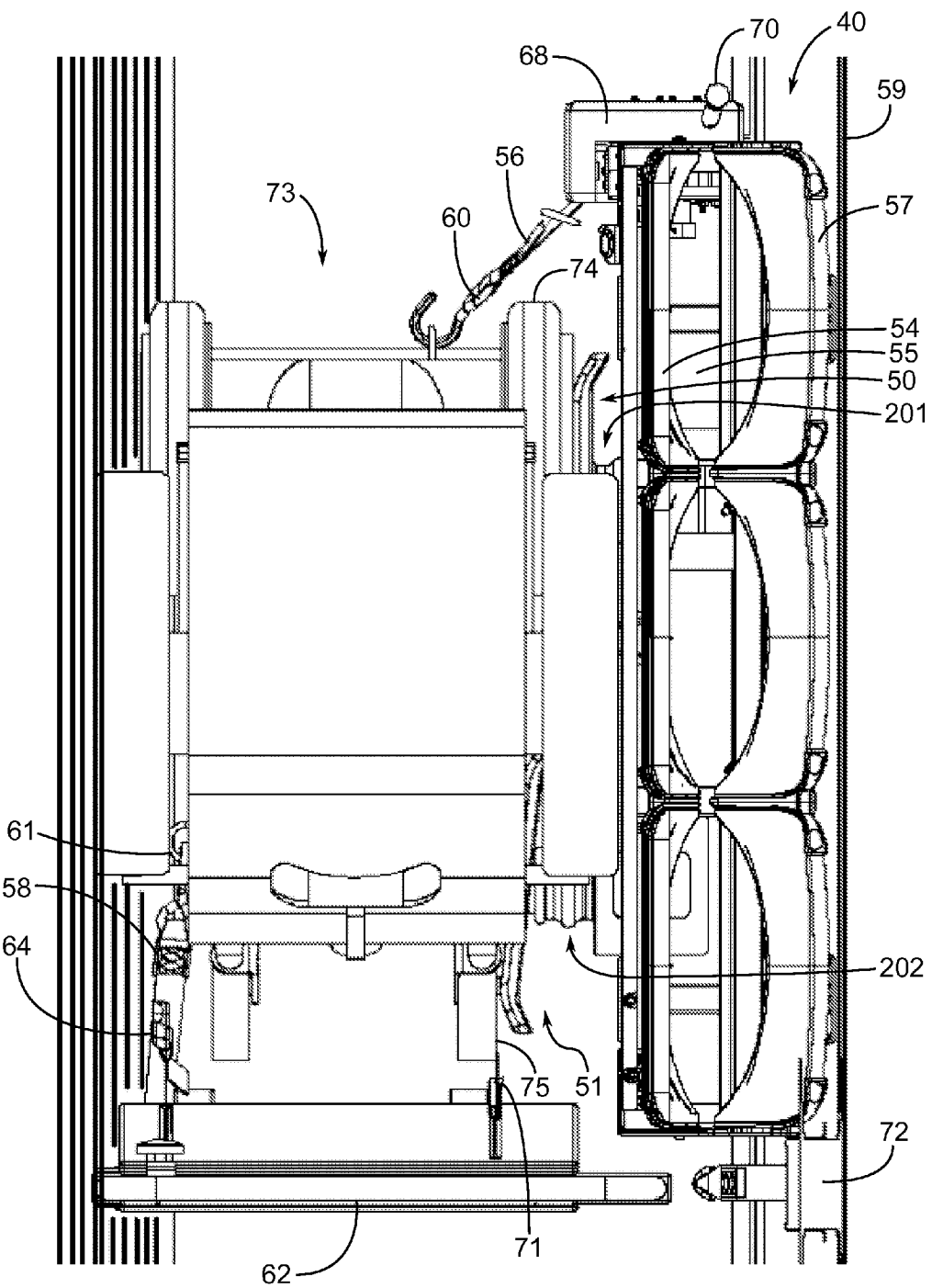
FIG. 20 is a top plan view of the mobility securement system of FIG. 1, used to secure a motorized mobility device having uneven surfaces, in which each of the two moveable bumpers can be extended to a different length, and in which one of the moveable bumpers is shown articulated to contact the uneven surface of the motorized mobility device.

As shown in FIG. 19, mobility securement system 47 includes first moveable bumper 191 and second moveable bumper 192, which are attached to first support 193 and second support 194, respectively. Each of first support 193 and second support 194 comprise support bars in a two bar configuration, with each of the two bars being able to move independent from one another. This allows each of first moveable barrier 191 and second moveable barrier 192 to extend away from bus wall 59, and also at different angles. Furthermore, the angle at which first moveable bumper 191 is articulated may not be the same angle at which second moveable bumper 192 is articulated. An advantage of this independent movement of each moveable bumper, and the bumpers' ability to articulate its contact angle, is evident in FIG. 20. First moveable bumper 50 and second moveable bumper 51 are connected to first supports 201 and second support 202, respectively, which are each air springs. First moveable bumper 201 is extended to meet the surface of front wheel 74 of motorized mobility device 73. Second moveable bumper 202 is both extended and articulated to meet the surfaces of rear wheel 75 and side portion 78 (not shown) of motorized mobility device 73. Notably, rear wheel 75 and side portion 78 are not coplanar. This arrangement provides for additional securement of motorized mobility device 73, with forces from multiple directions, applied to different areas.

Figure 21:
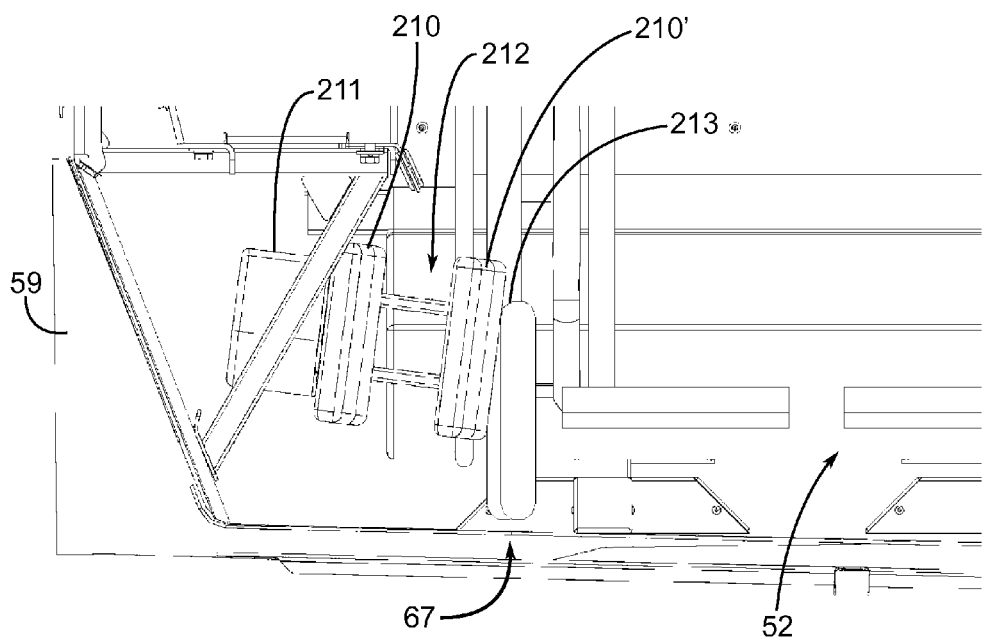
FIG. 21 is an elevated front view of another embodiment of the present invention, showing a moveable bumper that extends and applies an angularly downward force upon the mobility device.
Figure 22:
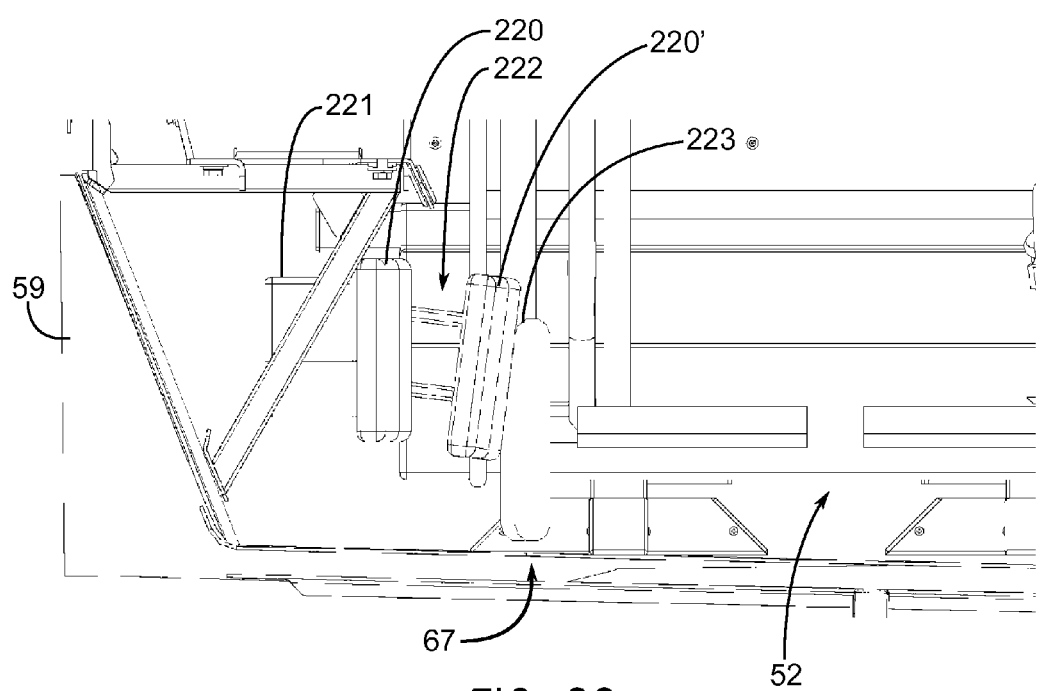
FIG. 22 is an elevated front view of another embodiment of the present invention, showing a moveable bumper that both extends and articulates downwardly, to apply an angularly downward force upon the mobility device.

FIGS. 21 and 22 show different ways a moveable bumper may apply a downward force against a wheelchair or mobility device. As shown in FIG. 21, moveable bumper 210 is used to secure mobility device 52, by contact with front wheel 67, in position of moveable bumper 210'. Moveable bumper 210' meets front wheel 67 at angled wheel contact surface 213, such that moveable bumper 210' applies a downward force upon front wheel 67. The downward force offers additional stability to secure mobility device 52 against movement. The angle at which moveable bumper 210 contacts front wheel 67, at position 210', is fixed. Moveable bumper 210 is connected by support 212 to base 211. In this embodiment, base 211 is mounted at an angle, such that when support 212 extends, without articulation, moveable bumper 210 in position 210' contacts front wheel 67 at an angle. In contrast, FIG. 22 shows mobility device 52 being secured by moveable bumper 220, which contacts front wheel 67 at angled wheel contact surface 223, at the same angle as shown in FIG. 21. However, in contrast to base 211, which is mounted at an angle, as shown in FIG. 21, base 221 in FIG. 22 is mounted in a position that is vertical and parallel to bus wall 59. Moveable bumper 220 contacts front wheel 67 in position 220' at an angle, due to the articulation caused by support 222. As shown in FIG. 22, support 222 articulates moveable bumper 220 through the support members' uneven extension from base 221.

Figure 23:
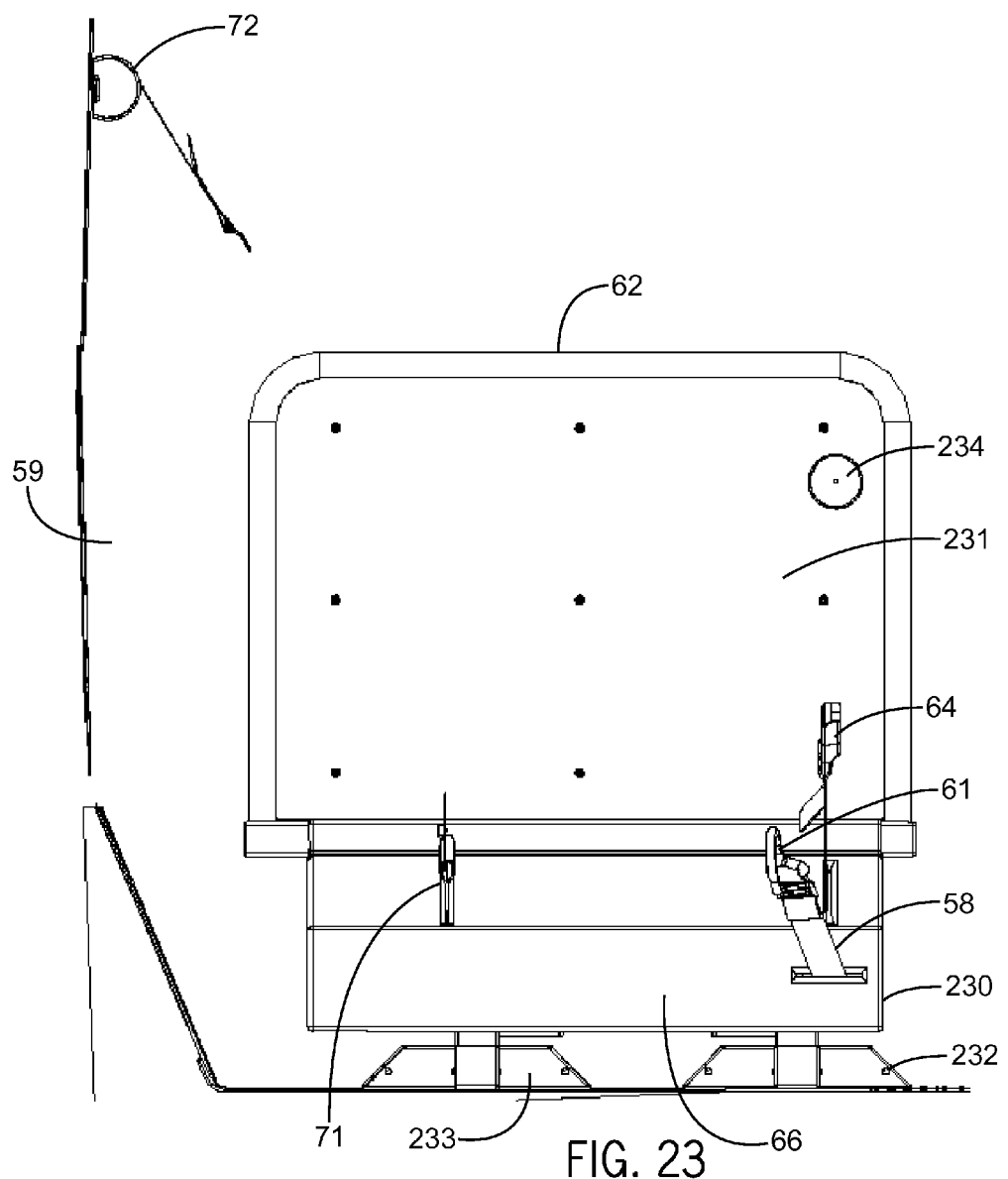
FIG. 23 is an elevated front view of a rear barrier and shoulder occupant seat belt assembly used in the present invention.
Figure 24:
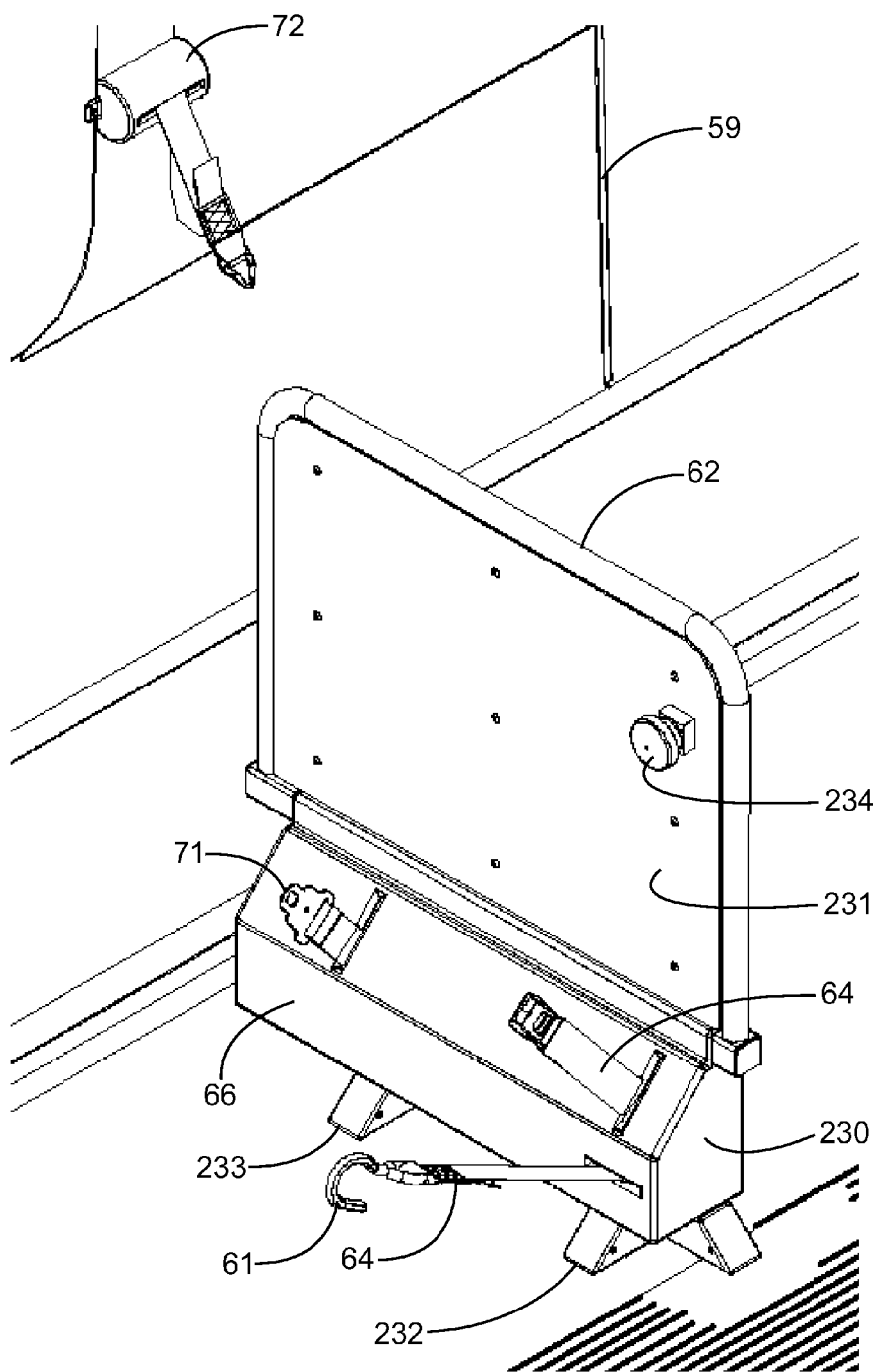
FIG. 24 is a perspective view of the rear barrier and shoulder occupant seat belt assembly disclosed in FIG. 23.
Figure 25:
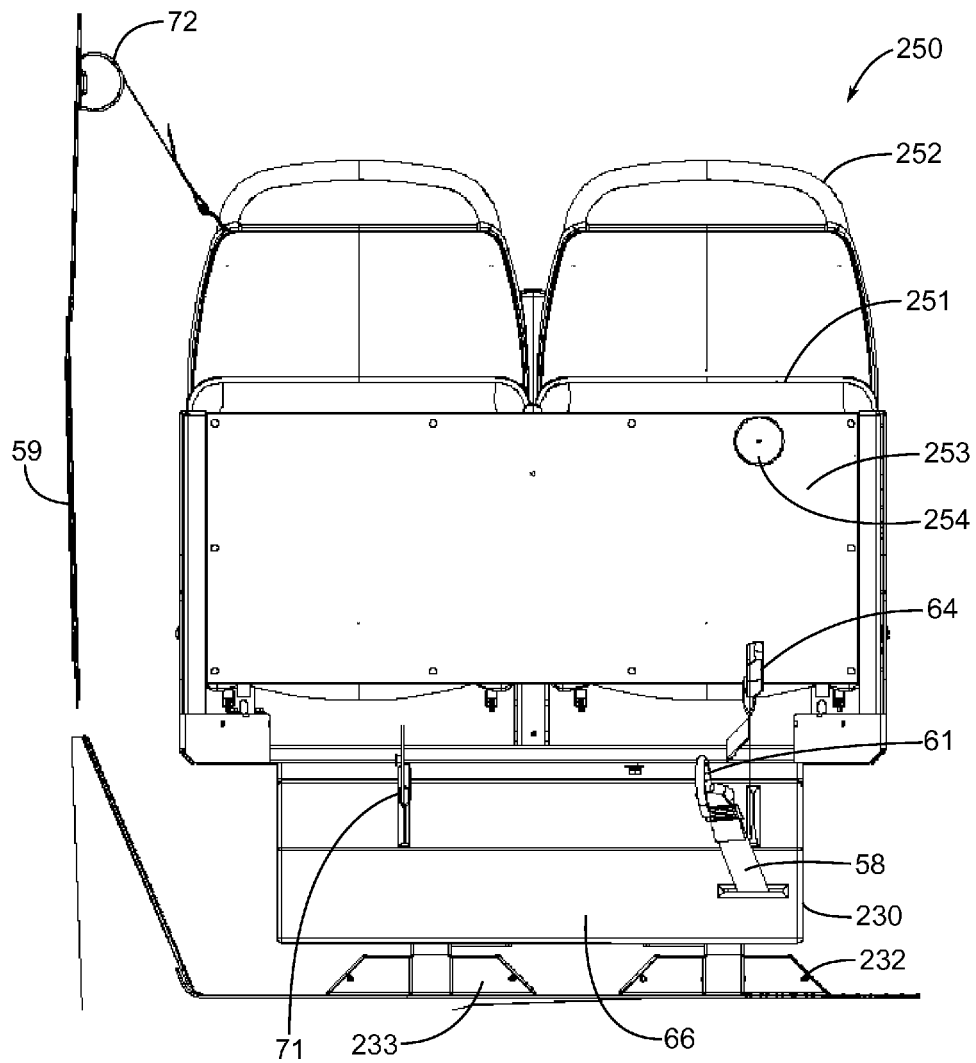
FIG. 25 is an elevated front view of another rear barrier and shoulder occupant seat belt assembly used in the present invention, with the rear barrier having two fold-away seats.
Figure 26:
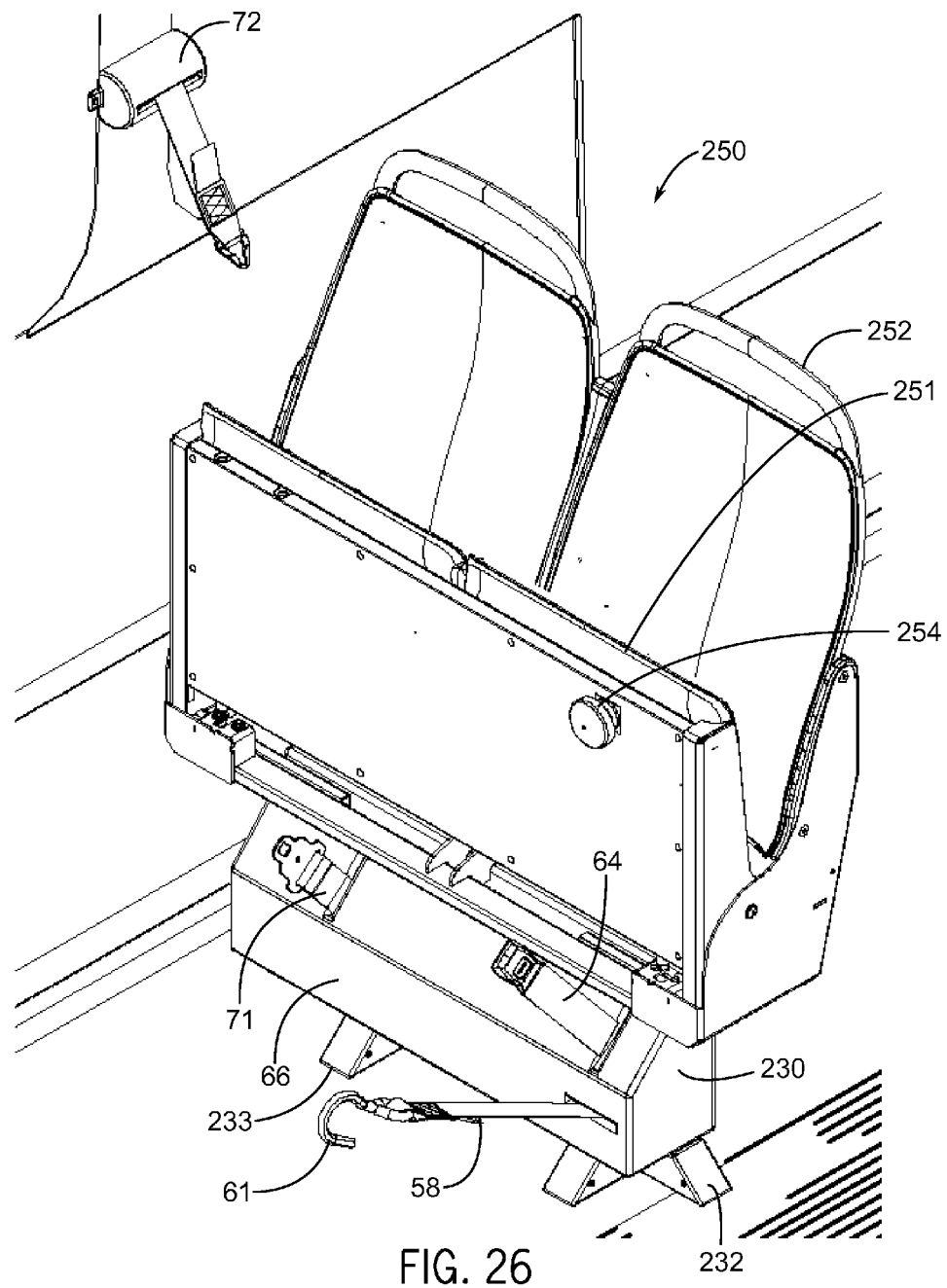
FIG. 26 is a perspective view of the rear barrier and shoulder occupant seat belt disclosed in FIG. 25.

FIGS. 23-26 show different rear barriers that may be used in association with the present invention. As shown in FIGS. 23 and 24, rear barrier 62 comprises vehicle anchor assembly 230 having contact surface 66. Rear barrier 62 further comprises partition 231, first support legs 232, second support leg 233, rear attachment member 58, occupant seat belt female component 64, occupant seat belt male component 71, and shoulder occupant seat belt 72. Control knob 234 controls the tensioning system that is contained within rear barrier 62, as well as any supplemental tensioning system that may also be contained therewithin. Rear barrier 250 shown in FIGS. 25 and 26 includes the same features of vehicle anchor assembly 230 shown in FIGS. 23 and 24. In addition, rear barrier 250 comprises flip down seat 251 having an underneath surface 253. Rear barrier 250 further includes seat back 252 and control knob 254.

Figure 27:
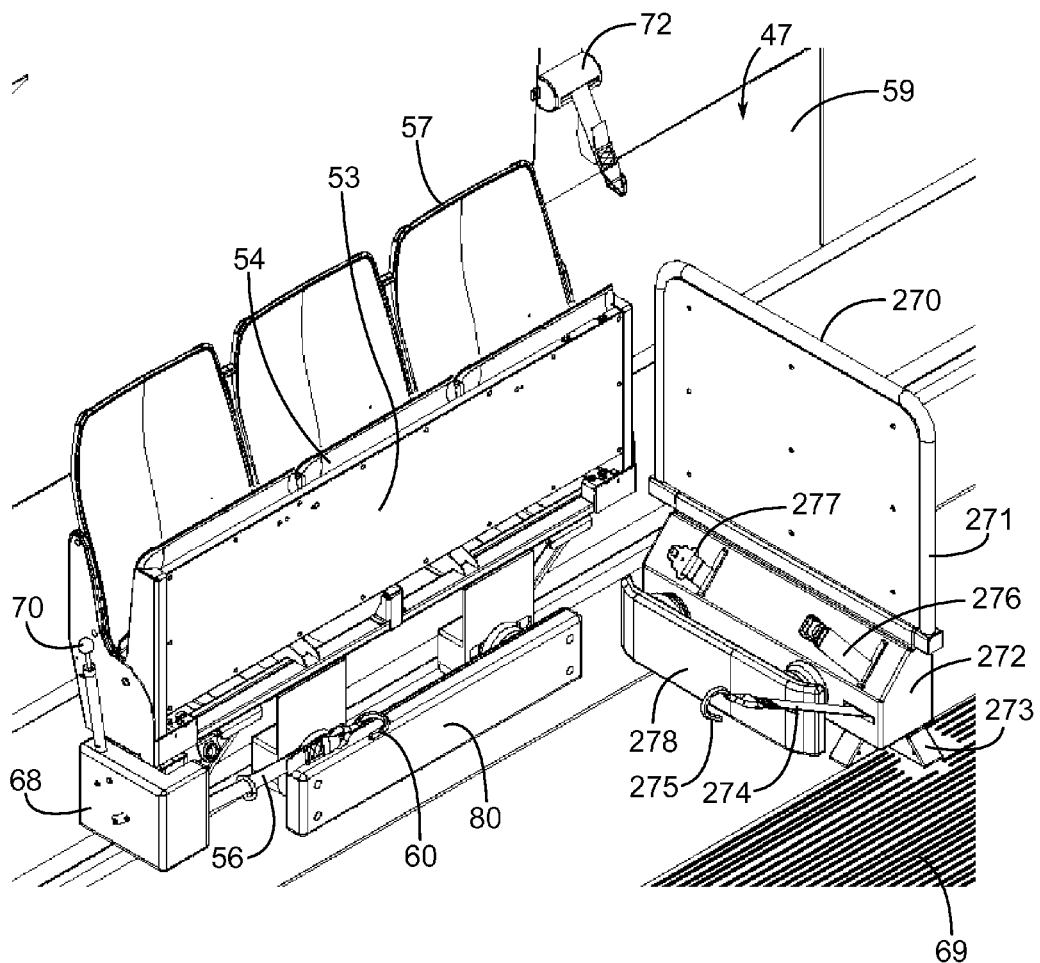
FIG. 27 is a perspective view of another embodiment of the mobility securement system of the present invention, with one moveable side bumper, and one moveable rear barrier bumper.
Figure 28:
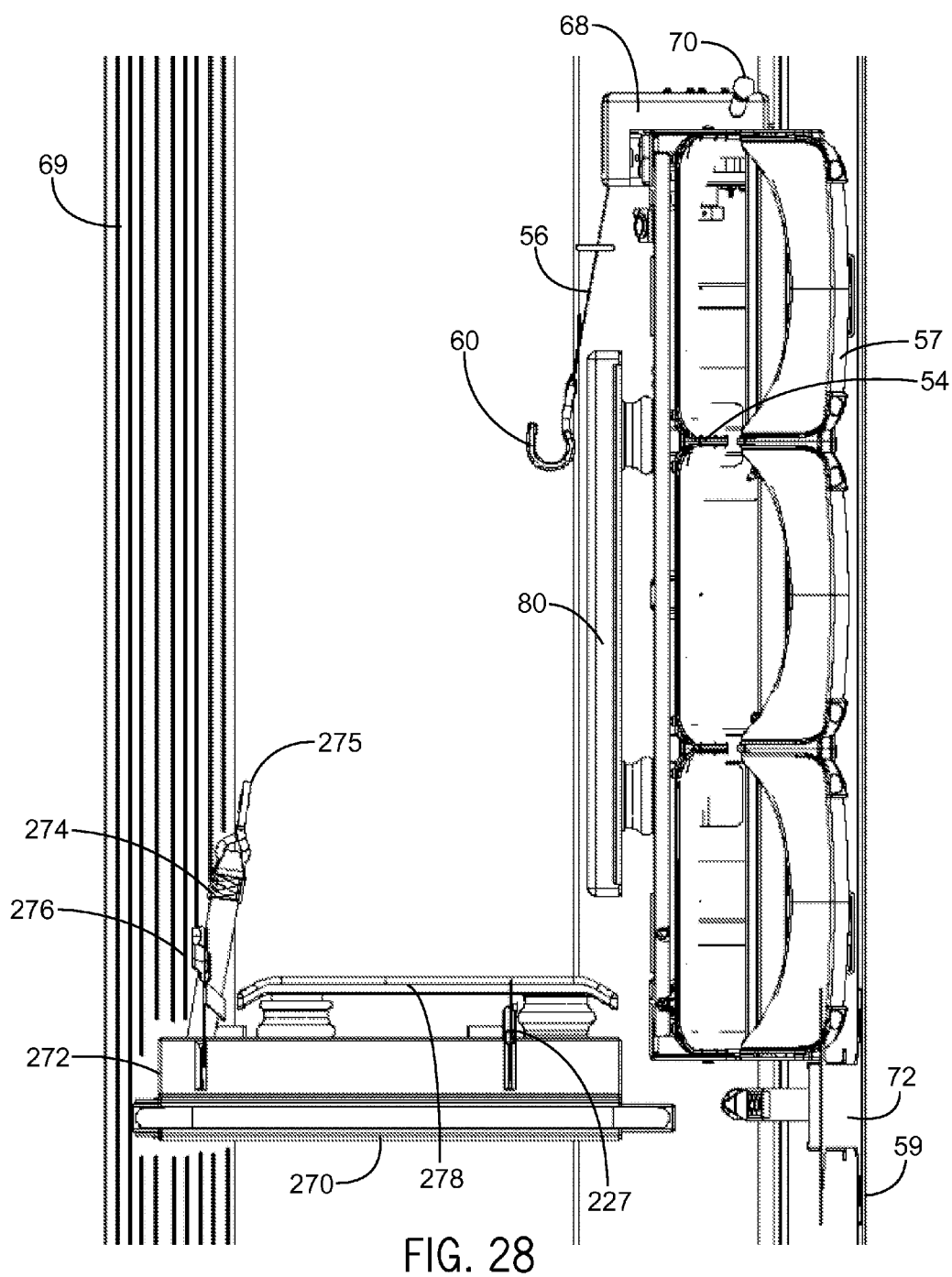
FIG. 28 is a top plan view of the embodiment of the invention disclosed in FIG. 27.

The rear barrier may further include a moveable bumper, or it may itself move. As shown in FIGS. 27 and 28, rear barrier 270 may further include rear moveable bumper 278, the structures and capabilities of which are explained earlier in association with other moveable bumpers of the present invention. As shown in FIG. 27, rear barrier 270 includes partition 271, vehicle anchor assembly 272, support leg 273, rear attachment 274, rear hook 275, occupant seat belt female component 276, occupant seat belt male component 277 and rear moveable bumper 278. Rear moveable bumper 278 may extend to apply a force upon the rear of a wheelchair or other mobility device.

Figure 29:
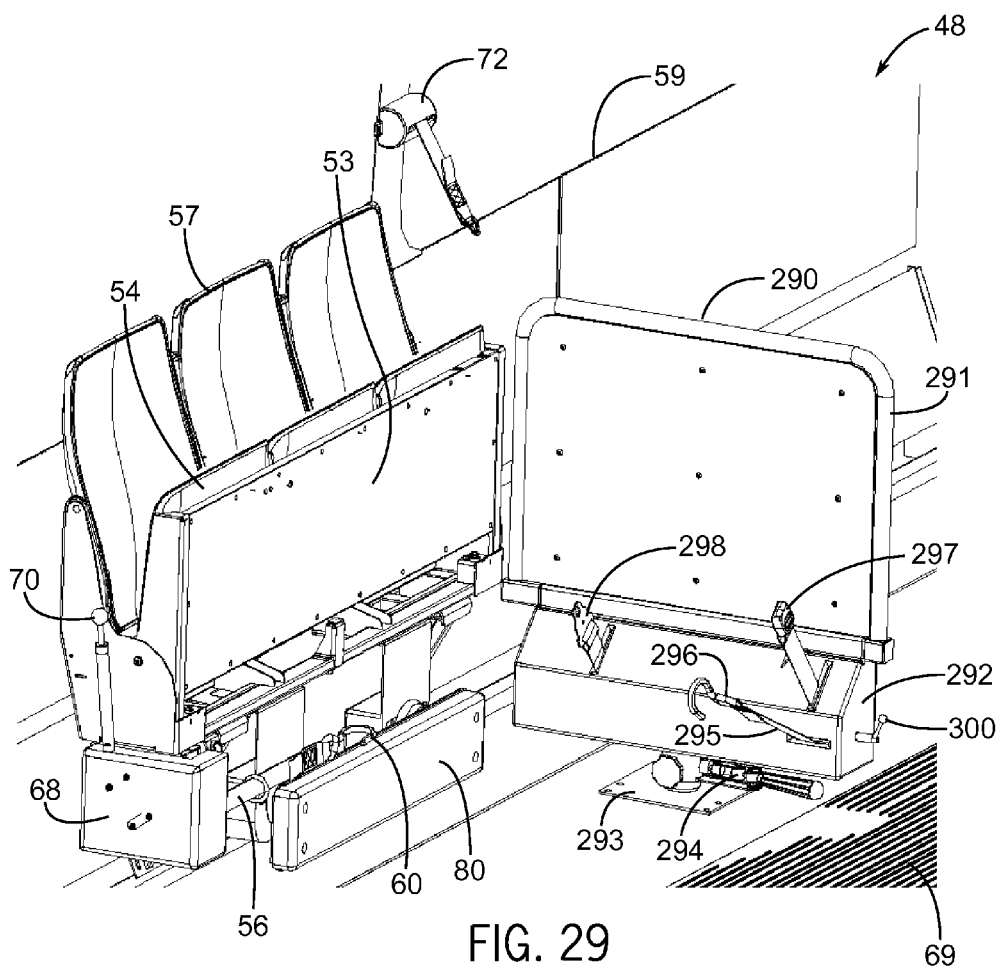
FIG. 29 is a perspective view of another embodiment of the present invention, in which the rear barrier is configured to swivel about either or both of a vertical or horizontal axis, to contact a mobility device or other securement device at a skewed angle.
Figure 30:
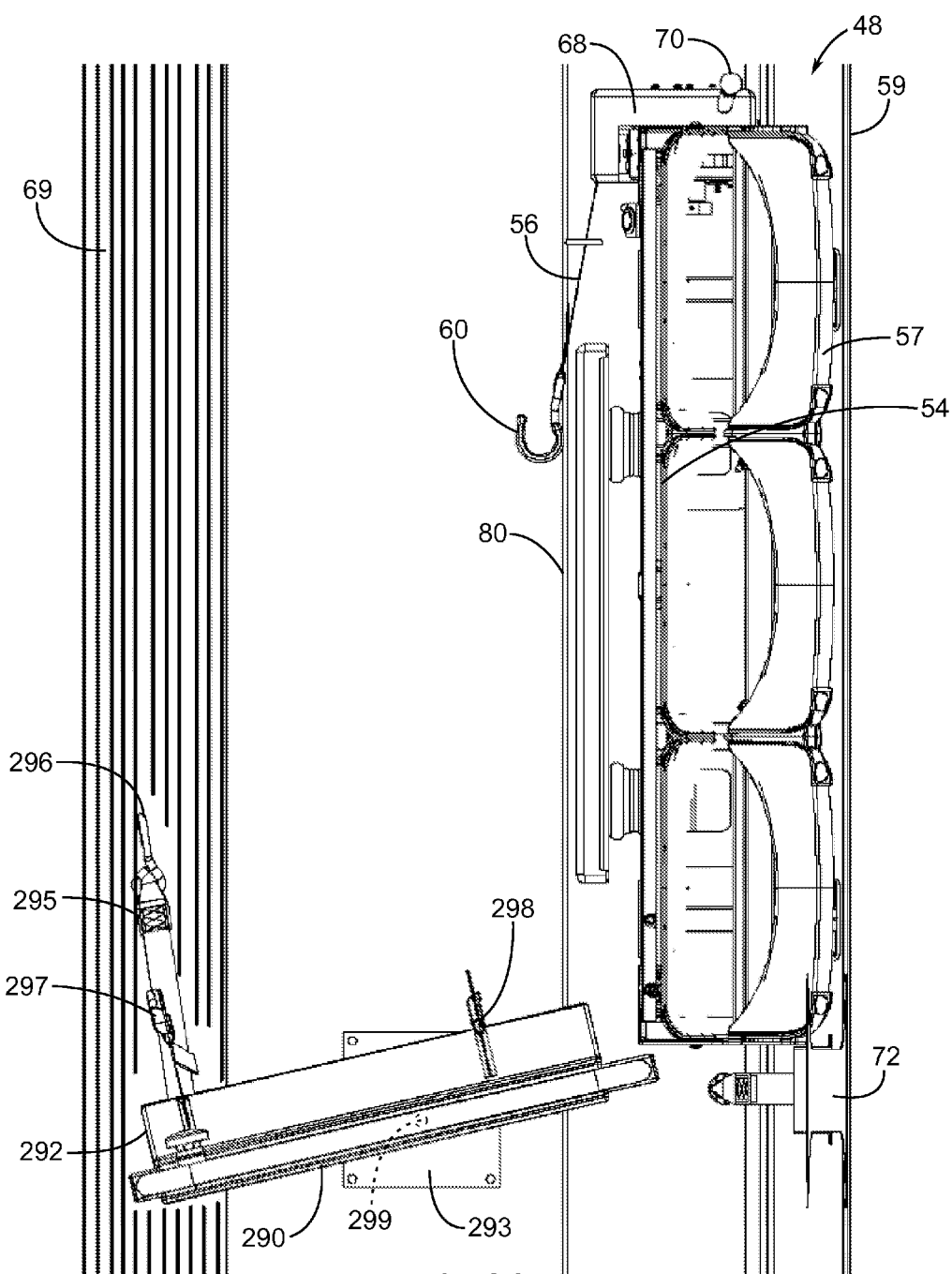
FIG. 30 is a top plan view of the embodiment of the invention disclosed in FIG. 29.

As shown in FIGS. 29 and 30, mobility securement system 48 includes rear barrier 290, which is comprised of partition 291 and vehicle anchor assembly 292. It is supported by rotating support member 293, and locking handle 294, which allows rear barrier 290 to rotate about pivot axle 299 (FIG. 30), and then lock into place, such that it can contact the rear of a wheelchair or mobility device that may be skewed at an angle. Vehicle anchor assembly 292 includes rear attachment 295, rear hook 296, occupant seat belt female component 297 and occupant seat belt male component 298. Barrier 290 can likewise be constructed to pivot forwardly along a pivot axle at control 300.

Figure 31:
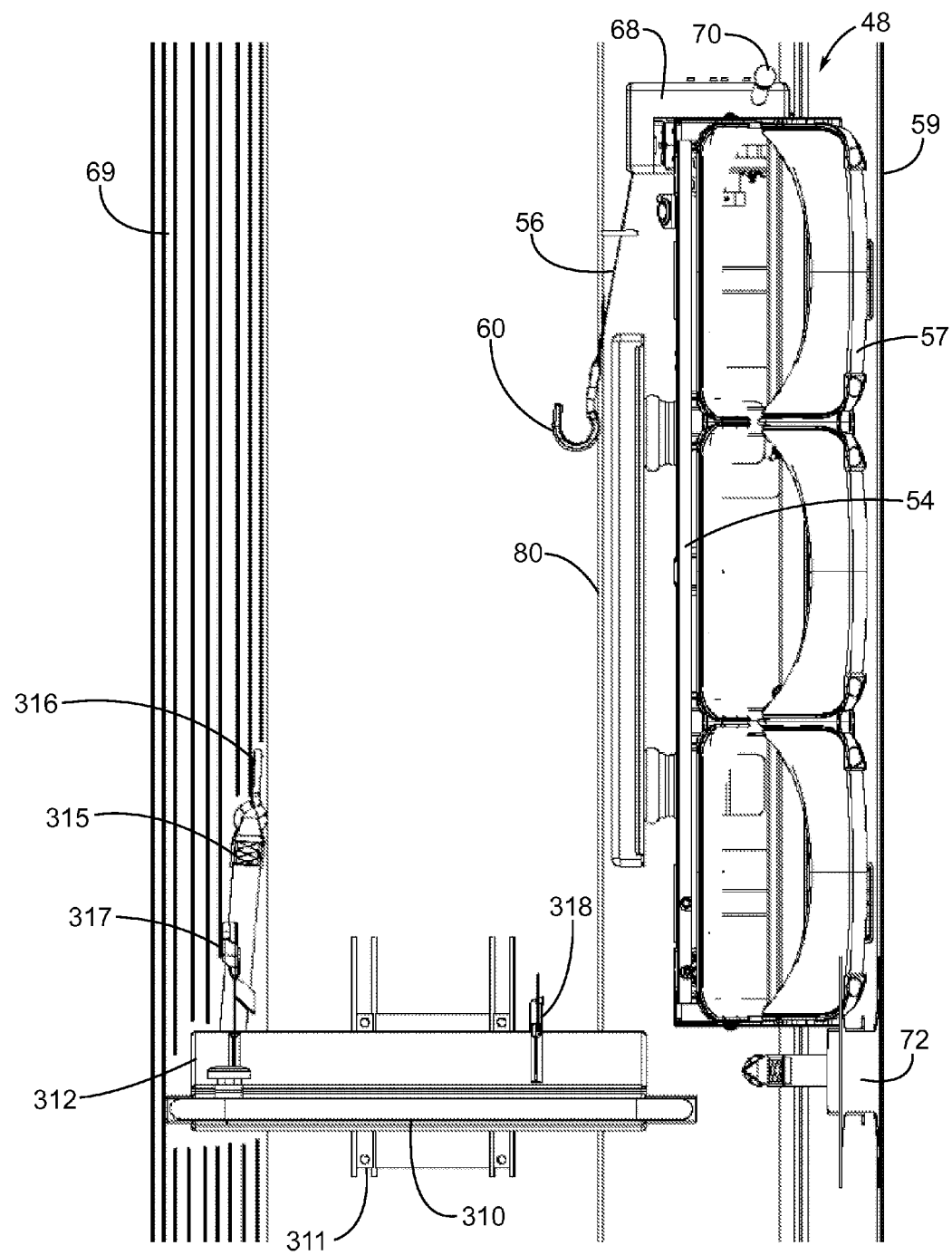
FIG. 31 is a top plan view of another embodiment of the present invention, in which the rear barrier is configured to translate forwards and backwards, to contact a wheelchair or other mobility device.
Figure 32:
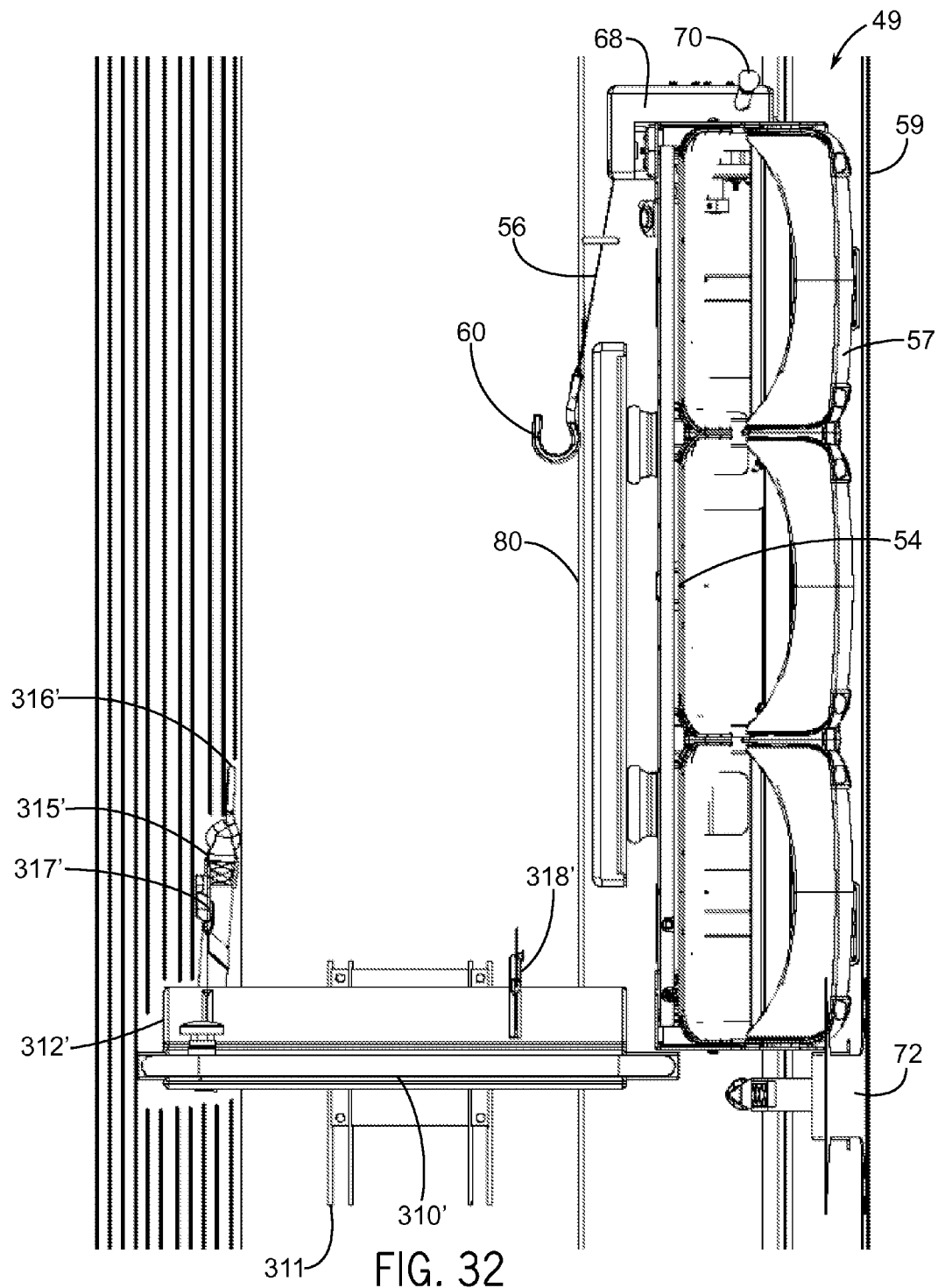
FIG. 32 is another top plan view of the embodiment of the invention disclosed in FIG. 31, shown with the rear barrier translated to its forward position.

As shown in FIG. 31, mobility securement system 48 includes rear barrier 310, which includes track 311, and vehicle anchor assembly 312. Vehicle anchor assembly 312 includes rear attachment 315, rear hook 316, occupant seat belt female component 317 and occupant seat belt male component 318. Rear barrier 310 may translate forwards and backwards along track 311, to contact a mobility device or mobility device that may be secured in different positions. As shown in FIG. 32, rear barrier 310 may translate forwards along track 311 into a different position shown as rear barrier 310'. Also shown in FIG. 32 are vehicle anchor assembly 312', which includes rear attachment 315', rear hook 316', occupant seat belt female component 317' and occupant seat belt male component 318'.

Figure 33:
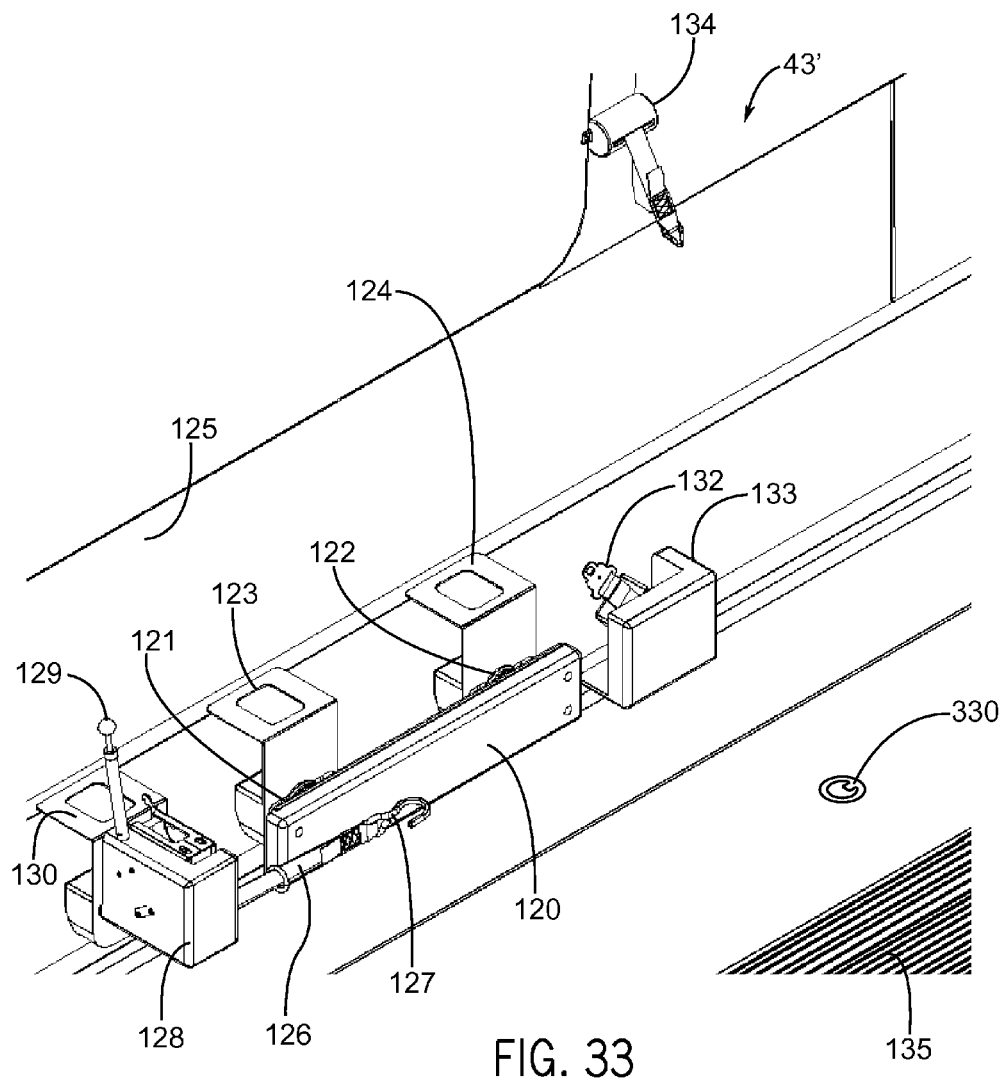
FIG. 33 is a perspective view of another embodiment of the present invention, showing a fitting for a removable vehicle anchor assembly that is stored remotely, shown when the mobility securement system is not in use.
Figure 34:
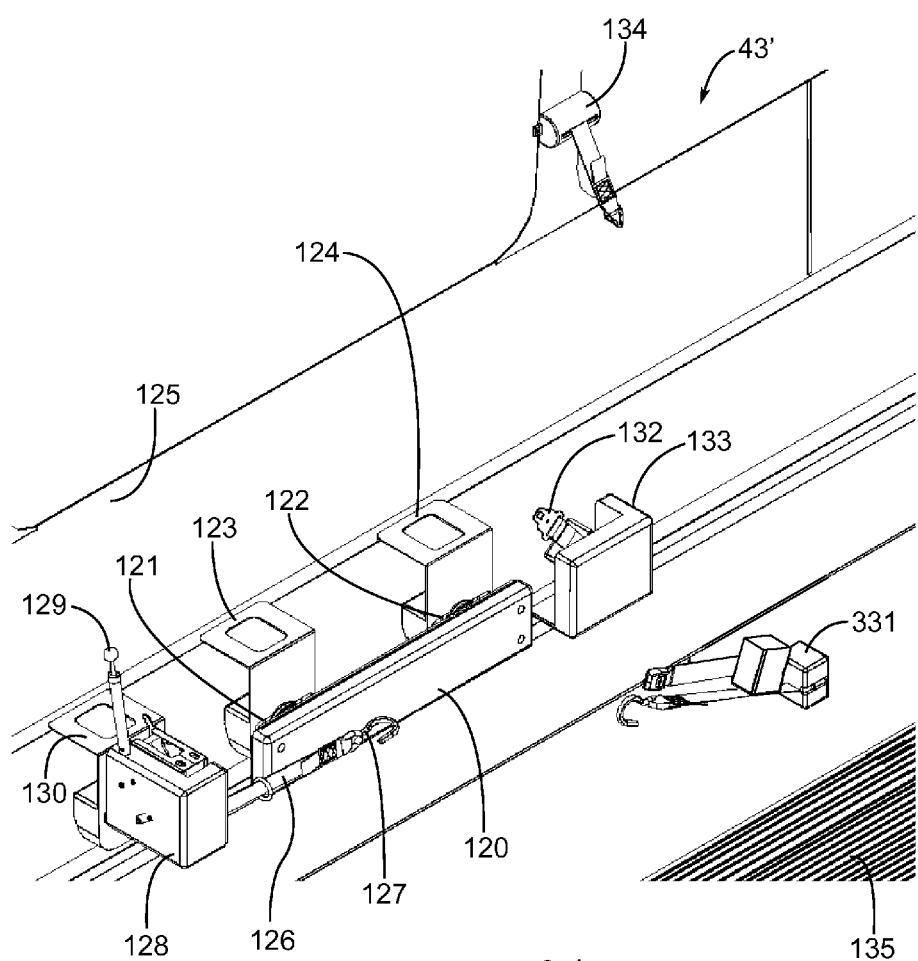
FIG. 34 is a perspective view of the embodiment of the invention disclosed in FIG. 33, showing the removable vehicle anchor assembly attached and ready for use.

FIG. 33 depicts a perspective view of mobility securement system 43', which is similar to mobility securement system 43 shown in FIG. 8. In this embodiment of the invention, solo fitting 330, here an anchor restraint fitting, is positioned within the bus floor. As an alternative to solo fitting 330, a slide and click fitting, or bayonet mounting system, may alternatively be used. Removable vehicle anchor assembly 331, of FIG. 34, may then be operably attached thereto, when mobility securement system 43' is in use.

Figure 35:
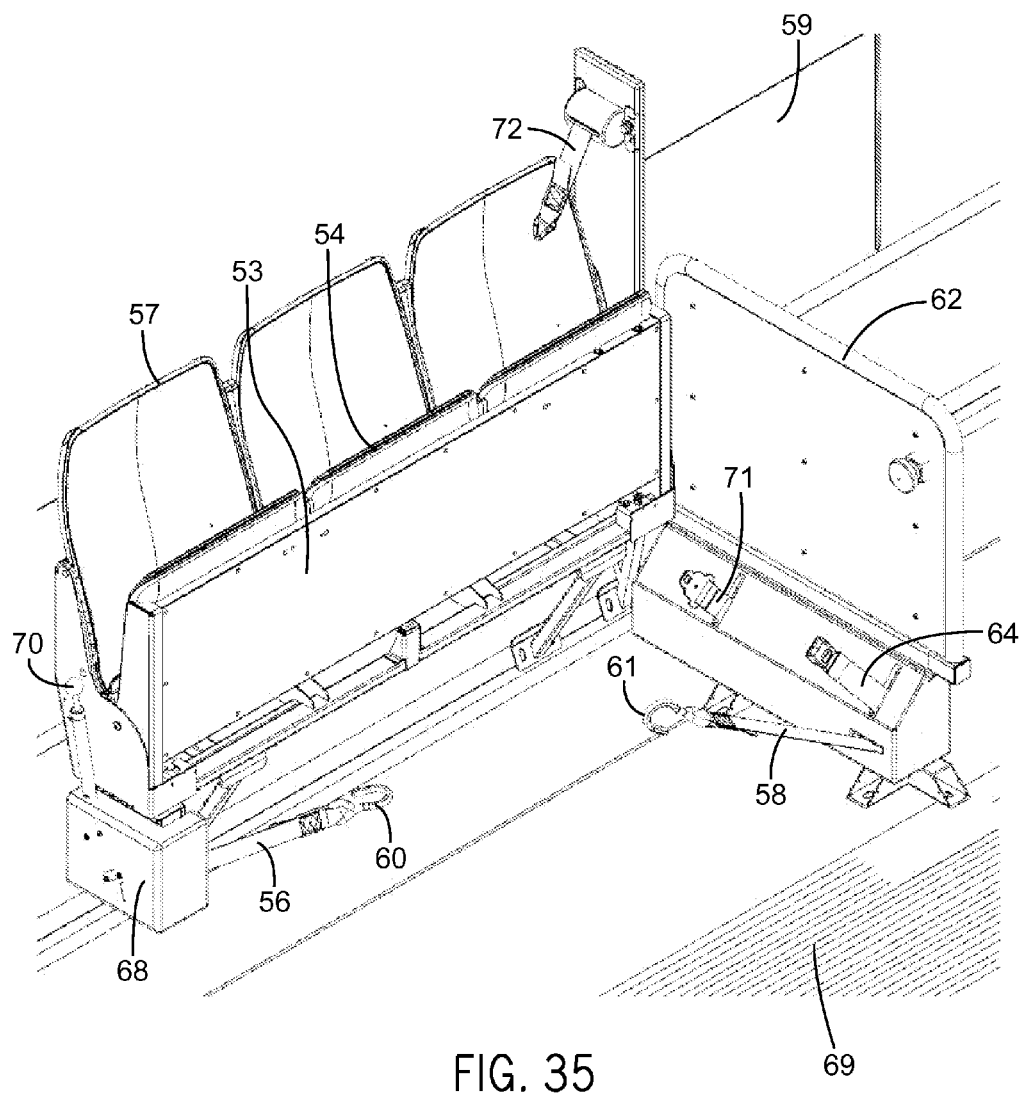
FIG. 35 is a perspective view of a further embodiment of the present invention, in which the invention utilizes two co-linear attachment members and no bumpers to secure the mobility device.
Figure 36:
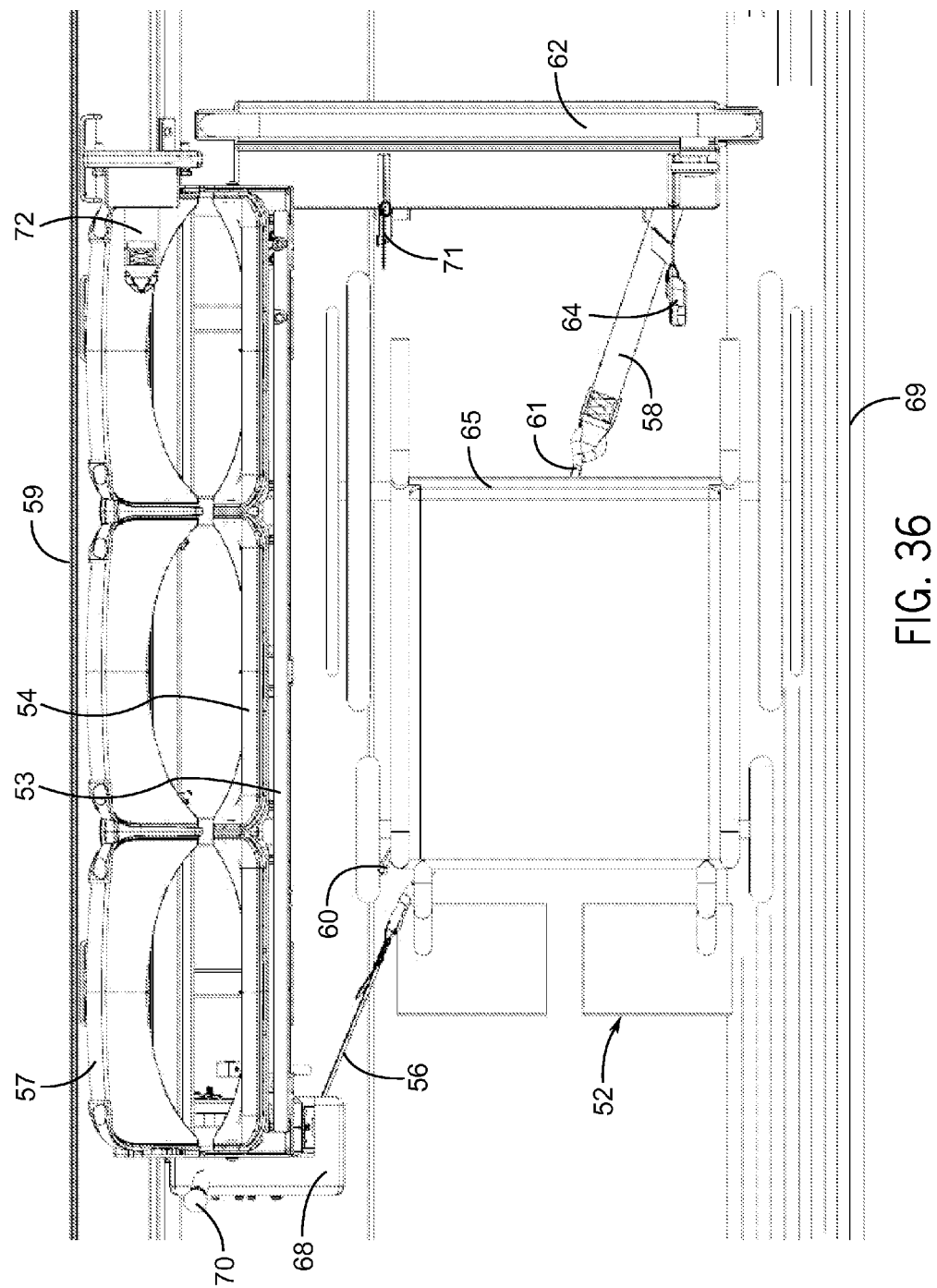
FIG. 36 is a top plan view of the embodiment of the invention disclosed in FIG. 35, showing the attachment members attached to a wheelchair in a substantially co-linear diagonal fashion.

In another embodiment of the present invention, shown in FIGS. 35-36, two attachment members are utilized to secure the wheelchair or mobility device, without the use of any bumpers. In this embodiment, the two attachment members—and only two attachment members—serve to restrain and secure the mobility device in place. The two attachment members are attached to the wheelchair or mobility device in a diagonal, yet substantially co-linear orientation when attached to the wheelchair or mobility device, the attachment members form a substantially co-linear alignment, as shown in FIG. 36 relative to first attachment member 56 and second attachment member 58. This construction eliminates torquing on the mobility device. The second attachment member 58 is positioned beneath occupant seat belt female component 64, close to bus aisle 69.

In this embodiment also, as shown in FIGS. 35 and 36, the driver or attendant first attaches second hook 61 of second attachment member 58 to rear axle 65 of wheelchair 52, before attaching first hook 60 of first attachment member 56 to an attachment point on the front of wheelchair 52. After first attachment member 56 is attached, the driver or attendant may then use control lever 70 to actuate or control the tensioning system, which may be located in vehicle anchor assembly 68. Also shown in FIGS. 35 and 36 are flip seat 54, seat bottom 53, seat back 57, rear barrier 62, occupant seat belt female component 64, occupant seat belt male component 71, shoulder occupant seat belt 72, bus wall 59 and bus aisle 69.

Figure 37:
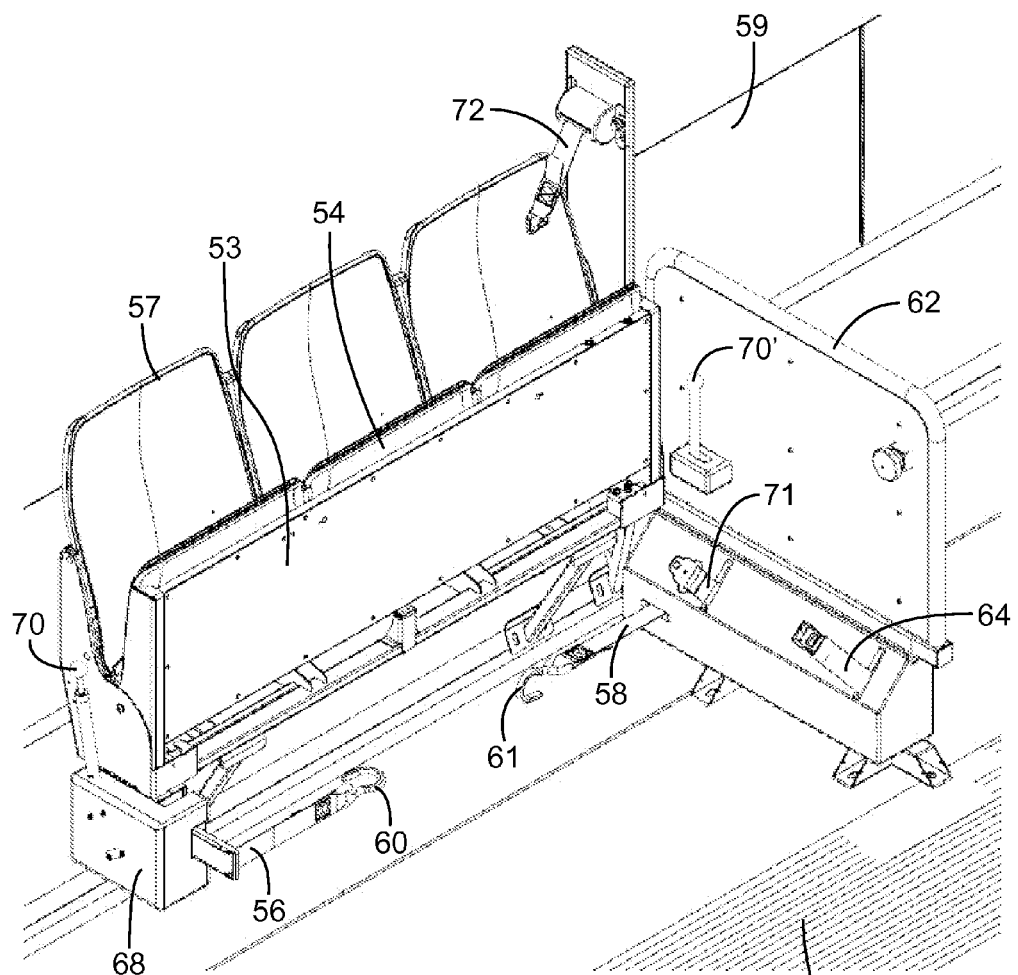
FIG. 37 is a perspective view of yet another embodiment of the present invention, in which the invention utilizes two attachment members and no bumpers to secure the mobility device.
Figure 38:
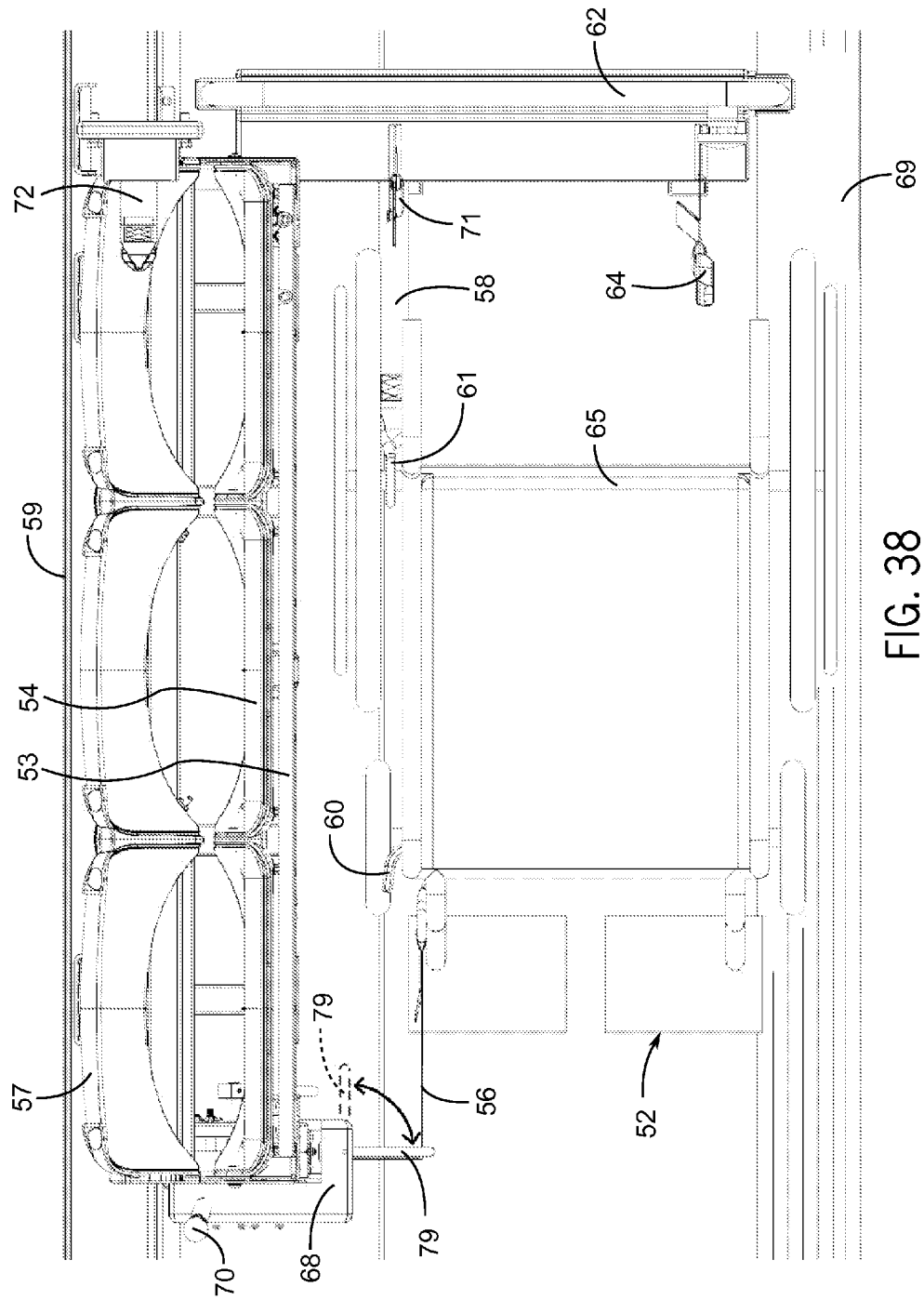
FIG. 38 is a top plan view of the embodiment of the invention disclosed in FIG. 37, showing the attachment members attached to a wheelchair in a co-linear fashion parallel to the longitudinal axis of the bus.

In yet another embodiment of the present invention, as shown in FIGS. 37-38, two attachment members are again utilized to secure the wheelchair or mobility device, without the use of any bumpers. In this embodiment, the two attachment members are likewise attached to the wheelchair or mobility device in a straight, substantially co-linear fashion, to avoid placing a torquing force on the wheelchair or mobility device. Instead of the diagonal orientation shown in FIGS. 35 and 36 (diagonal in that, as noted above, second attachment member 58 in FIG. 36 originates from the aisle side of the bus), the interconnection of this embodiment is parallel to the longitudinal axis of the bus, along a position proximate bus wall 59. As shown in FIGS. 37 and 38, second attachment member 58 emanates proximate to the wall side of the bus—underneath, and at a substantial distance from bus aisle 69. Moreover, first attachment member 56 is maintained in a position parallel to the longitudinal axis of the bus via attachment member guide 79, which extends from vehicle anchor assembly 68 towards bus aisle 69, to guide first attachment member 56 to a longitudinal axis that is co-linear with the axis of second attachment member 58. In this way, as shown in FIG. 38, first hook 60 of first attachment member 56 is attached to an attachment point on the front of wheelchair 52, while second hook 61 of second attachment member 58 is attached to an aligned position on the rear axle 65 of wheelchair 52. In a preferred embodiment, attachment member guide 79 rotates 90° from its stored position (where it is parallel to the longitudinal axis of the bus) to its locked, rotated position shown in FIG. 37, to enable the co-linear alignment of first attachment member 56 and second attachment member 58.

In this embodiment of FIGS. 37 and 38, the occupant, attendant or driver first attaches second hook 61 of second attachment member 58 to rear axle 65 of wheelchair 52. Next, the occupant, attendant or driver may deploy attachment member guide 79 by rotating it 90° from its stored position to its locked, rotated position, before attaching first hook 60 of first attachment member 56 to an attachment point on the front of wheelchair 52, which is aligned with the rear axle attachment point. The occupant, attendant or driver may use control lever 70 to actuate or control the tensioning system, which may be located in vehicle anchor assembly 68. Also shown in FIGS. 37-38 are retracted flip seat 54 and seat bottom 53, seat back 57, rear barrier 62, occupant seat belt female component 64, occupant seat belt male component 71, shoulder occupant seat belt 72, bus wall 59 and bus aisle 69.

Figure 39:
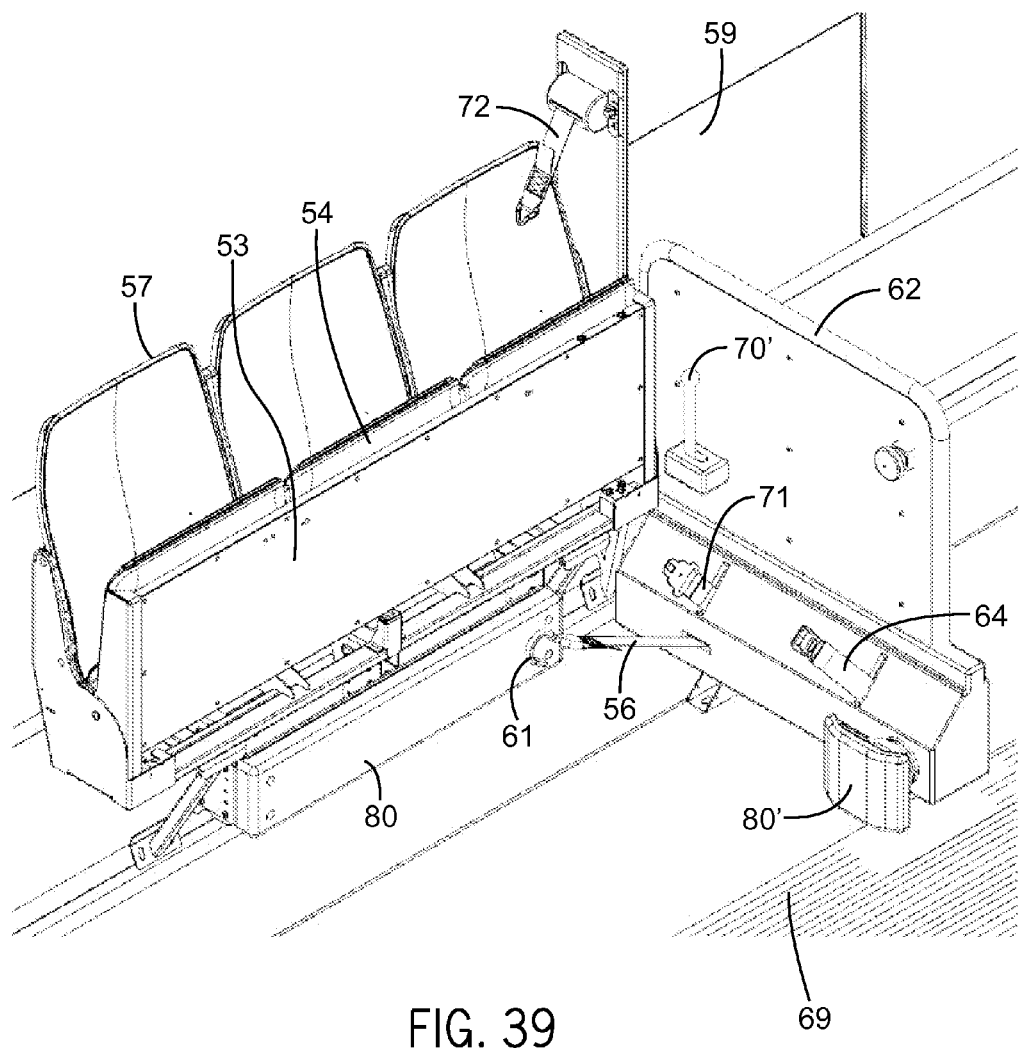
FIG. 39 is a perspective view of another embodiment of the present invention, in which the mobility securement system includes two bumpers, and a single attachment member therebetween, positioned on the bus wall side of the mobility securement system.
Figure 40:
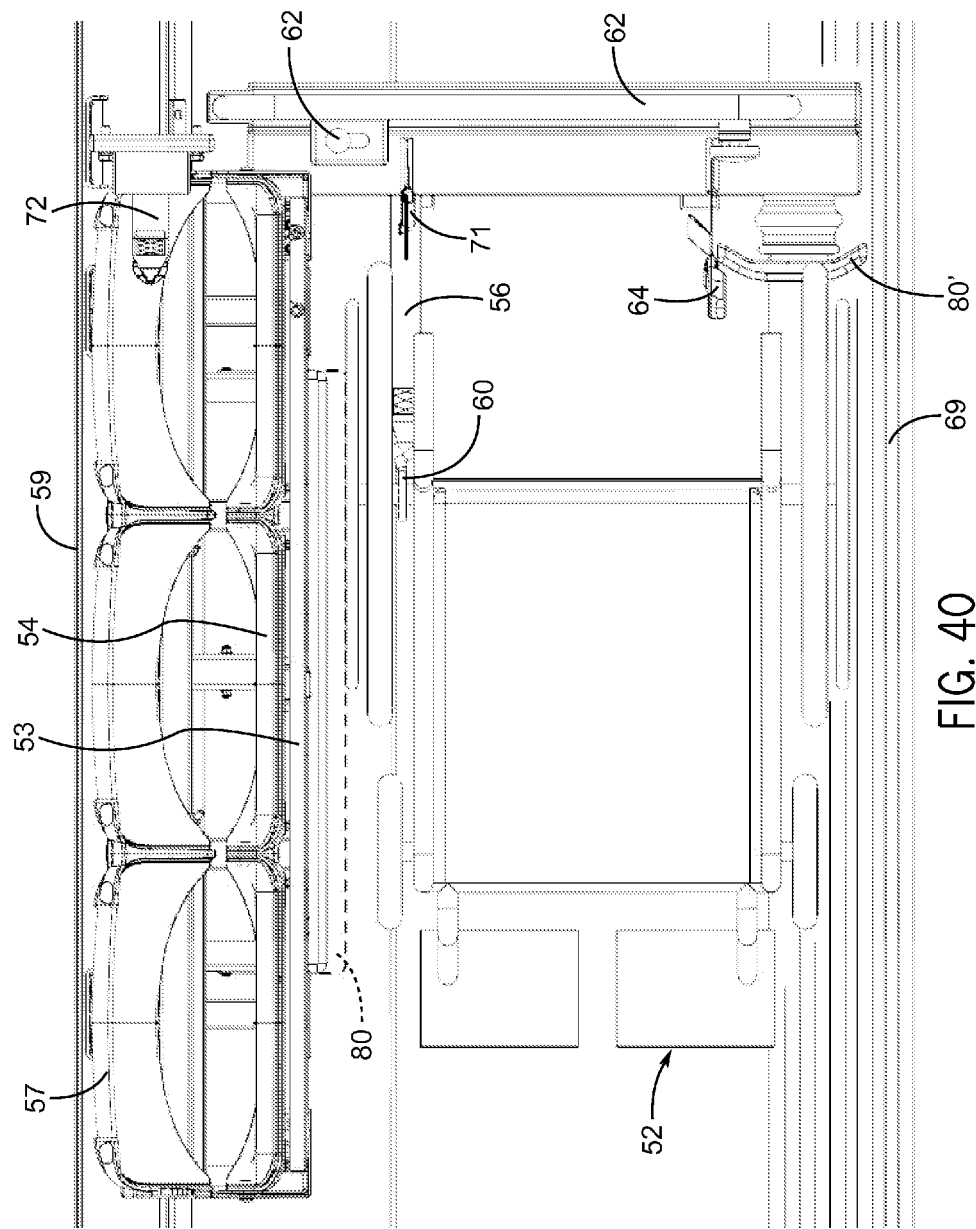
FIG. 40 is a top plan view of the embodiment of the invention disclosed in FIG. 39, showing the two bumpers, with a single attachment member therebetween attached to a wheelchair.

In yet another embodiment of the present invention, as shown in FIGS. 39 through 44, two bumpers are used in conjunction with a single attachment member—to secure the wheelchair or mobility device in place within the vehicle. In these embodiments, side bumper 80 is located to the side of mobility device 52, and positioned beneath flip seat 54 (as shown in FIG. 40). Side bumper 80 contacts the side of mobility device 52, and applies a force thereupon, emanating toward aisle 69 from beneath surface 53 of flip seat 54 and seat back 57. Likewise, rear bumper 80' contacts the rear of mobility device 52, emanating from beneath retracted occupant seat belt female male component 64 (as also shown in FIG. 40). Each of side bumper 80 and rear bumper 80' may be moveable, as described in further detail hereinabove, and may extend to apply a force, including, optionally, a downward force, against the wheelchair or mobility device.

As noted above, in these embodiments, only a single attachment member may be used to secure the wheelchair or mobility device in its restrained position, with the attachment member being positioned, as shown, in between the two bumpers. In the embodiment shown in FIGS. 39-40, attachment member 56 emanates from beneath retracted occupant seat belt male component 71—from a position significantly closer to bus wall 59 than to bus aisle 69. In this manner also, attachment member 56 provides a tensioning force pulling the mobility device toward the back of the bus, while each of side bumper 80 and rear bumper 80' provide frictional and/or compressive securing forces against respective portions of the mobility device. As with the embodiments discussed earlier, control lever 70' may be used to actuate, or otherwise control or enhance, the applied force of the tensioning system embedded within rear barrier 62. Also shown in FIGS. 39 and 40 are retracted flip seat 54 and seat bottom 53, as well as seat back 57, retracted occupant seat belt female component 64, retracted occupant seat belt male component 71, and retracted shoulder occupant seat belt 72.

Figure 41:
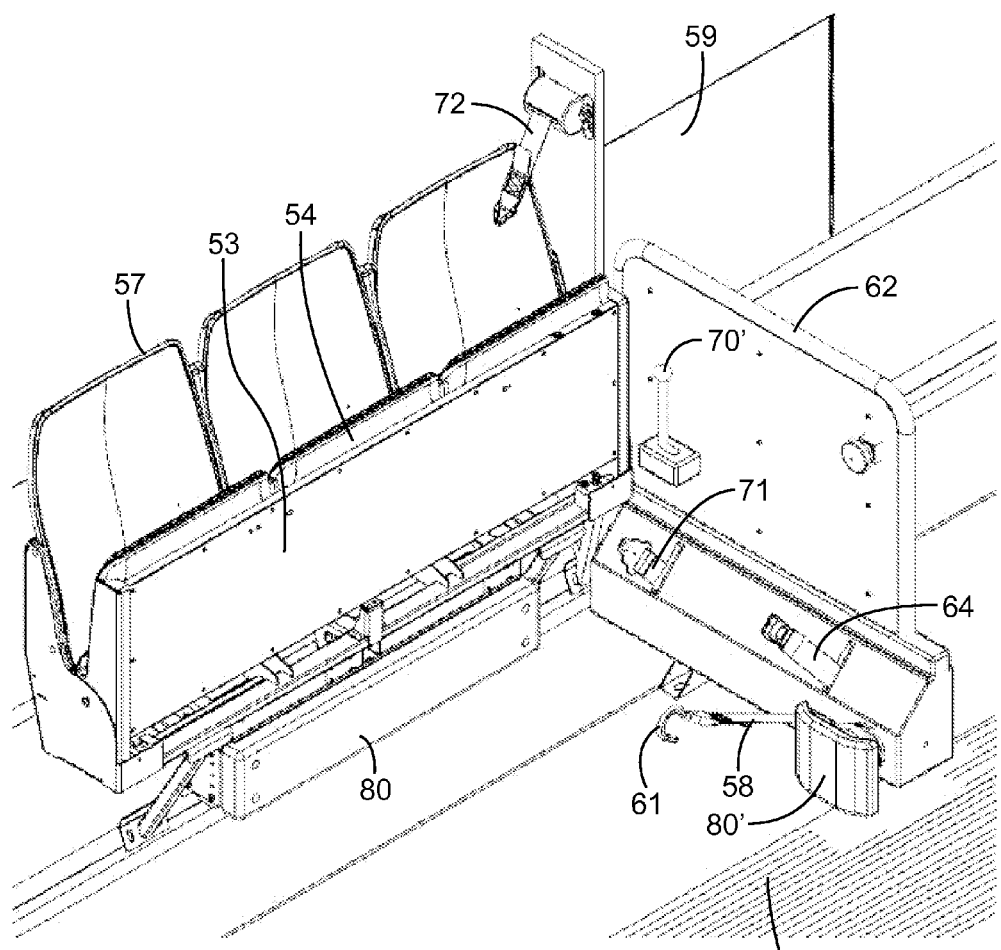
FIG. 41 is a perspective view of another embodiment of the present invention, in which the mobility securement system includes two bumpers, and a single attachment member positioned therebetween, proximate the aisle side of the mobility securement system.
Figure 42:
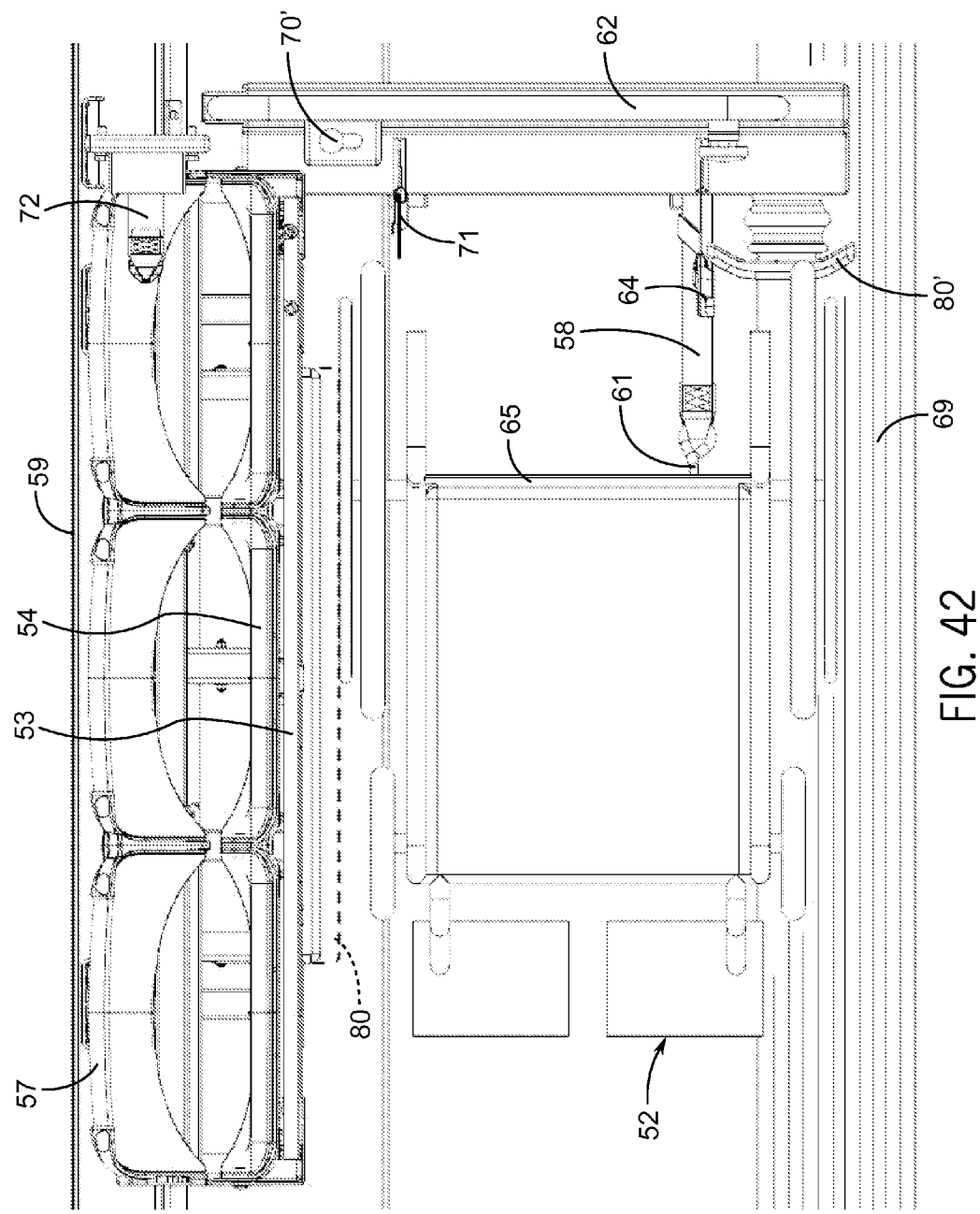
FIG. 42 is a top plan view of the embodiment of the invention disclosed in FIG. 40, showing the two bumpers, with a single attachment member therebetween, attached to a wheelchair.

The embodiment shown in FIGS. 41 and 42 is similar to that shown in FIGS. 39 and 40, except that the sole attachment member, attachment member 58 in FIGS. 41 and 42, is positioned to emanate from beneath retracted occupant seat belt female component 64—closer to bus aisle 69 than to bus wall 59. Apart from this difference in positioning, the embodiment of FIGS. 41 and 42 is otherwise similar to that shown in FIGS. 39 and 40, with control lever 70' being capable of actuating, or otherwise controlling or enhancing, the applied force of a tensioning system embedded within rear barrier 62. Also shown in FIGS. 41 and 42 are flip seat 54 and seat bottom 53, as well as seat back 57, retracted occupant seat belt female component 64, retracted occupant seat belt male component 71, and retracted shoulder occupant seat belt 72.

Figure 43:
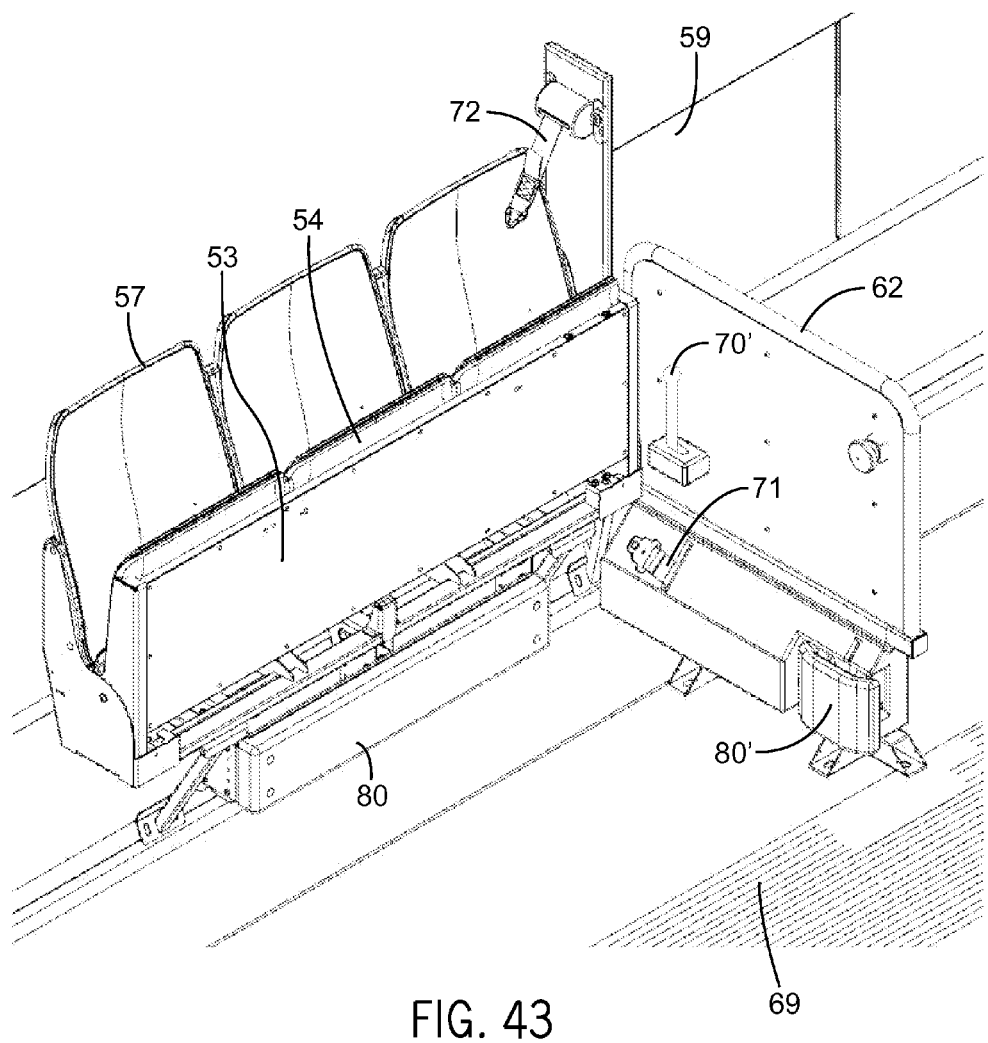
FIG. 43 is a perspective view of a different embodiment of the present invention, in which the mobility securement system includes a bumper on the bus wall side and a bumper on the aisle side, and in which the aisle side bumper articulates forwardly (towards the front of the bus) and outwardly (towards the bus aisle), to reveal an attachment member that is stored out of view behind the bumper.
Figure 44:
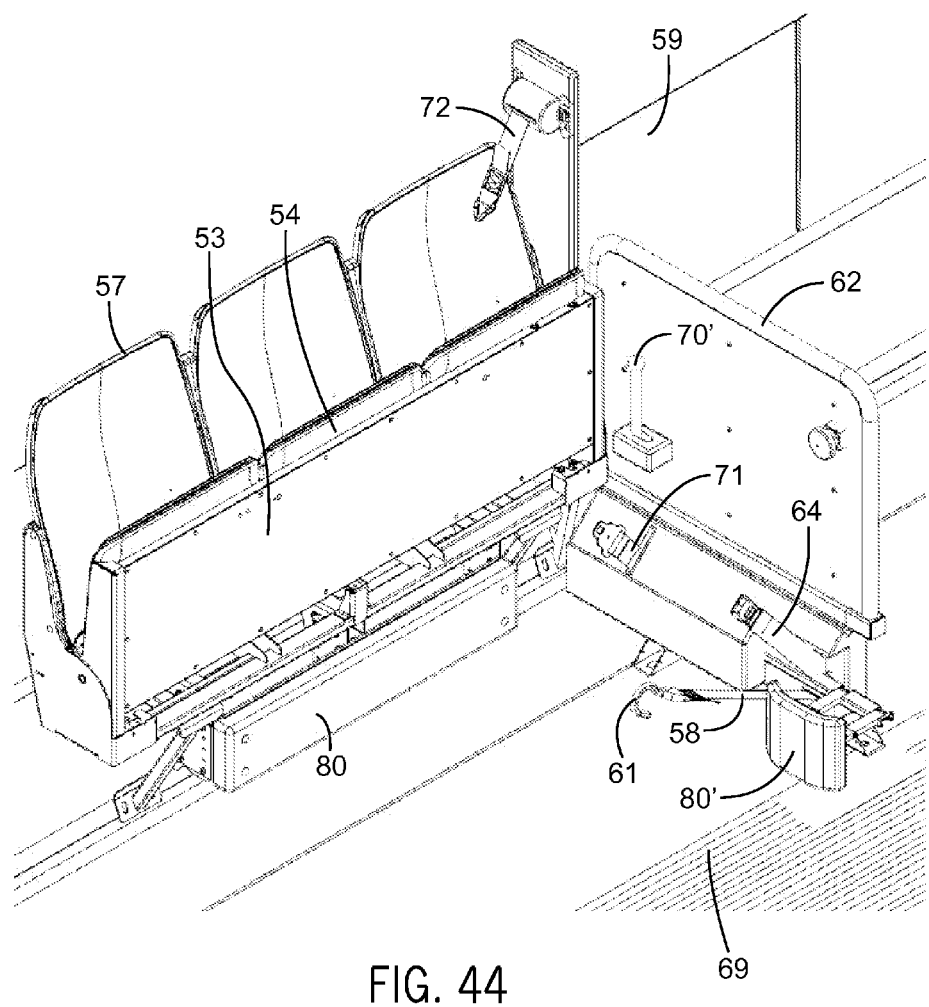
FIG. 44 is a perspective view of the embodiment of the invention disclosed in FIG. 43, showing the latter, aisle-side bumper articulated forwardly and outwardly, so as to reveal a single, aisle side attachment member positioned between the two bumpers.

Another alternative embodiment is shown in FIGS. 43 and 44, with sole attachment member, attachment member 58 being positioned underneath retracted occupant seat belt female component 64—closer to bus aisle 69 than to bus wall 59. In FIGS. 43 and 44, attachment member 58 is positioned and stored behind rear bumper 80', out of view from the occupant, until utilized to apply a compressive force against a mobility device. In this embodiment, rear bumper 80' is moveable, and articulates forwardly towards the front of the bus and outwardly towards bus aisle 69, as shown in FIG. 44, thereby revealing attachment member 58. In this embodiment also, the occupant, attendant or driver first deploys rear bumper 80' to its extended, articulated position, to reveal attachment member 58. Next, the occupant, attendant or driver can attach hook 61 of attachment member 58 to rear axle 65 of wheelchair 52. Then, the occupant or driver may use control lever 70' to actuate or control the tensioning system, which may be located in rear barrier 62. Also shown in FIGS. 43 and 44 are retracted flip seat 54 and seat bottom 53, as well as seat back 57, occupant seat belt female component 64, occupant seat belt male component 71, shoulder occupant seat belt 72, bus wall 59 and bus aisle 69.

Figure 45:
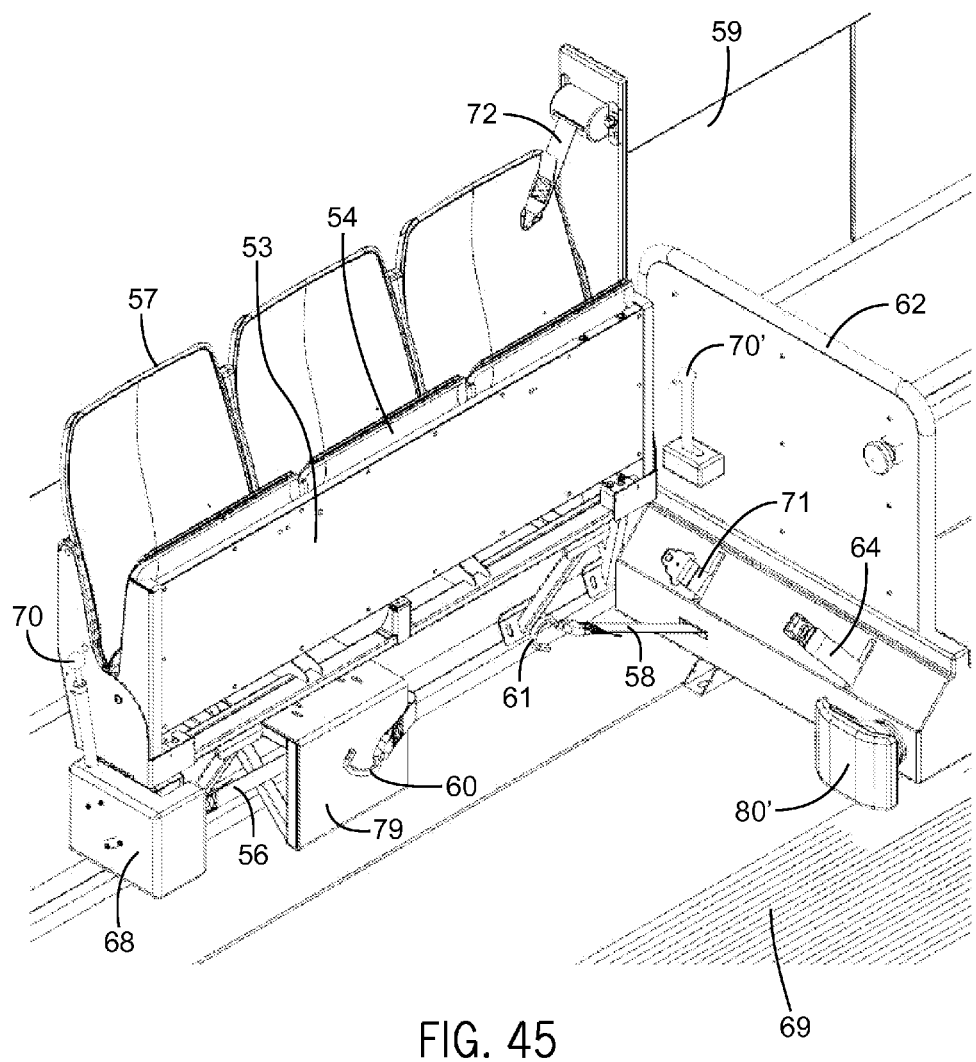
FIG. 45 is a perspective view of yet another embodiment of the present invention, in which the mobility securement system includes a rear bumper positioned proximate the aisle side, and two attachment members positioned proximate the bus wall side of the mobility securement system, in which the front attachment member extends backward through an attachment member guide, which may or may not double as a second bumper, to enable the forward-most attachment member to apply a tensile force against a mobility device.
Figure 46:
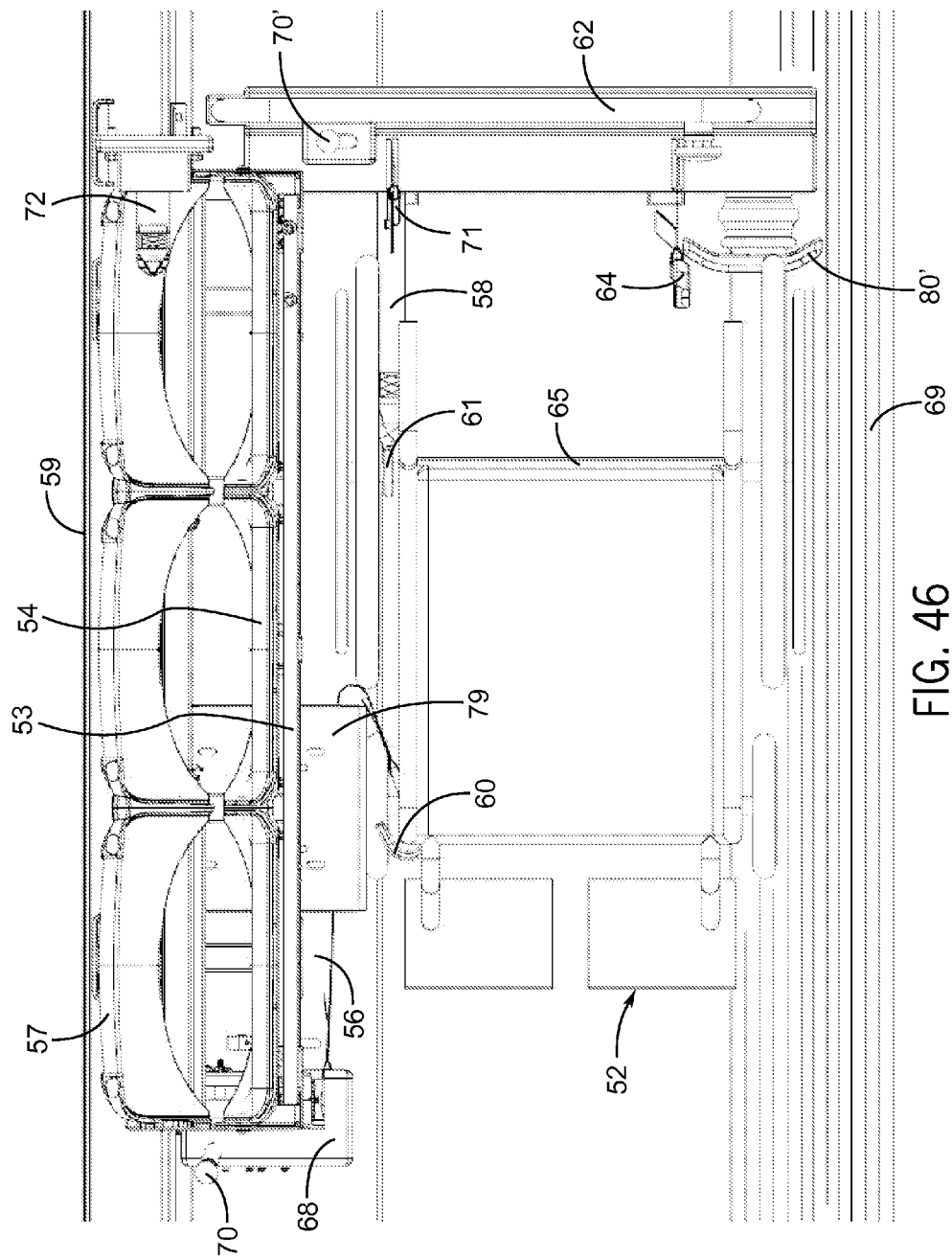
FIG. 46 is a top plan view of the embodiment of the invention disclosed in FIG. 45, showing the two attachment members attached to a wheelchair, with the bumper contacting the wheelchair.

In yet other embodiments of the present invention, as shown in FIGS. 45 through 48, the mobility securement system includes at least one bumper and two attachment members—one at the rear of the mobility device, and one at its front. In these embodiments, the front attachment member extends towards the back of the bus through an attachment member guide, which may, in one embodiment, double as a second bumper, to enable that front attachment member to apply a tensile securement force against a mobility device. In FIG. 45, front attachment member 56 extends through attachment member guide 79, to enable front hook 60 to be secured to an attachment point located on the front of wheelchair 52 (as shown in FIG. 46). Further, attachment member guide 79 may or may not double as a bumper for wheelchair 52. In this embodiment, the system also includes rear bumper 80', and rear attachment member 58, which includes rear hook 61, for attachment, for example, to the rear axle 65 of wheelchair 52 (as shown in FIG. 46), or a proximate mobility device frame member. Notably, in this embodiment, rear attachment member 58 is positioned underneath retracted occupant seat belt male component 71—closer to bus wall 59 than to bus aisle 69. When attachment member guide 79 doubles as a bumper, it can be seen that the two attachment points are, again, positioned between attachment member guide/bumper 79 and rear bumper 80'. In this manner also, both of front and rear attachment members 56, 58 apply rearwardly-positioned, tensile forces upon the wheelchair or mobility device. As such, the occupant, attendant or driver can attach front hook 60 of front attachment member 56 to the wheelchair or mobility device and attached rear hook 61 of rear attachment member 58 to the wheelchair or mobility device, before either or both of control levers 70, 70' are actuated to control the tensioning systems—one of which may be located in vehicle anchor assembly 68, and the other of which may be located in rear barrier 62. Also shown in FIGS. 45 and 46 are retracted flip seat 54 and seat bottom 53, as well as seat back 57, retracted occupant seat belt female component 64, retracted occupant seat belt male component 71, retracted shoulder occupant seat belt 72, bus wall 59 and bus aisle 69.

Figure 47:
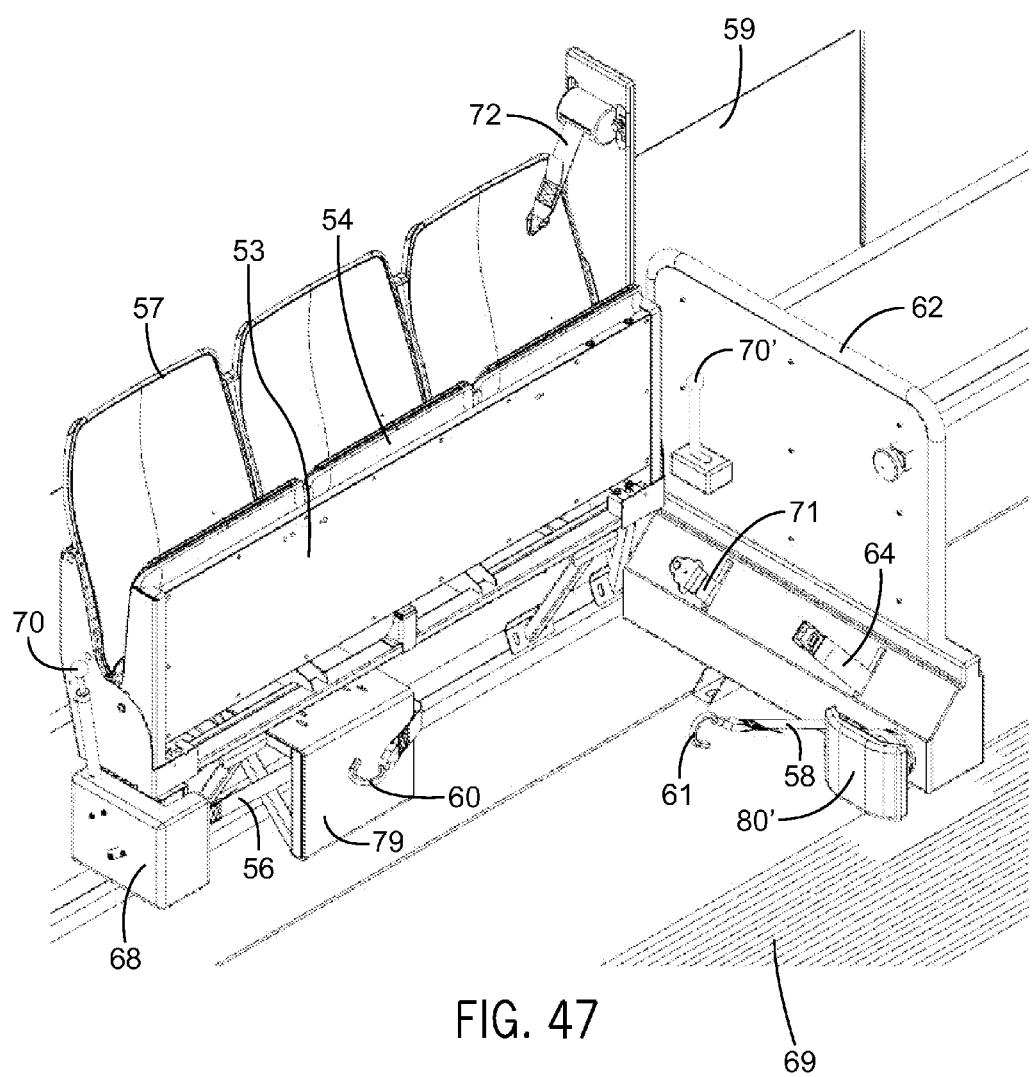
FIG. 47 is a perspective view of a different embodiment of the present invention, in which the mobility securement system includes a rear bumper and two attachment members—a back attachment member positioned on the aisle side of the mobility securement system and a front attachment member positioned proximate the bus wall side of the mobility securement system, in which the front attachment member extends rearwardly through an attachment member guide, which may or may not double as a second bumper, to enable that front attachment member to apply a tensile force against a mobility device.
Figure 48:
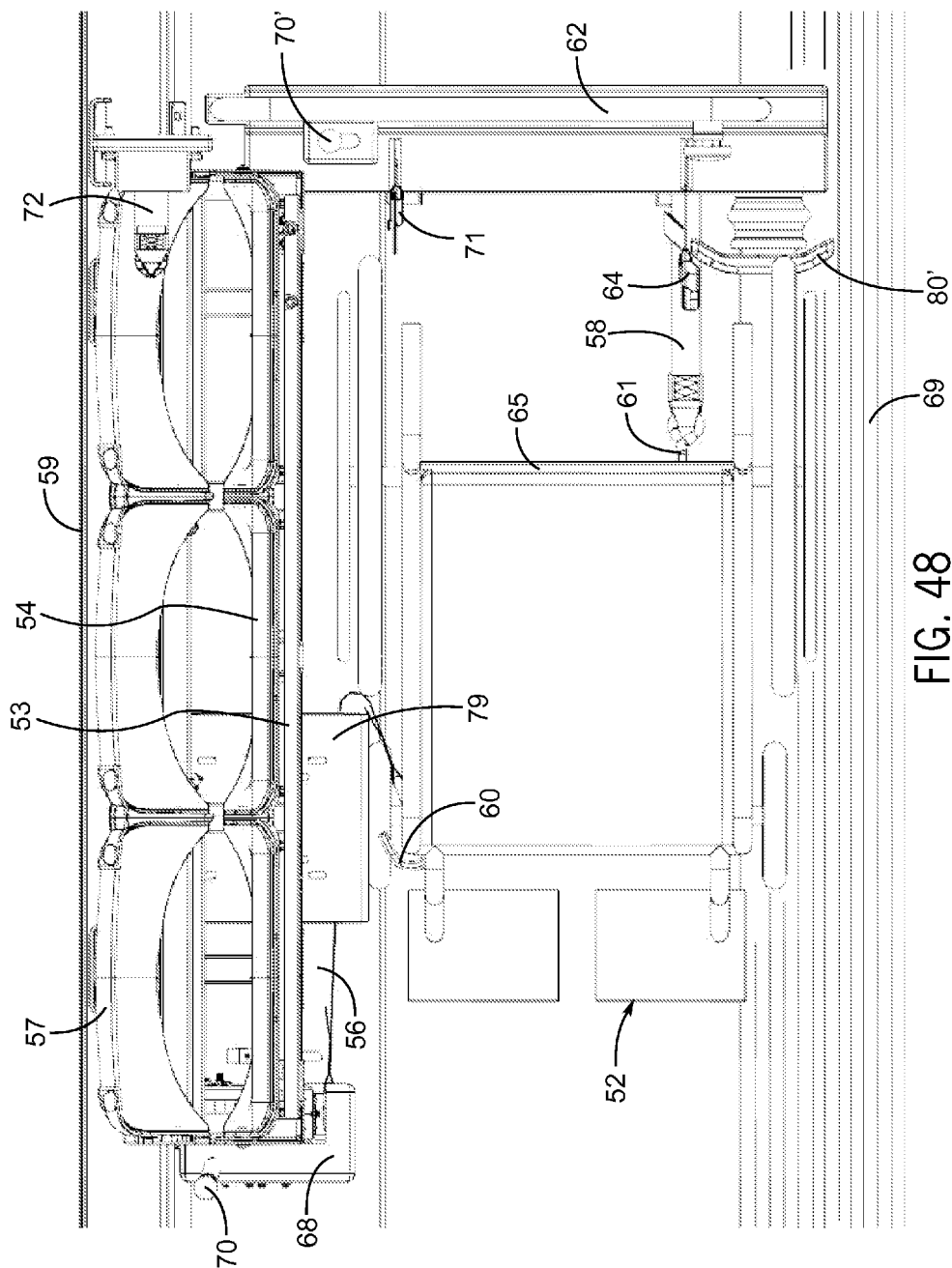
FIG. 48 is a top plan view of the embodiment of the invention disclosed in FIG. 47, showing the two attachment members attached to a wheelchair.
Figure 49:
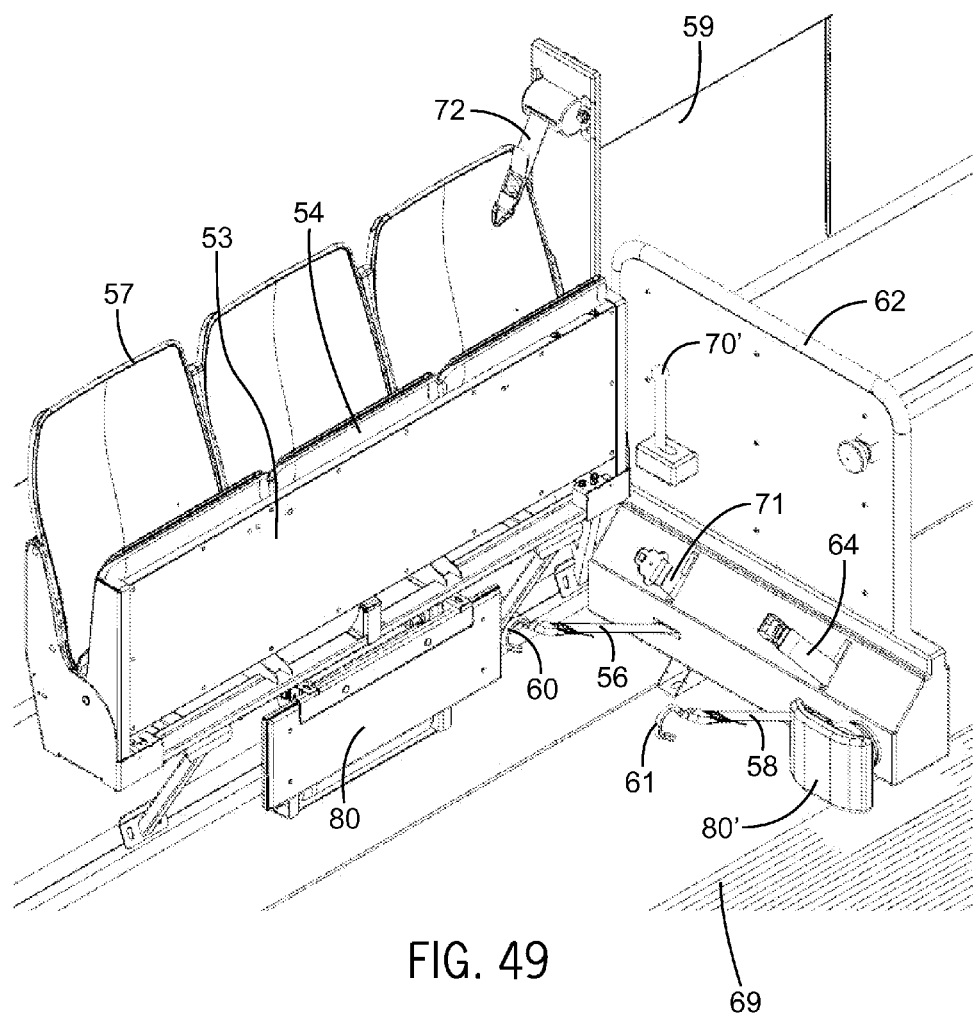
FIG. 49 is a perspective view of one embodiment of the present invention, in which the mobility securement system includes two attachment members extending from the back of the mobility securement system, and two bumpers—a back bumper positioned on the aisle side of the mobility securement system and a side bumper on the bus wall side of the mobility securement system, and in which the side bumper can be articulated at an angle downward, to apply a downward force against a wheelchair or mobility device.

The embodiment shown in FIGS. 47 and 48 is similar to that shown in FIGS. 45-46, except that the rear attachment member, attachment member 58 in FIGS. 47-48, is positioned beneath retracted occupant seat belt female component 64—significantly closer to bus aisle 69 than to bus wall 59. Also shown in FIGS. 47 and 48 are front attachment member 56 with its front hook 60, attachment member guide 79, vehicle anchor assembly 68, control lever 70, control lever 70', rear barrier 62, retracted flip seat 54 and seat bottom 53, as well as seat back 57, retracted occupant seat belt female component 64, retracted occupant seat belt male component 71 and retracted shoulder occupant seat belt 72.

Figure 50:
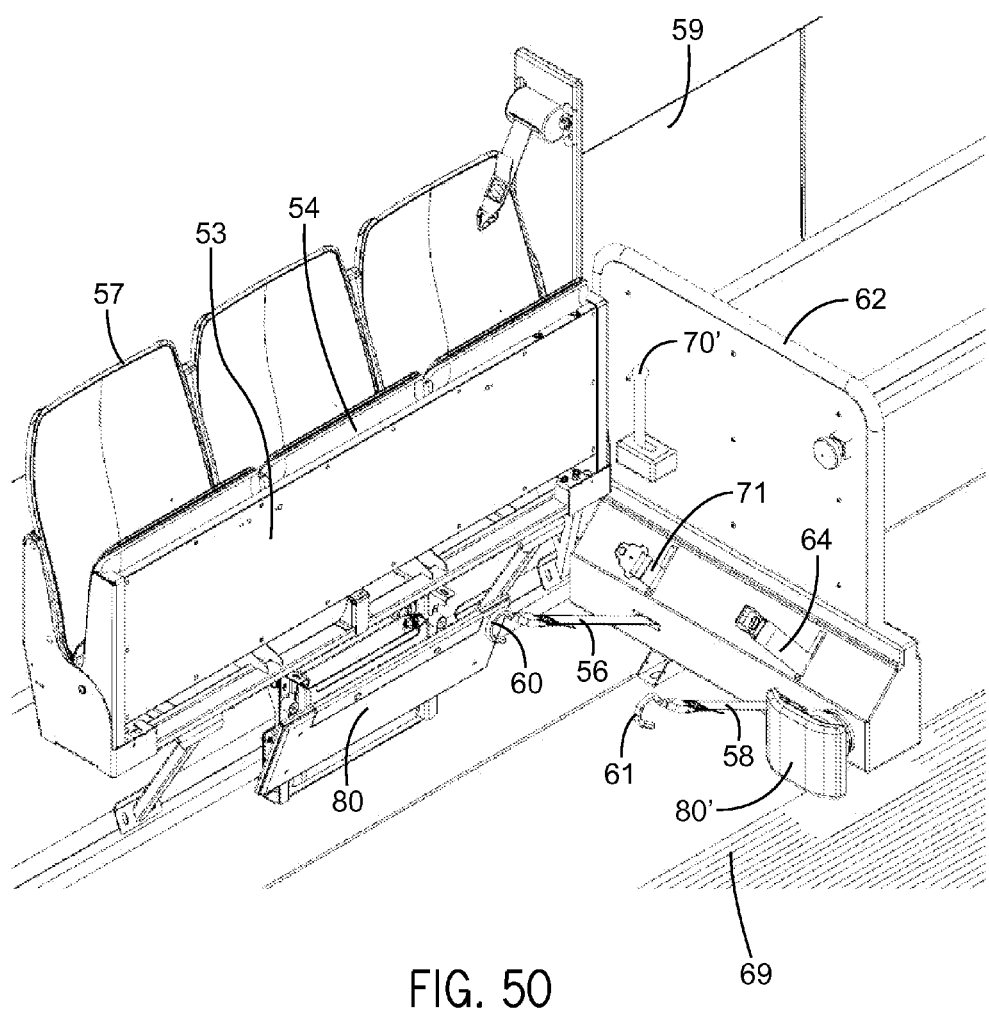
FIG. 50 is a perspective view of the embodiment of the invention disclosed in FIG. 49, showing the top of the side bumper articulated outward to apply a downward force on a wheelchair (not shown).
Figure 51:
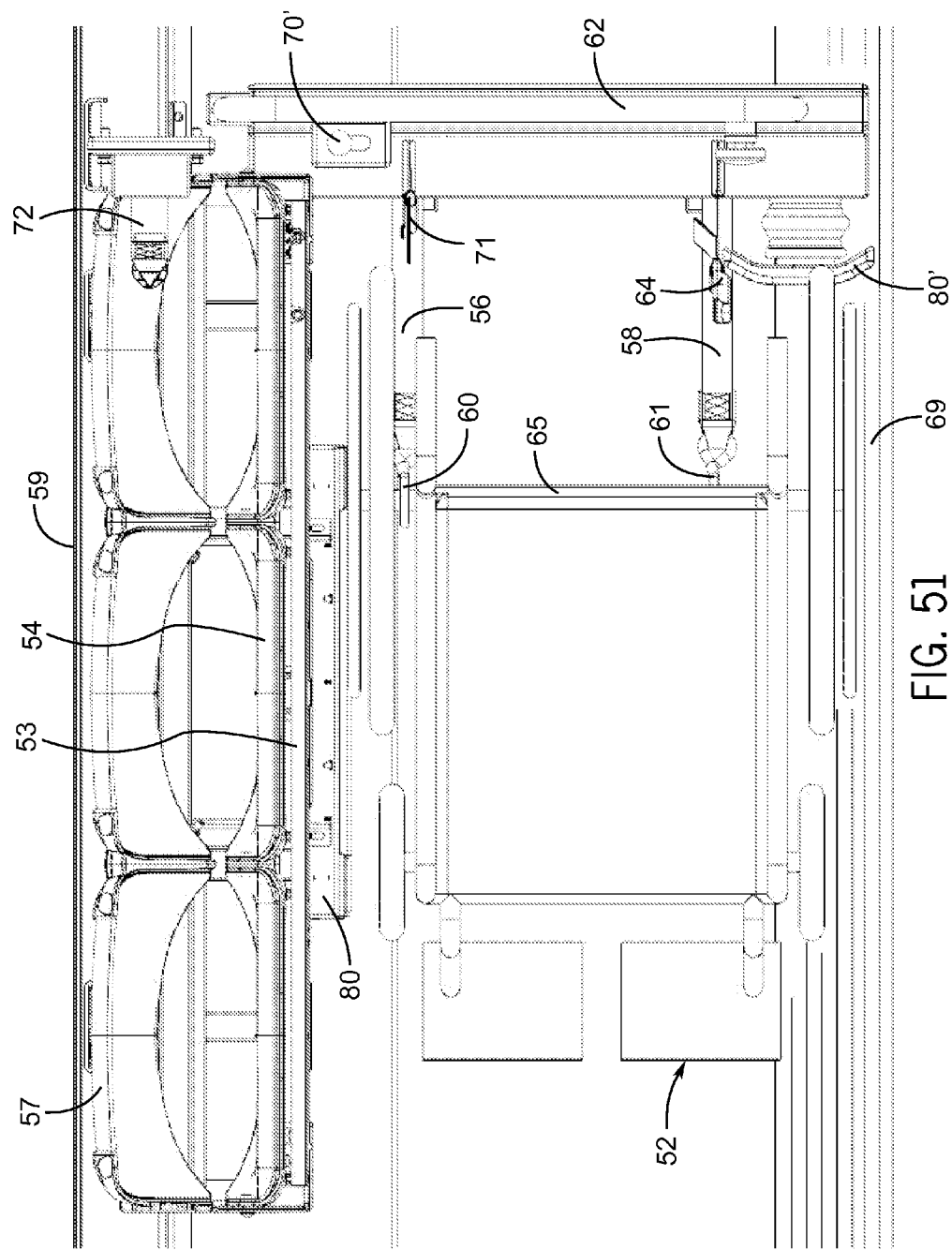
FIG. 51 is a top plan view of the embodiment of the invention disclosed in FIGS. 49-50, showing the two attachment members attached to a wheelchair.
Figure 52:
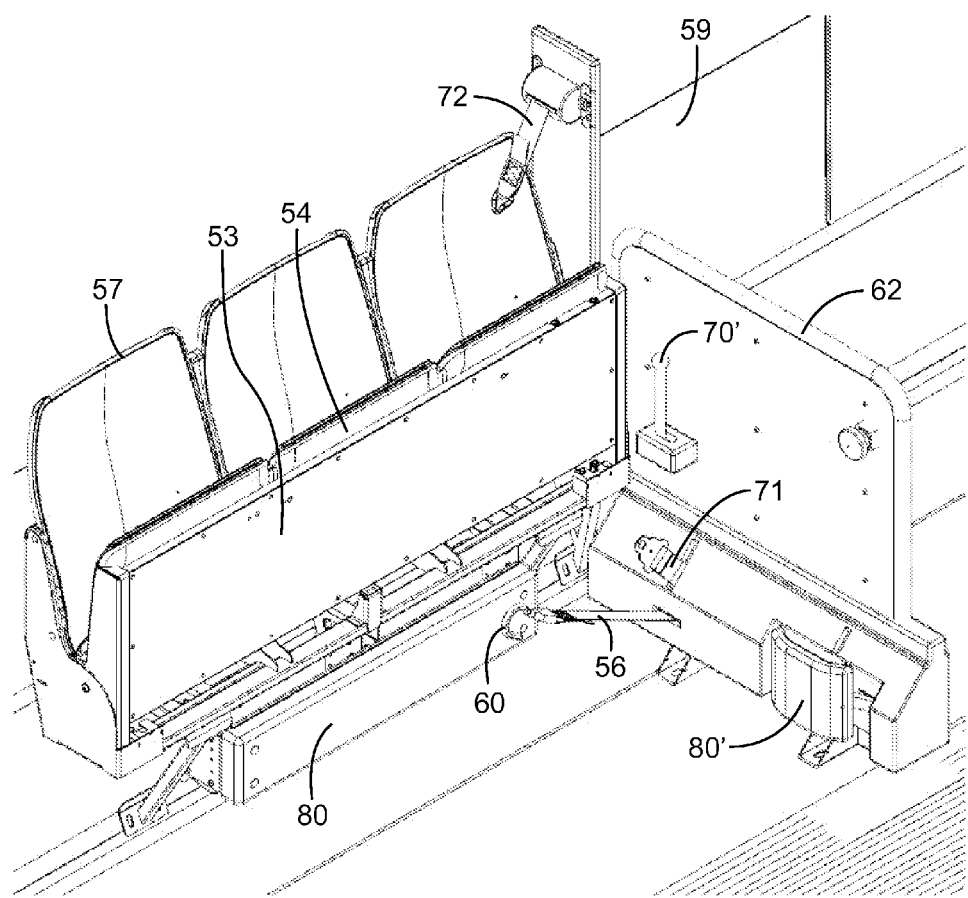
FIG. 52 is a perspective view of a different embodiment of the present invention, in which the mobility securement system includes a first bumper and a first attachment point on the bus wall side, and a second bumper and a second attachment point on the aisle side, wherein the second bumper articulates forward (towards the front of the bus) and outward (towards the bus aisle), thereby revealing the second attachment member, which is stored out of view behind the bumper.
Figure 53:
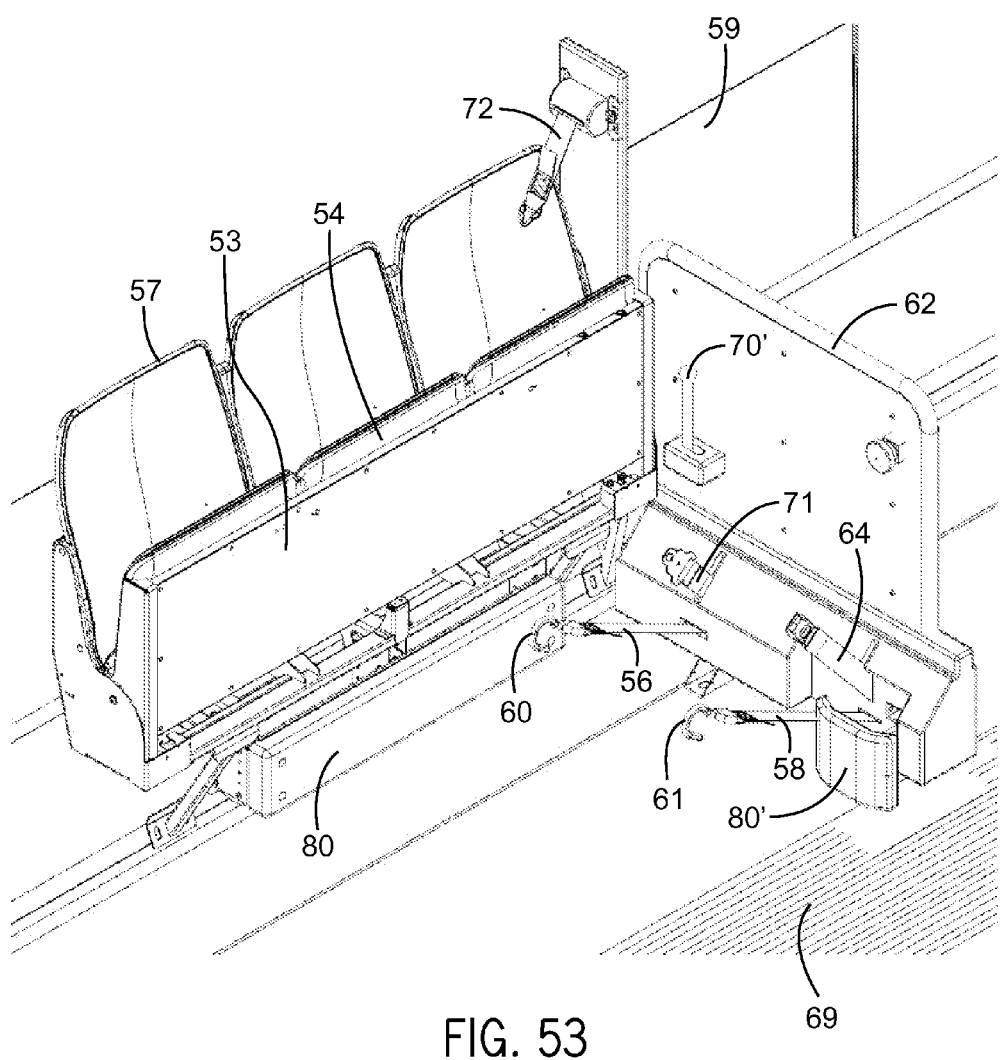
FIG. 53 is a perspective view of the embodiment of the invention disclosed in FIG. 52, showing the second bumper articulated forward and outward, so as to reveal the second, aisle-side attachment member.

In another embodiment of the present invention, as shown in FIGS. 49 through 53, two bumpers are used in conjunction with two attachment members—to secure the wheelchair or mobility device in place within the vehicle. In these embodiments, side bumper 80 is located to the side of mobility device 52, emanating from beneath flip seat 54. Thus, side bumper 80 contacts the side of mobility device 52, and applies a compressive force thereupon, emanating from beneath surface 53 of flip seat 54 and seat back 57. Likewise, rear bumper 80' contacts the rear of mobility device 52, emanating from proximate retracted occupant seat belt female male component 64. Each of side bumper 80 and rear bumper 80' may be moveable, as described in further detail hereinabove, and may extend to apply a force, including, if desired, a downward bearing force, against the wheelchair or mobility device. Indeed, as shown in FIG. 50, the top portion of side bumper 80 articulates outwardly towards the bus aisle to position side bumper 80 in a downward, angular orientation, capable of applying a downward force against the side of mobility device 52 (as shown in FIG. 51). Further, in FIGS. 52 and 53, rear bumper 80' articulates forwardly towards the front of the bus and outwardly towards bus aisle 69, as shown in FIG. 53, thereby revealing second attachment member 58.

As noted above, each of the embodiments in FIGS. 49 through 53 includes two attachment members 56 and 58, with both attachment members emanating from within the base of rear barrier 62. As in the previous embodiments, attachment members 56 and 58 include hooks 60 and 61, respectively, and hooks 60, 61 are both intended for attachment to either rear axle 65 of mobility device 52 (as shown in FIG. 51), or to a mobility device frame member proximate thereto. In FIGS. 52 and 53, as before, attachment member 58 is positioned and stored behind rear bumper 80', out of view from the occupant. Thus, when rear bumper 80' is articulated forwardly towards the front of the bus and outwardly towards bus aisle 69, as shown in FIG. 53, attachment member 58 is revealed for use. In this embodiment, the occupant, attendant or driver first deploys rear bumper 80' to its extended, articulated position, to reveal attachment member 58. Next, the occupant, attendant or driver can attach hook 61 of attachment member 58 to rear axle 65 of mobility device 52. They may attach attachment member 56 to rear axle 65 of mobility device 52 before or after deploying rear bumper 80'. Once both attachment members 56, 58 are attached to the rear axle 65 of mobility device 52, the occupant, attendant or driver may use control lever 70' to actuate or control the tensioning system, which may be located in rear barrier 62, and which may control the tension of either or both of attachment members 56 and 58. Also shown in FIGS. 49-53 are retracted flip seat 54 and seat bottom 53, as well as seat back 57, retracted occupant seat belt female component 64, retracted occupant seat belt male component 71, retracted shoulder occupant seat belt 72, rear barrier 62, control levers 70 and 70', bus wall 59 and bus aisle 69.

Rear bumper 80' has been shown in the above discussions and drawings to be moveable in a specific manner, in which rear bumper 80' is capable of being articulated forwardly towards the front of the bus and outwardly towards bus aisle 69. That movement capability can be clearly seen in the articulations of FIGS. 43 and 44, and FIGS. 52 and 53. However, rear bumper 80' can also be designed to move in a different orientation, in which it articulates forwardly towards the front of the bus and downwardly towards the floor of the bus. This articulation capability is depicted in FIGS. 54 through 56.

Figure 54:
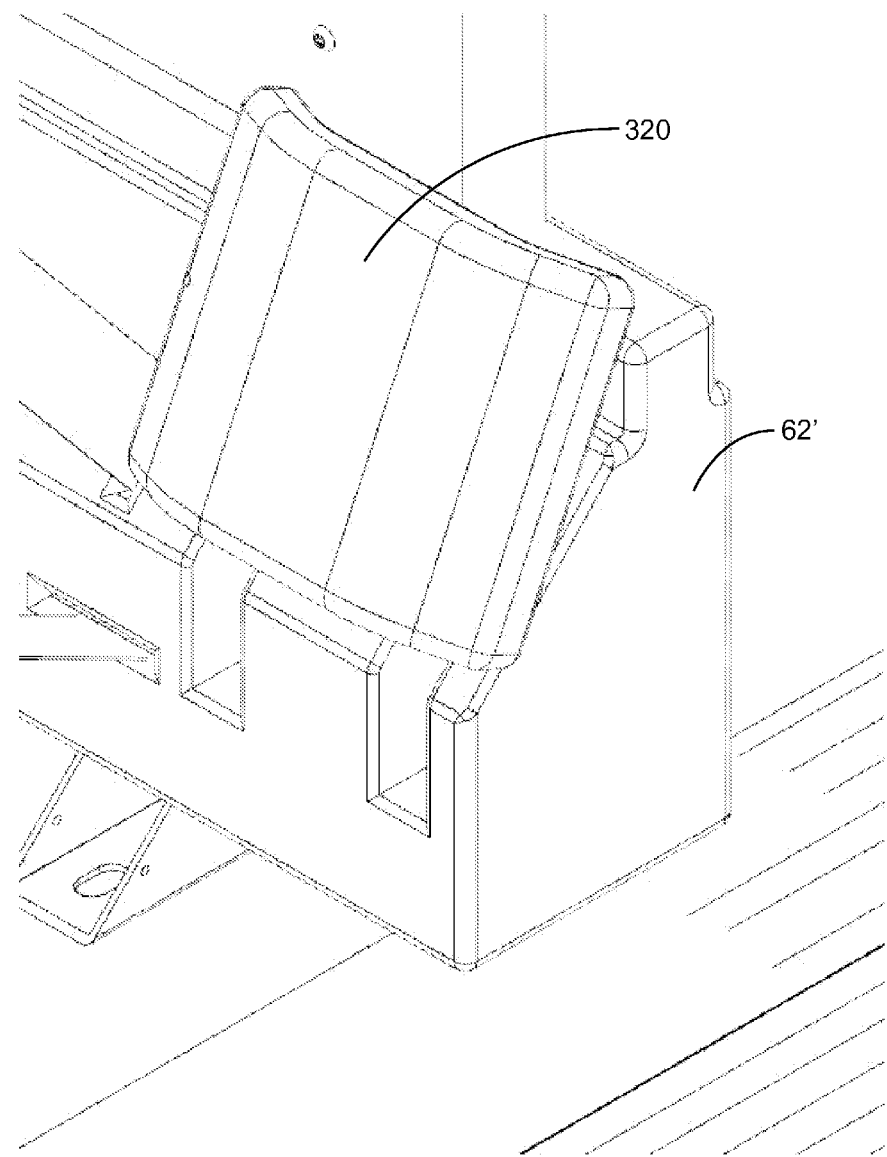
FIG. 54 is a perspective view of an alternative aisle-side bumper that articulates forward (towards the front of the bus) and downward (towards the floor of the bus), in which the bumper is stored in its non-articulated position.
Figure 55:
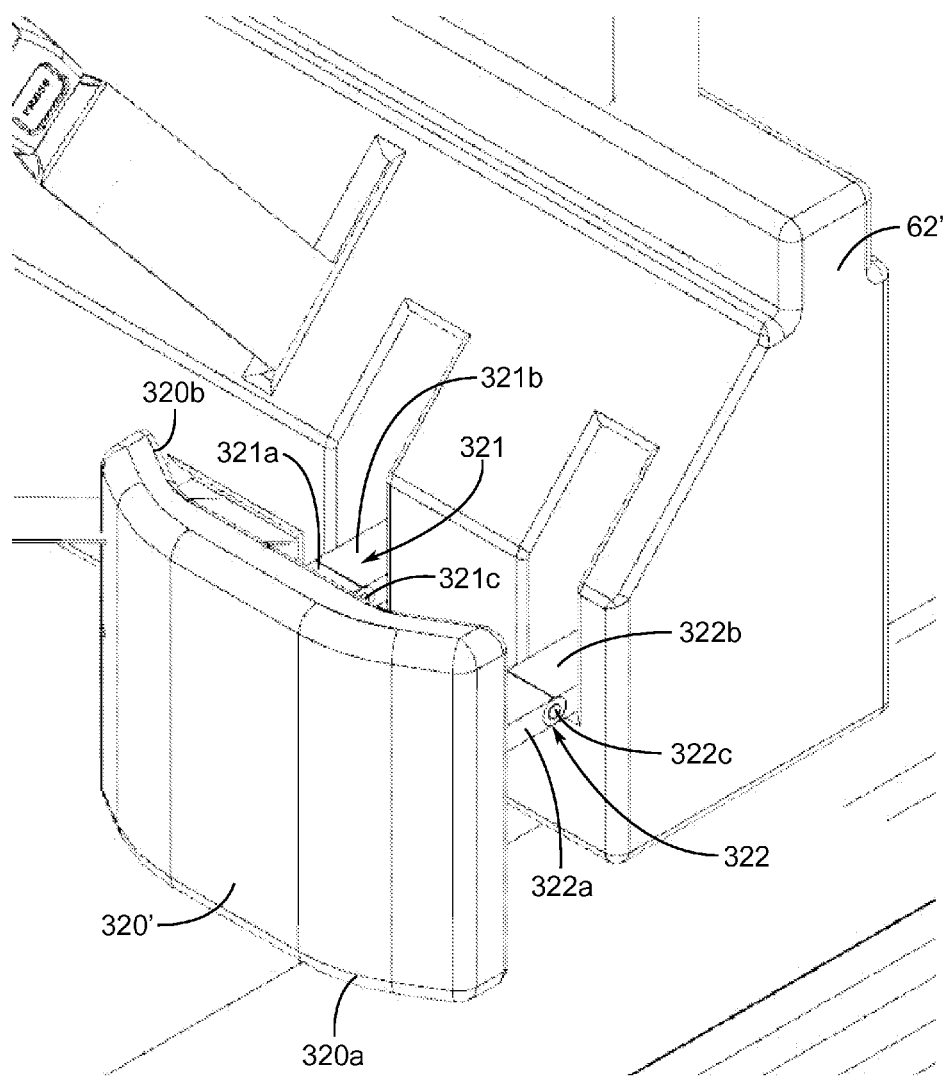
FIG. 55 is a perspective view of the alternative aisle-side bumper shown in FIG. 54, in which the bumper has been articulated forward and downward to its articulated position.

Specifically, in FIG. 54, rear bumper 320 is located in its stored position, in which rear bumper 320 is situated against base 62' of rear barrier 62 (not shown in FIGS. 54 through 56). By contrast, in FIG. 55, rear bumper 320 has been articulated forward and downwardly to its articulated position 320', in which bottom 320a of rear bumper 320 rests on the floor of the bus. The movement of rear bumper 320 from its stored position (shown in FIG. 54) to its articulated position (shown in FIG. 55) is achieved through use of support bars 321 and 322, which are shown in FIG. 55. Support bar 321 comprises two pivotally-linked bars 321a, 321b, which are connected at pivot point 321c. Likewise, support bar 322 comprises two pivotally-linked bars 322a, 322b, which are connected at pivot point 322c. Bars 321b, 322b are attached within base 62' of rear barrier 62, while bars 321a, 322a are attached to the back side 320b of rear bumper 320. Each of bars 321a, 321b, 322a, 322b are capable of rotation from the stored position—in which the bars are stored in positions that are angled upwardly—to the articulated position, in which the bars are parallel to the floor of the bus. This arrangement enables the rotation and articulation shown in FIG. 56, in which rear bumper 320 is shown in its stored position, and the articulated position is shown in phantom as 320'.

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A mobility securement system for securing a mobility device having at least one device securement element, within a vehicle having a wall side and an aisle side, the mobility securement system comprising:
    at least one vehicle anchor assembly affixed to said vehicle proximate to said mobility device;
    at least one attachment member capable of being operably attached between said at least one device securement element and said at least one vehicle anchor assembly, towards restraining the position of said mobility device within said vehicle through the application of a tensile force; and at least one bumper affixed to said vehicle, said at least one bumper being positioned proximate said mobility device to exert a compressive force thereupon said mobility device, said at least one attachment member being operably connected to at least one tensioning assembly for imposing said tensile force upon said at least one attachment member;

said mobility securement system being limited to no more than two attachment members, and no more than two bumpers, for securing the mobility device within said vehicle, said at least one bumper being positioned outside of the region formed between any two attachment members when said at least one attachment member comprises two such attachment members.

2. The mobility securement system of claim 1, in which:
said at least one attachment member comprises a first attachment member and a second attachment member,
said at least one vehicle anchor assembly comprises a front vehicle anchor assembly and rear vehicle anchor assembly,
said at least one device securement element comprises a first device securement element and a second device securement element,
said at least one tensioning assembly comprises a tensioning mechanism contained within each of said front vehicle anchor assembly and said rear vehicle anchor assembly,
said first attachment member being capable of being operably attached between said first device securement element and said front vehicle anchor assembly, towards restraining the position of said mobility device within said vehicle, and
said second attachment member being capable of being operably attached between said second device securement element and said rear vehicle anchor assembly, towards restraining the position of said mobility device within said vehicle.

3. The mobility securement system of claim 2, further comprising an attachment member guide, which guides said first attachment member to a location wherein said first attachment member can exert a rearward force on said first device securement element.

4. The mobility securement system of claim 2, further comprising an attachment member guide, which guides said second attachment member to a location wherein said second attachment member can exert a rearward force on said second device securement element.

5. The mobility securement system of claim 3, in which said at least one bumper comprises a first bumper positioned proximate the rear side of said mobility device, and wherein said attachment member guide also serves as a second bumper.

6. The mobility securement system of claim 4, in which said at least one bumper comprises a first bumper positioned proximate the rear side of said mobility device, and wherein said attachment member guide also serves as a second bumper.

7. The mobility securement system of claim 2, in which said second attachment member emanates from a position substantially proximate the rear wall side of said mobility device.

8. The mobility securement system of claim 2, in which said second attachment member emanates from a position substantially proximate the rear aisle side of said mobility device.

9. The mobility securement system of claim 1, in which:
said at least one vehicle anchor assembly comprises a rear vehicle anchor assembly;
said at least one attachment member being capable of operable attachment between said at least one device securement element and said rear vehicle anchor assembly, towards restraining the position of said mobility device within said vehicle.

10. The mobility securement system of claim 9, in which said at least one bumper comprises a first bumper positioned substantially proximate the wall side of said mobility device.

11. The mobility securement system of claim 10, in which said at least one bumper further comprises a second bumper affixed to said vehicle and positioned substantially proximate the rear aisle side of said mobility device,
said second bumper being capable of applying said compressive force against said mobility device.

12. The mobility securement system of claim 9, in which said at least one attachment member emanates from a location that is positioned between said at least one and a second bumper.

13. The mobility securement system of claim 11, in which said second bumper is moveable from a stored position to an articulated position.

14. The mobility securement system of claim 11, in which said at least one attachment member comprises a first attachment member, which emanates from said rear vehicle anchor assembly at a position substantially proximate the wall side of said mobility device.

15. The mobility securement system of claim 11, in which said at least one attachment member comprises a first attachment member, which emanates from said rear vehicle anchor assembly at a position substantially proximate the aisle side of said mobility device.

16. The mobility securement system of claim 13, in which said at least one attachment member comprises a first attachment member, which emanates from said rear vehicle anchor assembly at a location that is substantially behind the stored position of said second bumper.

17. The mobility securement system of claim 15, in which said at least one attachment member further comprises a second attachment member, which emanates from said rear vehicle anchor assembly at a position substantially proximate the wall side of said mobility device.

18. The mobility securement system of claim 11, in which the movement of said second bumper from a stored position to an articulated position comprises a movement in the forward direction and a movement outward in the direction of the aisle.

19. The mobility securement system of claim 11, in which the movement of said second bumper from a stored position to an articulated position comprises a movement in the forward direction and a movement in the downward direction.

20. The mobility securement system of claim 10, in which said at least one attachment member comprises:
a first attachment member, which emanates from said rear vehicle anchor assembly at a position substantially proximate the wall side of said mobility device, and
a second attachment member, which emanates from said rear vehicle anchor assembly at a position substantially proximate the aisle side of said mobility device.

21. The mobility securement system of claim 10, in which at least a portion of said first bumper is moveable and capable of extending to apply an angularly downward force against the mobility device.

* * * * *